(12) United States Patent
Maldonado et al.

(10) Patent No.: US 12,297,089 B2
(45) Date of Patent: May 13, 2025

(54) AUTONOMOUS CONVEYANCE ROBOT FOR CROSS-DOCK OPERATIONS

(71) Applicant: Innovative Logistics, LLC, Fort Smith, AR (US)

(72) Inventors: Jefferson Maldonado, Fort Smith, AR (US); Dylan Henderson, Fort Smith, AR (US); Srijith Umakanth, Fort Smith, AR (US); David Albers, Fort Smith, AR (US); Mark Belin, Fort Smith, AR (US); Kenneth Lee Noblitt, Fort Smith, AR (US); Brock Mcallister, Fort Smith, AR (US)

(73) Assignee: INNOVATIVE LOGISTICS, LLC, Forth Smith, AR (US)

( * ) Notice: Subject to any disclaimer, the term of this patent is extended or adjusted under 35 U.S.C. 154(b) by 210 days.

(21) Appl. No.: 17/794,103

(22) PCT Filed: Mar. 2, 2021

(86) PCT No.: PCT/US2021/020482
§ 371 (c)(1),
(2) Date: Jul. 20, 2022

(87) PCT Pub. No.: WO2021/178413
PCT Pub. Date: Sep. 10, 2021

(65) Prior Publication Data
US 2022/0402734 A1     Dec. 22, 2022

Related U.S. Application Data

(60) Provisional application No. 62/984,581, filed on Mar. 3, 2020.

(51) Int. Cl.
*B66F 9/06*     (2006.01)
*B66F 9/075*    (2006.01)
(Continued)

(52) U.S. Cl.
CPC ............ *B66F 9/063* (2013.01); *B66F 9/0755* (2013.01); *B66F 9/07554* (2013.01); *B66F 9/07568* (2013.01)

(58) Field of Classification Search
CPC .... B66F 9/063; B66F 9/07513; B66F 9/0755; B66F 9/07554; B66F 9/07568;
(Continued)

(56) References Cited

U.S. PATENT DOCUMENTS 6,296,436 B1   10/2001   Ramun
9,367,827 B1   6/2016    Lively et al.
(Continued)

FOREIGN PATENT DOCUMENTS

CN   109368553 A   *   2/2019   .......... B66F 9/07504
JP   H0632227 A    *   2/1994
(Continued)

OTHER PUBLICATIONS

Office Action dated Nov. 27, 2023, from Canadian Patent Application No. 3,170,062, 3 sheets.
(Continued)

*Primary Examiner* — Jason D Shanske
*Assistant Examiner* — Daniel M. Keck
(74) *Attorney, Agent, or Firm* — KATTEN MUCHIN ROSENMAN LLP

(57) ABSTRACT

Disclosed herein is an automated conveyance robot (ACR) for conveying movable platforms (MPs) in and out of trailers. A lift carriage at a first end of the ACR is configured to couple to the MP during movement and disengage after movement. A counterweight system at a second end of the ACR counterbalances the ACR during conveyance. The ACR comprises a front drive assembly and a rear drive assembly which are independently steerable to allow for
(Continued)

different steering methods. The ACR can function fully automated or can be controlled.

21 Claims, 64 Drawing Sheets

(51) Int. Cl.
*B66F 9/24* (2006.01)
*G05B 19/418* (2006.01)
*G06Q 10/08* (2024.01)

(58) Field of Classification Search
CPC .. B66F 9/07572; B66F 9/24; G05B 19/41895; G05B 2219/31002; G05B 2219/50393; G06Q 10/08; Y02P 90/60
See application file for complete search history.

(56) References Cited

U.S. PATENT DOCUMENTS

| | | | |
|---|---|---|---|
| 10,124,927 B2 | 11/2018 | Bradley et al. | |
| 10,147,059 B2 | 12/2018 | Sullivan et al. | |
| 10,279,955 B2 | 5/2019 | Bradley et al. | |
| 10,370,191 B2 | 8/2019 | Galewyrick et al. | |
| 10,618,753 B2 | 4/2020 | Hopkins et al. | |
| 2018/0237225 A1 | 8/2018 | Galewyrick et al. | |
| 2018/0297795 A1 | 10/2018 | Hopkins et al. | |
| 2018/0346020 A1* | 12/2018 | Bebernes | B62D 5/091 |
| 2018/0346264 A9 | 12/2018 | Girtman et al. | |
| 2020/0102147 A1* | 4/2020 | Sullivan | B65G 1/1375 |
| 2021/0276841 A1* | 9/2021 | Borofka | B66F 17/003 |
| 2022/0063970 A1* | 3/2022 | Pina | B60L 3/0092 |
| 2024/0151822 A1* | 5/2024 | Sollers | G01S 17/42 |

FOREIGN PATENT DOCUMENTS

| | | | |
|---|---|---|---|
| KR | 20240071451 A * | 5/2024 | |
| NO | 2009020509 A1 | 2/2009 | |
| WO | 2018089229 A2 | 5/2018 | |
| WO | WO-2023165474 A1 * | 9/2023 | |
| WO | WO-2024197266 A2 * | 9/2024 | B66F 9/06 |

OTHER PUBLICATIONS

International Search Report and Written Opinion dated May 27, 2021, from PCT/US2021/020482, 11 sheets.

Communication pursuant to Rules 70(2) and 70a(2) EPC dated Apr. 4, 2024, from European Patent Application No. 21764291.7, 1 sheets.

The extended European search report dated Mar. 13, 2024, from European Patent Application No. 21764291.7, 5 sheets.

* cited by examiner

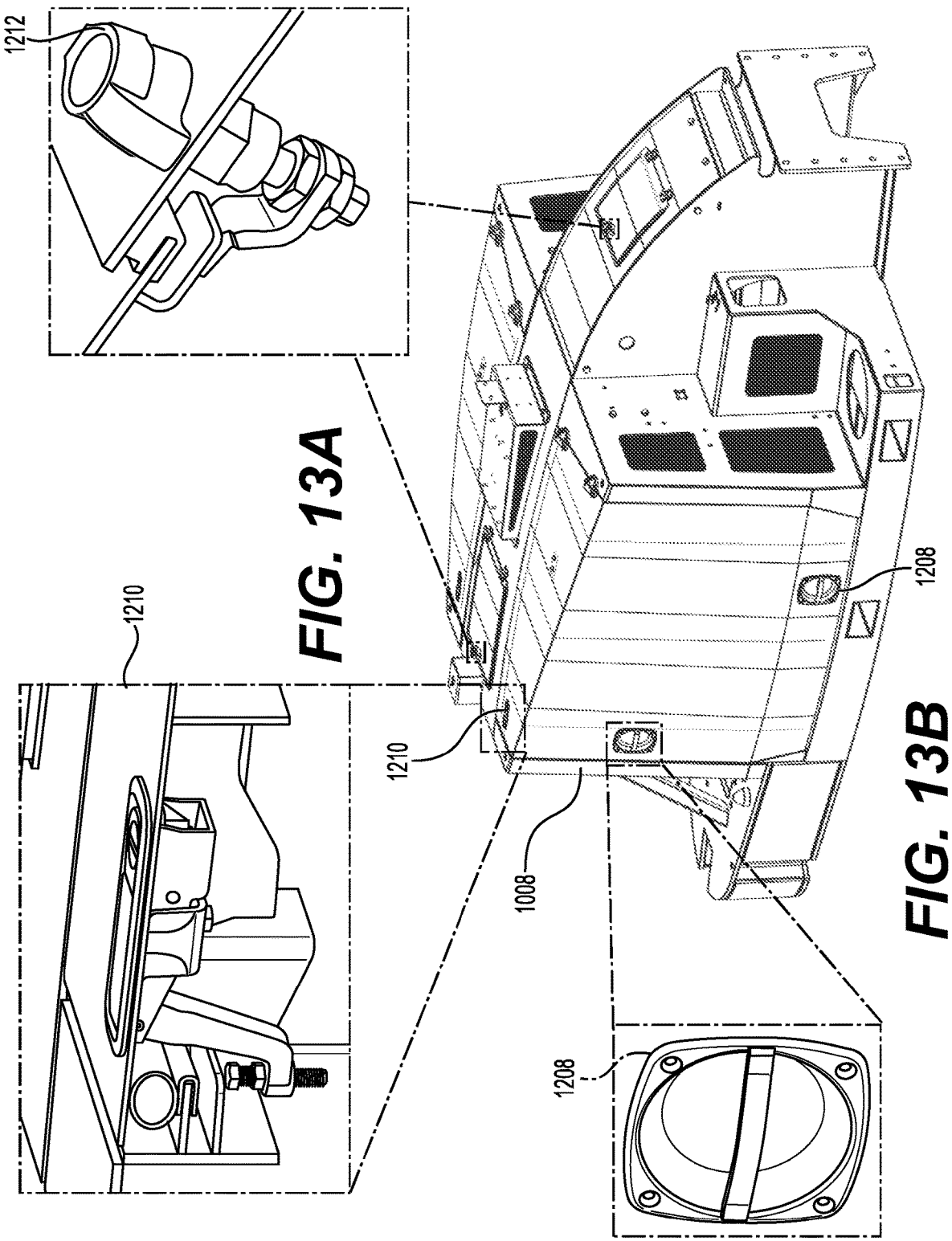

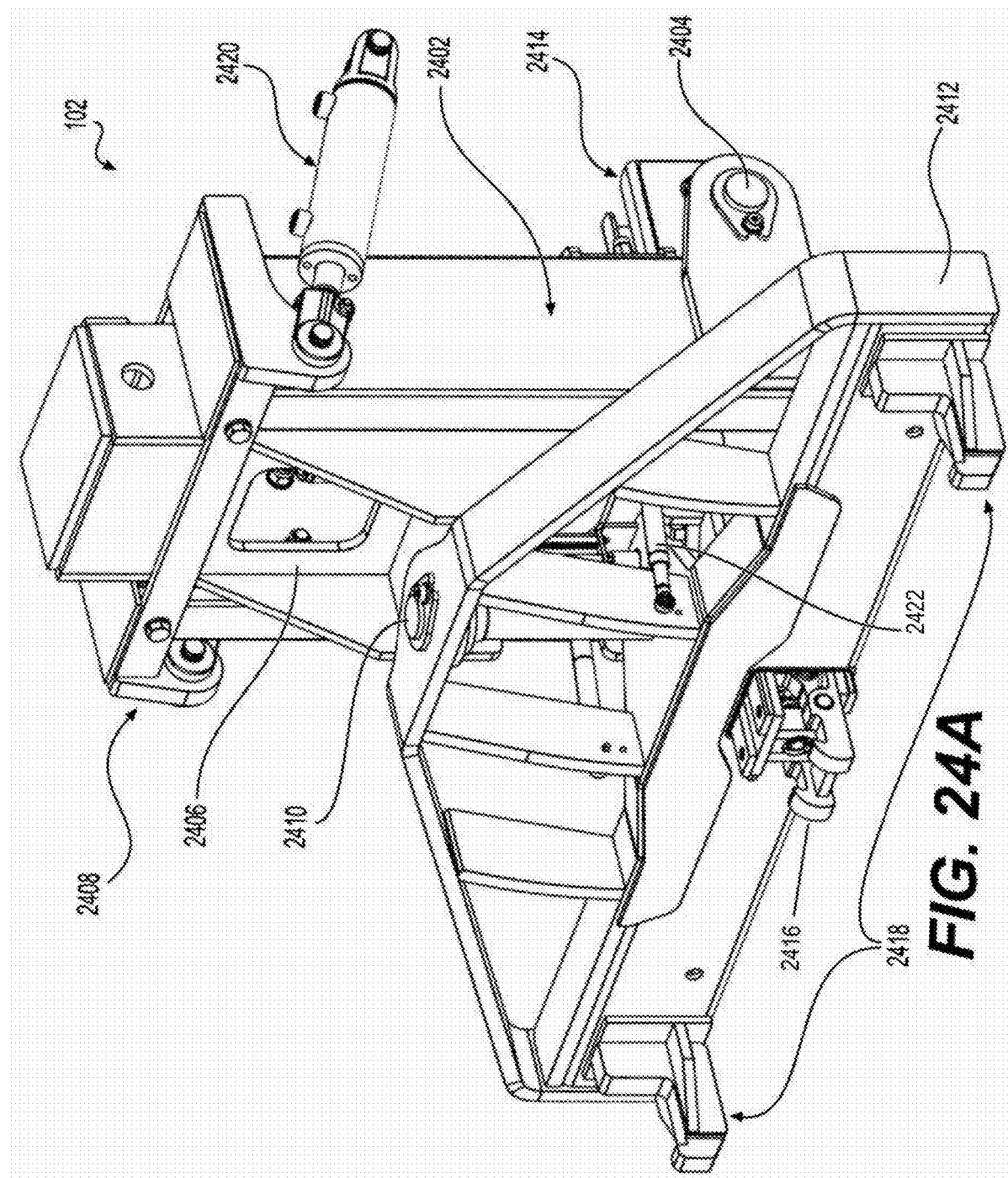

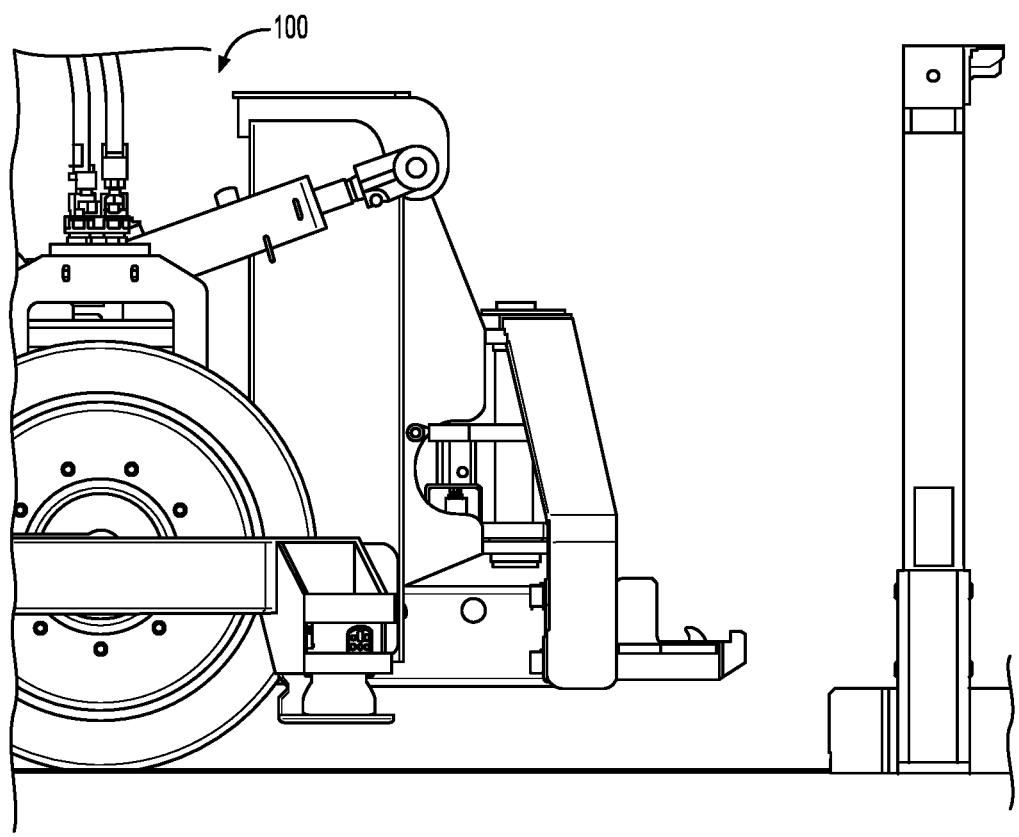
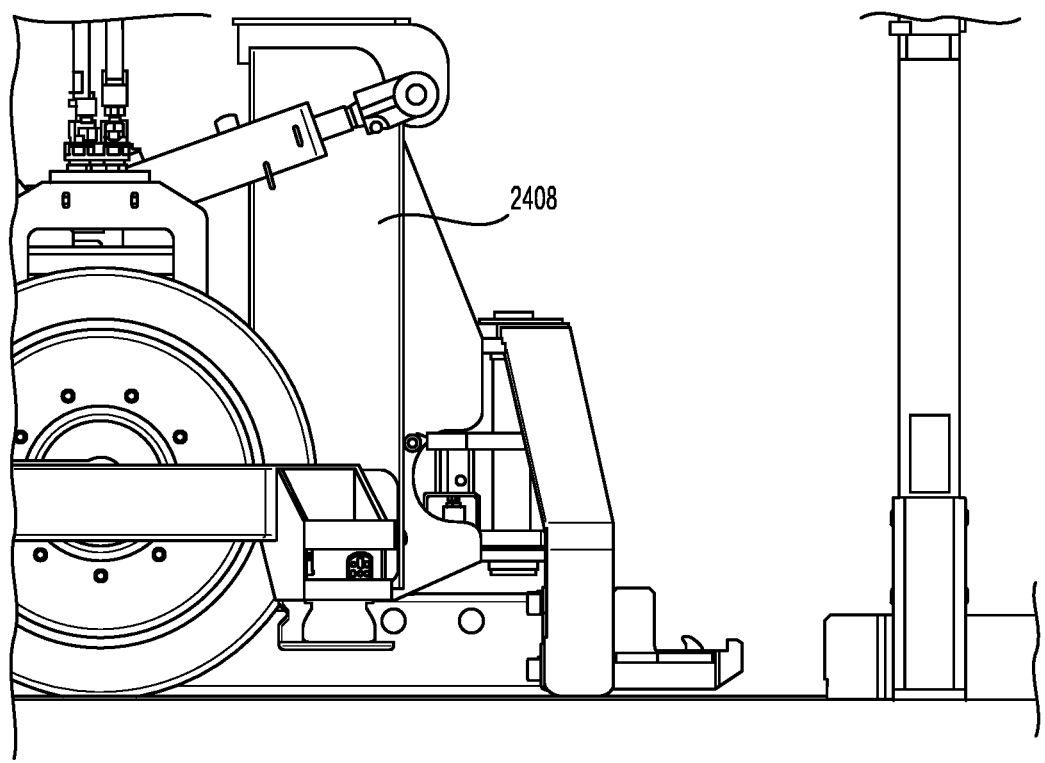
FIG. 33A

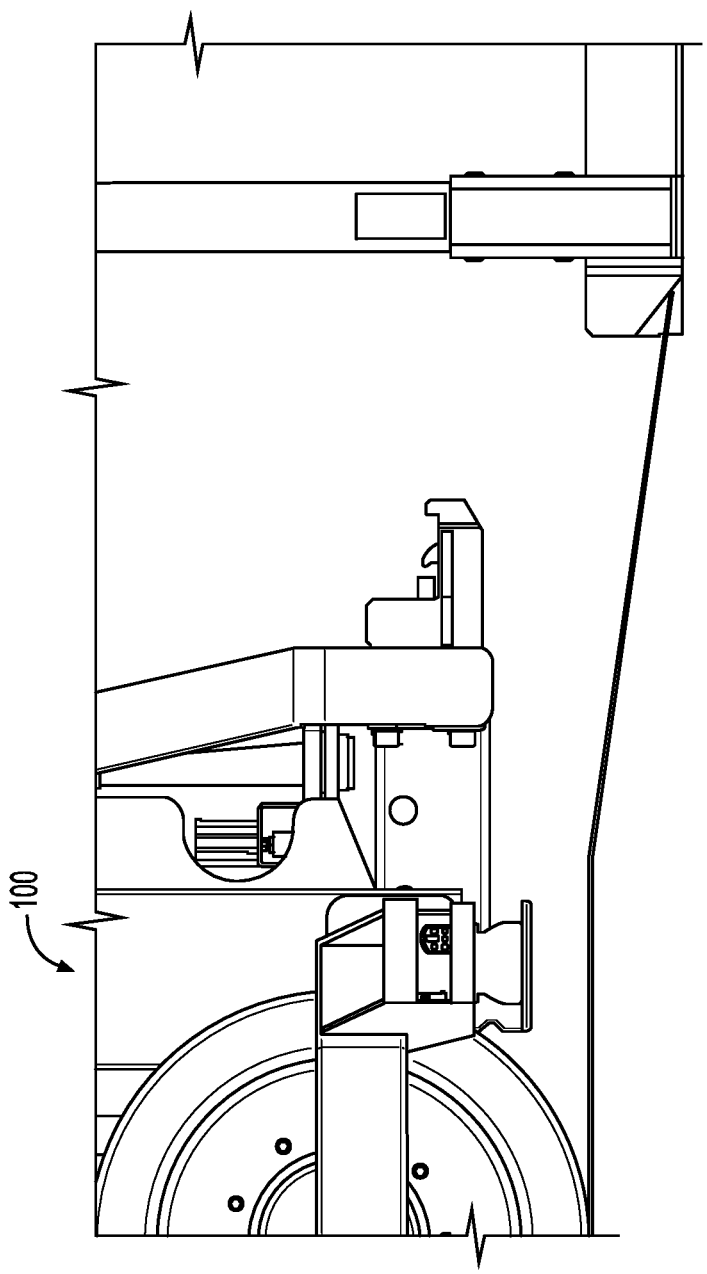

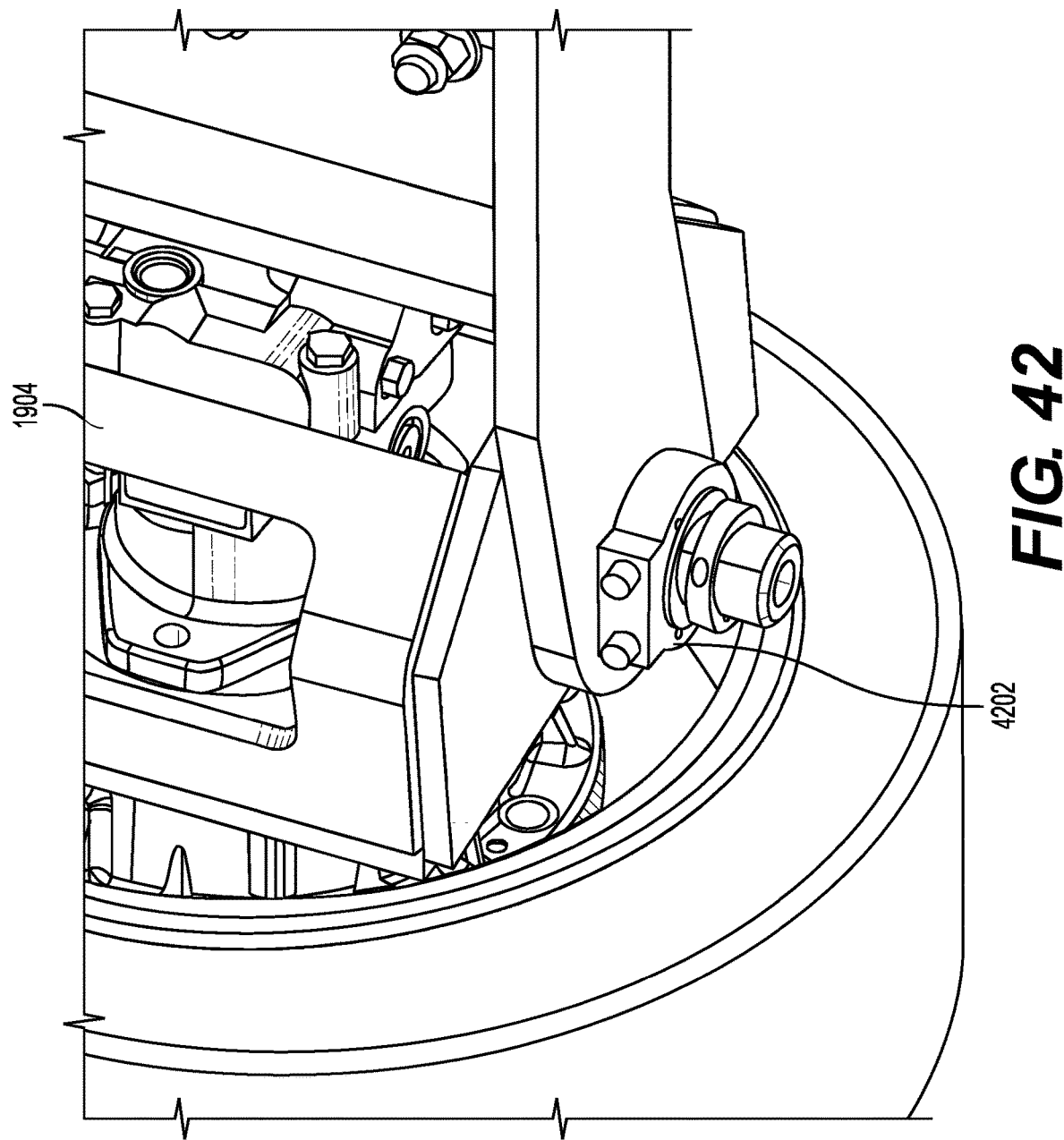

AUTONOMOUS CONVEYANCE ROBOT FOR CROSS-DOCK OPERATIONS

CROSS-REFERENCE TO RELATED APPLICATIONS

The present application is a national phase of PCT/US2021/020482, filed Mar. 2, 2021, which claims priority to U.S. Provisional Application Ser. No. 62/984,581, filed Mar. 3, 2020, the entire contents of which are hereby incorporated by reference in their entirety.

FIELD OF THE INVENTION

The present invention discloses an autonomous conveyance robot (ACR) particularly suited for use in cross-dock operations.

BACKGROUND

In recent years, many aspects of shipping (e.g., less than truckload shipping) have become increasingly automated. However, most docks and cross-docks still utilize the same methods for transferring freight cross-dock as has been used for the past fifty or more years.

Many smaller warehouses have also started to become automated. However, the freight to be moved at most warehouses is typically light (e.g., under 1000 lbs.) and conventional technology or robots can more easily be adapted to move such freight.

In LTL shipping, the freight that needs to be handled and conveyed can often weigh one ton or more, with a fully loaded trailer weighing upwards of 12 tons. In order to meet the demands of moving the greater weight loads, newer classes of automated conveyance robots (ACRs) are needed that can reliably handle conveying this weight in a safe and effective manner.

RELATED APPLICATIONS

The present invention can be utilized in any standard or custom warehouse. Particularly, the ACR of the present invention can be utilized with the movable platforms (MPs) described in related U.S. Pat. No. 9,367,827, issued Jun. 14, 2016; U.S. Pat. No. 10,124,927, issued Nov. 13, 2019; and U.S. Pat. No. 10,147,059, issued Dec. 4, 2018; U.S. application Ser. No. 15/953,931, filed Apr. 16, 2018; Ser. No. 15/798,597, filed Oct. 31, 2017; Ser. No. 15/798,801, filed Oct. 31, 2017; and Ser. No. 15/902,421, filed Feb. 22, 2018, all of which are hereby incorporated by reference in their entireties.

SUMMARY

The present invention discloses an ACR for conveying movable platforms (MPs) in and out of trailers. A lift carriage at a first end of the ACR is configured to couple to the MP during movement and disengage after movement. A counterweight system at a second end of the ACR counterbalances the ACR during conveyance. The ACR comprises a front drive assembly and a rear drive assembly which are independently steerable to allow for different steering methods. The ACR can function fully automated or can be controlled

BRIEF DESCRIPTION OF THE DRAWINGS

These and other advantages of the present invention will be readily understood with the reference to the following specifications and attached drawings wherein:

FIGS. 13A-13C depict the latches for the access panels.

FIGS. 24A-24B depict the lift carriage in isolation.

FIGS. 33A-33E depict the MP attachment sequence on a flat floor.

FIGS. 35A-35E depict the attachment sequence during a ramp engagement.

FIGS. 42-47 depict sensor mounting locations on the ACR.

FIGS. 47-48 depict the receiver and controller for the ACR.

DETAILED DESCRIPTION

Preferred embodiments of the present invention will be described herein below with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, just as those by air, sea, and rail. Therefore, the teachings should not be construed as being limited to only the trucking industry.

As used herein, movable platforms (MPs) means the rack used to transport goods in and out of trucks. Machine front refers to the coupling end of the MP, opposite the counter balance. Machine rear refers to the counterbalance end of the ACR, opposite of the MP coupling end. Low level control system refers to engine control, hydraulic control, auxiliary functions, and remote control. High level control system refers to the autonomous guidance for the low level controls of the ACR. Attachment range refers to the full distance from the rear of the ACR to the back of the MP. Pre-engage range refers to the distance from the front hooks of the ACR to the back of the MP.

In the MPs described in the related applications, a pulling or pushing linear force must be exerted on one or more drawbars in order to transition the MP from a movable state to a stationary state. Also, during conveyance, it is preferable that a slight lifting force is exerted on the MP to make it easier to move, especially if weighted with freight. The ACR 100 described herein is capable of exerting both these forces on the MP and autonomously moving it through a warehouse or cross-dock, as will be described.

Figure 1:
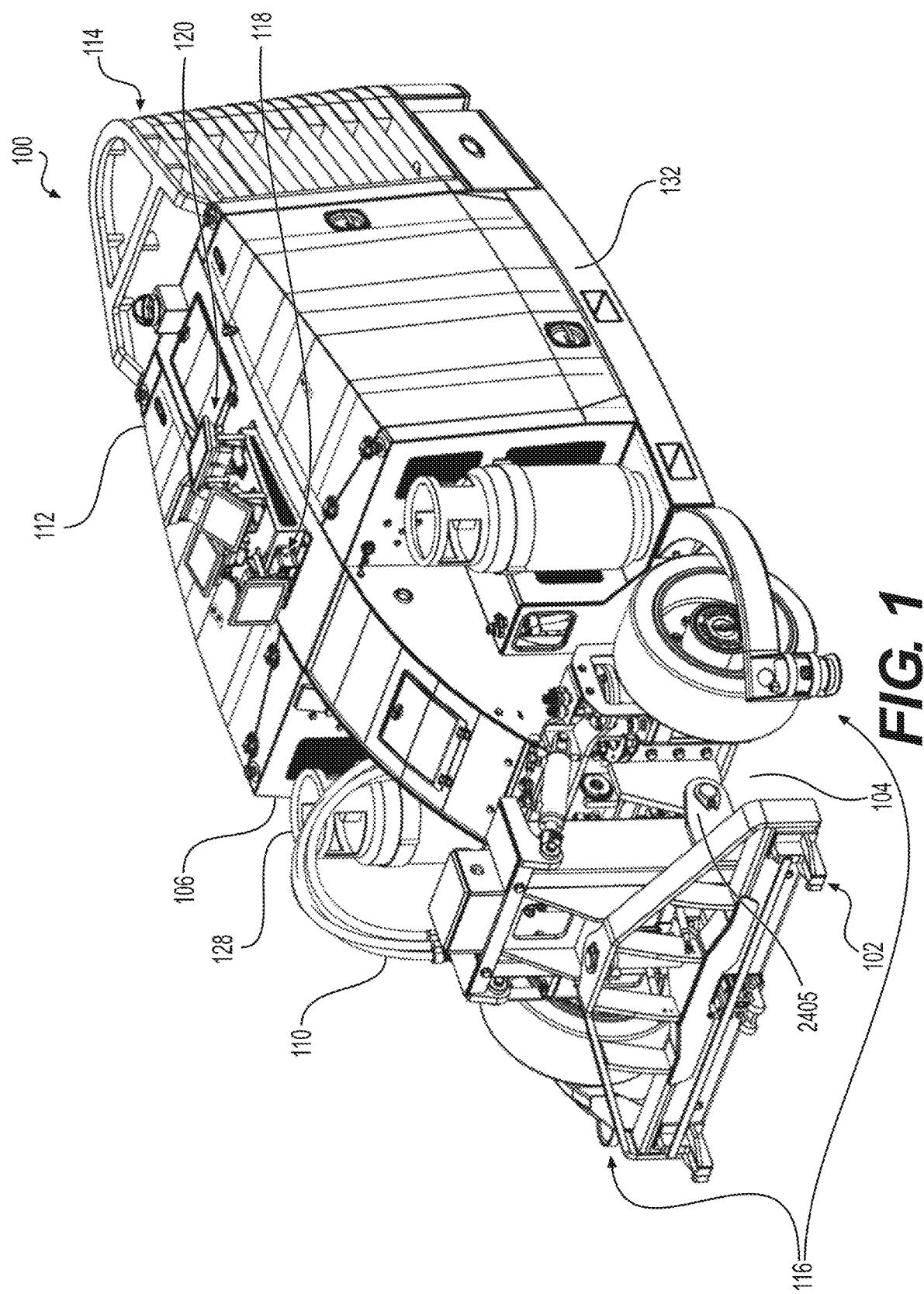
FIGS. 1-2 provide isometric views of the ACR.
Figure 2:
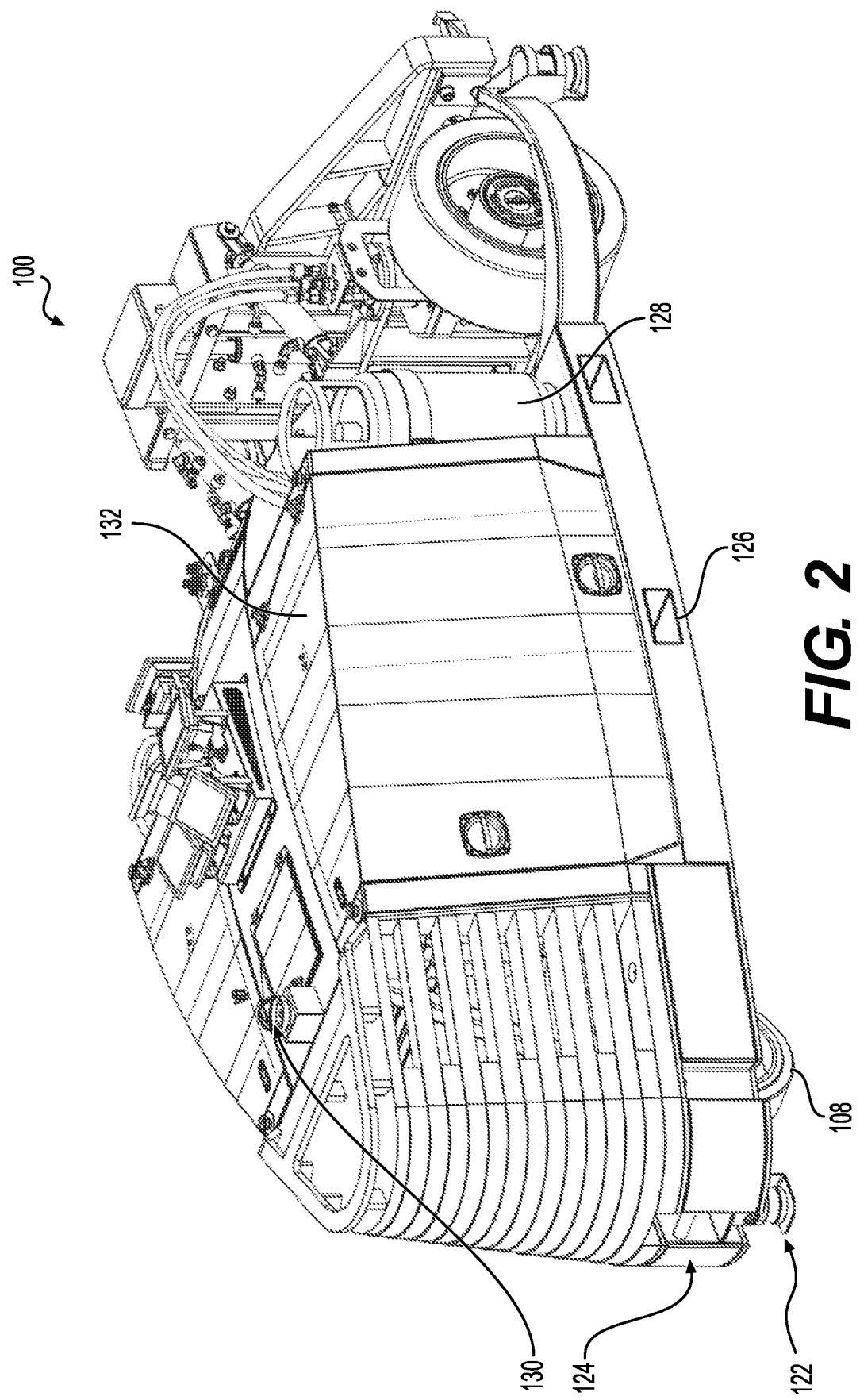

FIGS. 1-2 depict external perspective views of ACR 100 showing the primary components. However, preferable configuration specifications regarding the capabilities and/or requirements of ACR 100 will first be discussed. These capabilities and/or requirements allow ACR to reliably function on an LTL cross-dock under a wide variety of temperature and lighting conditions while still maintaining safety. The ACR 100 preferably has a maximum height of 89", a maximum width of 92", a maximum track width front of 72", and a maximum track width rear of 72". These dimensions allow the ACR 100 to safely navigate a cross-dock with/without an MP. The dry weight of ACR 100 is preferable under 10,000 pounds. The lateral and longitudinal stability of the ACR 100 preferably meets ANSI B56.8 safety standards for personnel and burden carriers. In the described embodiment, ACR 100 is powered by liquefied petroleum gas (LPG, propane). However, it should be obvious that other power sources, such as electric motors and batteries, may also be utilized.

The front wheel axle to backstop of the lifting hooks of ACR 100 is preferably 28.5" horizontal. The ramp hinge to the back of the MP is preferably a minimum of 23.25" horizontal. ACR 100 is designed such that it can safely convey MPs into/out of trailers with an elevation difference between the truck bed to the warehouse floor of up to 4.25". As will be described later, ACR 100 includes a plurality of safety features such as light beacons, alarms, and object detection systems.

During normal operation on a cross-dock, ACR 100 preferably has a work and/or travel speed of approximately 4 miles per hour (mph). ACR 100 is also able to accommodate ramps having up to a 16% grade while maintaining a speed of approximately 1 mph. ACR 100 preferably has a stopping distance of less than 5.6' and is capable of a gradeability with a max load of 19%.

For maneuverability, the ACR 100 is capable of multiple steering modes including crab, coordinate, front, and rear. ACR 100 preferably has a turning radius with an empty MP of 14.5' from the inside wall of the MP.

A fully loaded MP may weigh upwards of 24,000 lbs. Therefore, ACR 100 must have certain lifting/pulling performance specifications. For example, ACR 100 preferably has a maximum drawbar pull of 4,500 lbs., a maximum lifting force of 9,500 lbs., and a T-Bar pull max of 7,500 lbs. ACR 100 preferably has a pivot range of ±5° from center-line, a lift range of 4" above ground, and a total run time without refueling of approximately 8 hours.

The operating conditions of a cross-dock can vary greatly from summer to winter and geographically, especially since some may not be heated and/or cooled. Therefore, ACR 100 must be able to operate over a wide range of temperatures without any modification (e.g., 0-120° F.). ACR 100 may be further modified for more extreme conditions with a cold weather embodiment for operating at −40-120° F. which may occur in remote destinations, especially spokes of an LTL network. Although designed to be used on a cross-dock, the ACR 100 will be temporarily exposed to external conditions, such as rain or snow between the truck and the bay. Thus, the ACR 100 must be able to operate reliably in humidity up to 95% and in air with light to moderate dust. ACR 100 can also operate reliably anywhere from sea level to more than 5,500' above sea level.

Because multiple ACRs 100 may be operating on a single cross-dock, it is preferable that their sound level does not exceed a maximum decibel level (e.g., 84 dba). The ACR 100 may also comprise an autonomous override system which can be used to control the low level control system.

A typical ACR 100 preferably has a duty cycle as follows:
Travel at max speed with no MP—15%
MP conveyance, Max drawbar, Max speed—75%
Idle—5%
Off—5%

ACR 100 must also be able to autonomously perform various tasks in different modes of operation. The following is a non-exhaustive listing of functions that ACR 100 must be able to perform:
Attach to MP inside trailer
Attach to MP inside warehouse
Detach from MP inside trailer
Detach from MP inside warehouse
Conveyance of MP inside trailer
Conveyance of MP inside warehouse
Navigation without MP
Refueling
Restart from emergency stop FIG. 1 depicts a machine front isometric view of the ACR 100 and FIG. 2 depicts a machine rear isometric view of the ACR 100. ACR 100 generally comprises lift carriage 102, front drive assembly 104, main frame 106, rear drive assembly 108, power system 110, safety and navigation system (SANS) 112, and counterweight assembly 114.

Other features of these various components are also visible in FIGS. 1 and 2. For example, SANS 112 further comprises front LIDARs 116, cameras 118, IR LED lights 120, and rear LIDAR 122. Taken together, these components provide ACR 100 with the data necessary for autonomous navigation. Machine status beacon 130 indicates the current status of ACR 100 using a different color light or an alarm pattern.

Main frame 106 further comprises tow bar 124 and fork lift pockets 126. Tow bar 124 is utilized to two ACR 100 in the event that it runs out of power or needs maintenance. Fork lift pockets 126 can be used to convey ACR 100 using a forklift before or after counterweight 114 has been removed.

One or more tanks 128 are mounted to the exterior of ACR 100 and contain the power supply for power system 110. The external mounting is important so that the tanks 128 can be quickly swapped. However, the tanks are positioned close to main frame 106 which provides protection for tanks 128 against cargo accidents or during collisions.

Figure 3:
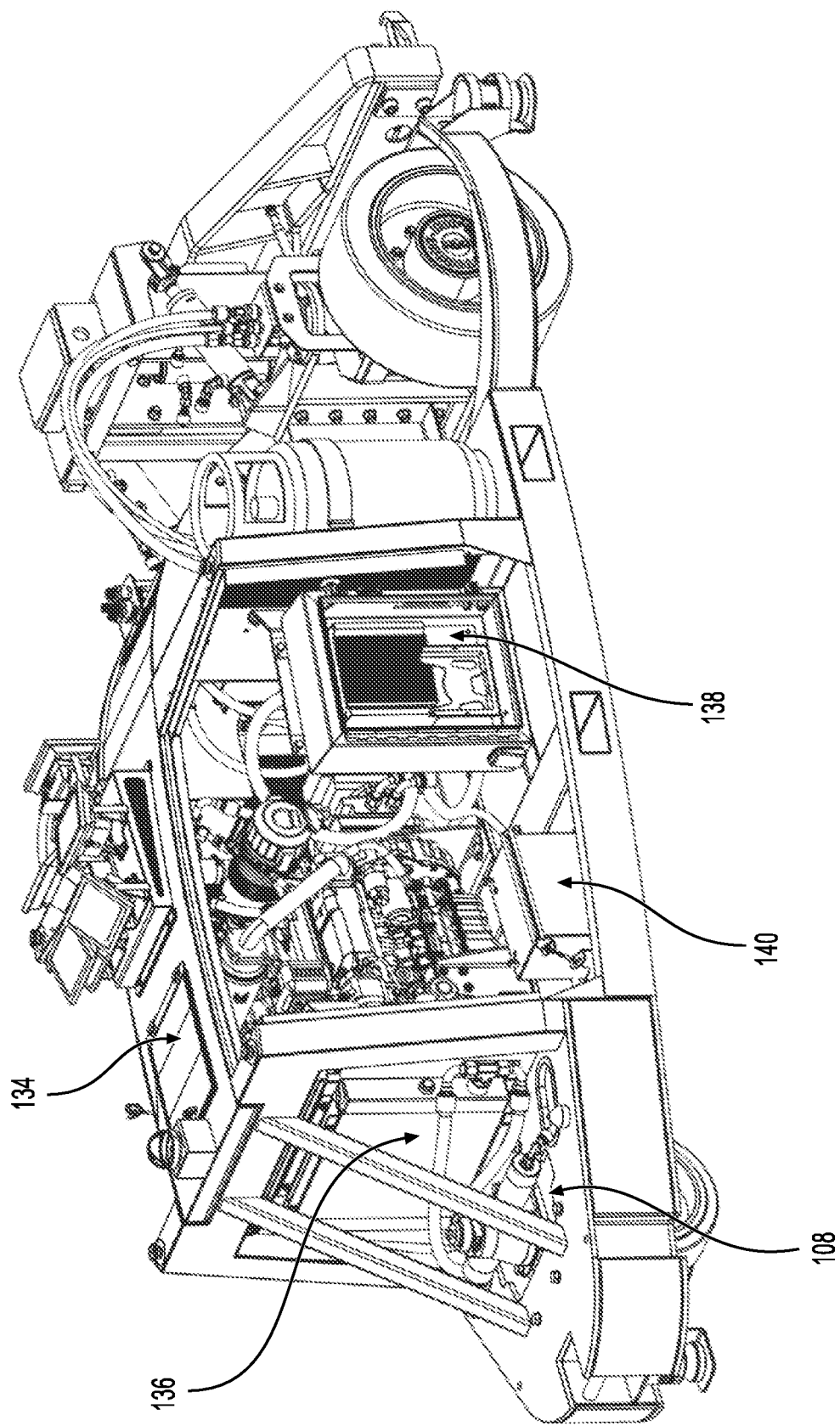
FIGS. 3-4 provide isometric views of the ACR with the cover and counterweight removed.
Figure 4:
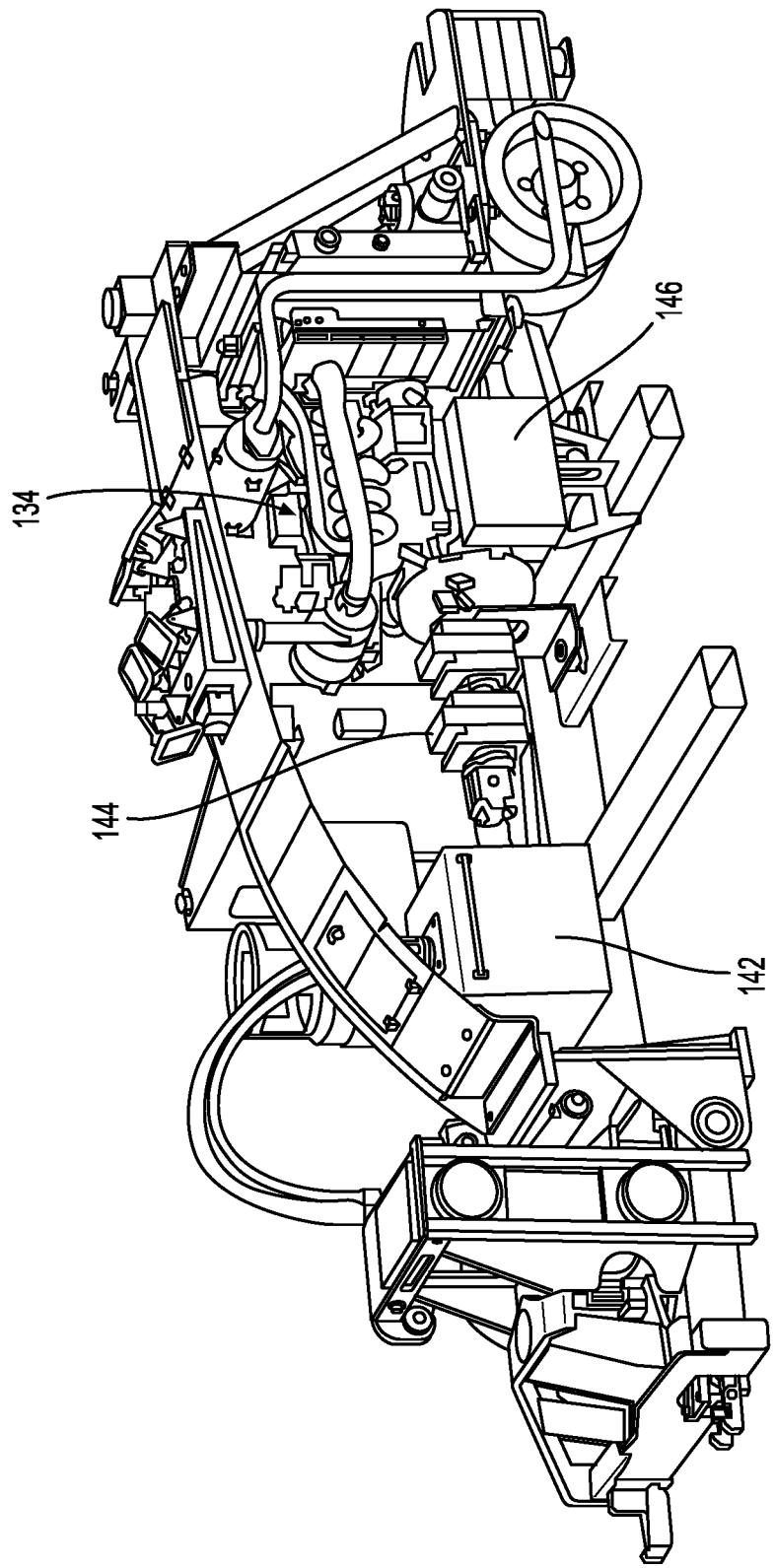

Each side of ACR 100 is equipped with a hinged access panel 132 to allow access to the interior of ACR 100 for engine maintenance, computer access, oil changes, etc. FIG. 3 depicts a machine rear view of ACR 100 with access panels 132 and counterweight assembly 114 completely removed to reveal the various internal components of ACR 100 which mostly comprise parts of power system 100. FIG. 4 depicts a machine front view of ACR 100 with main frame 106 shown in partial cross-section.

Engine 134 is mounted internal to main frame 106 towards a rear of ACR 100 and functions as an additional counterweight during transport of MPs. An oil cooler 136 is positioned directly adjacent the engine 134. The openings in counterweight assembly 114 between the counterweights allow airflow to the oil cooler 136 as depicted in FIG. 2. In FIG. 3, rear drive assembly 108 can be seen mounted to main frame 106 through an opening. Additional features of rear drive assembly 108 will be described later.

An ACR computer 138 is mounted to main frame 106 immediately adjacent an access panel 132 because it may need to be repeatedly and constantly accessed. Battery 140 functions as a temporary power supply and backup for various electrical components of ACR 100, such as ACR computer 138 or safety and navigation system 112.

FIG. 4 depicts the primary components of the hydraulics portion of power system 110 which comprises hydraulics tank 142, pump stack 144, and valve assembly 146. Taken together, these components are responsible for providing the hydraulic power required to control lift carriage 102, front drive assembly 104, rear drive assembly 108, and lift carriage 102.

Figure 5A:
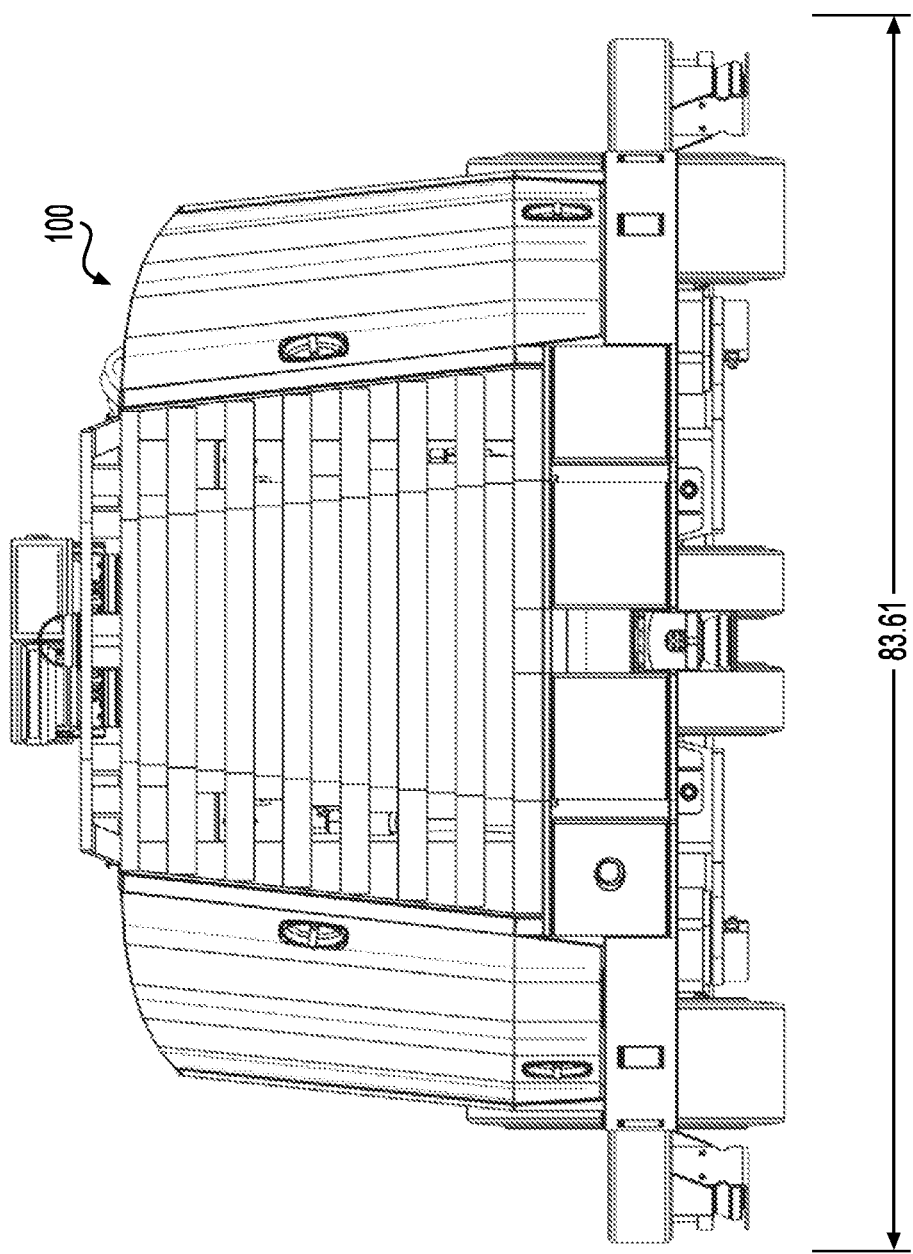
FIGS. 5A-5B depict flat views showing example dimensions of the ACR.
Figure 5B:
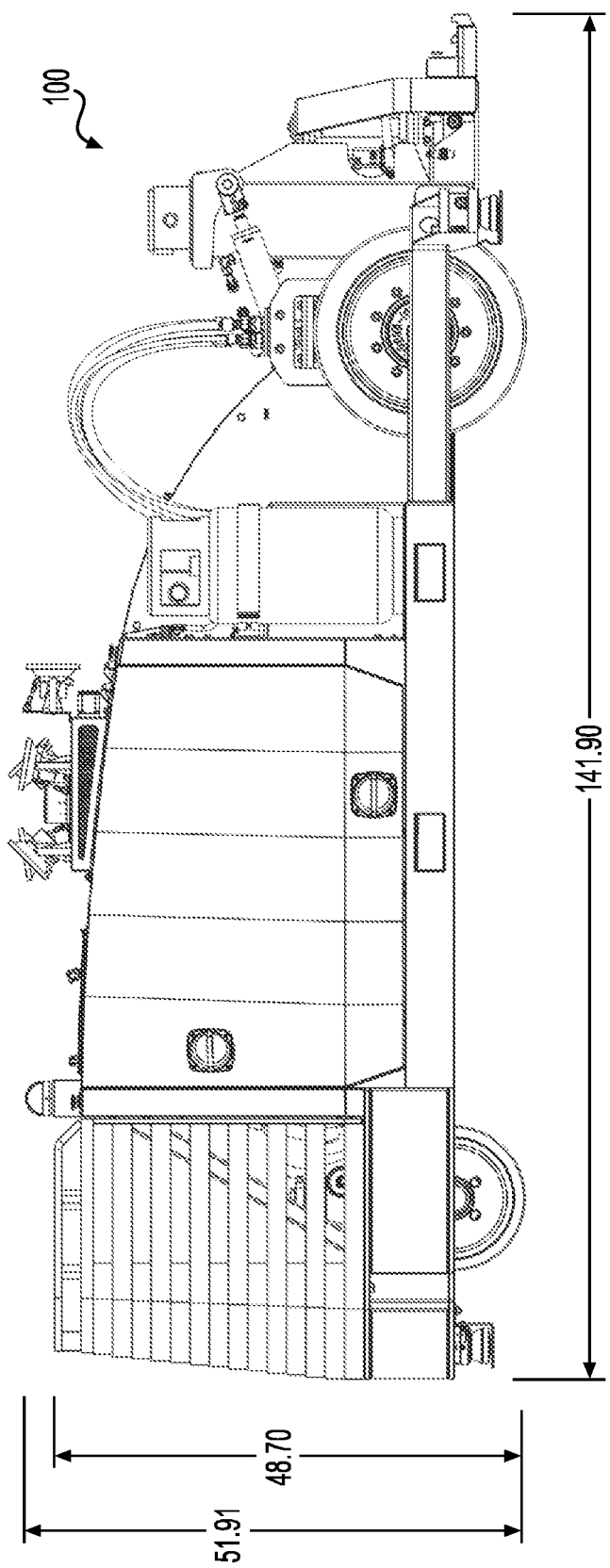
Figure 6:
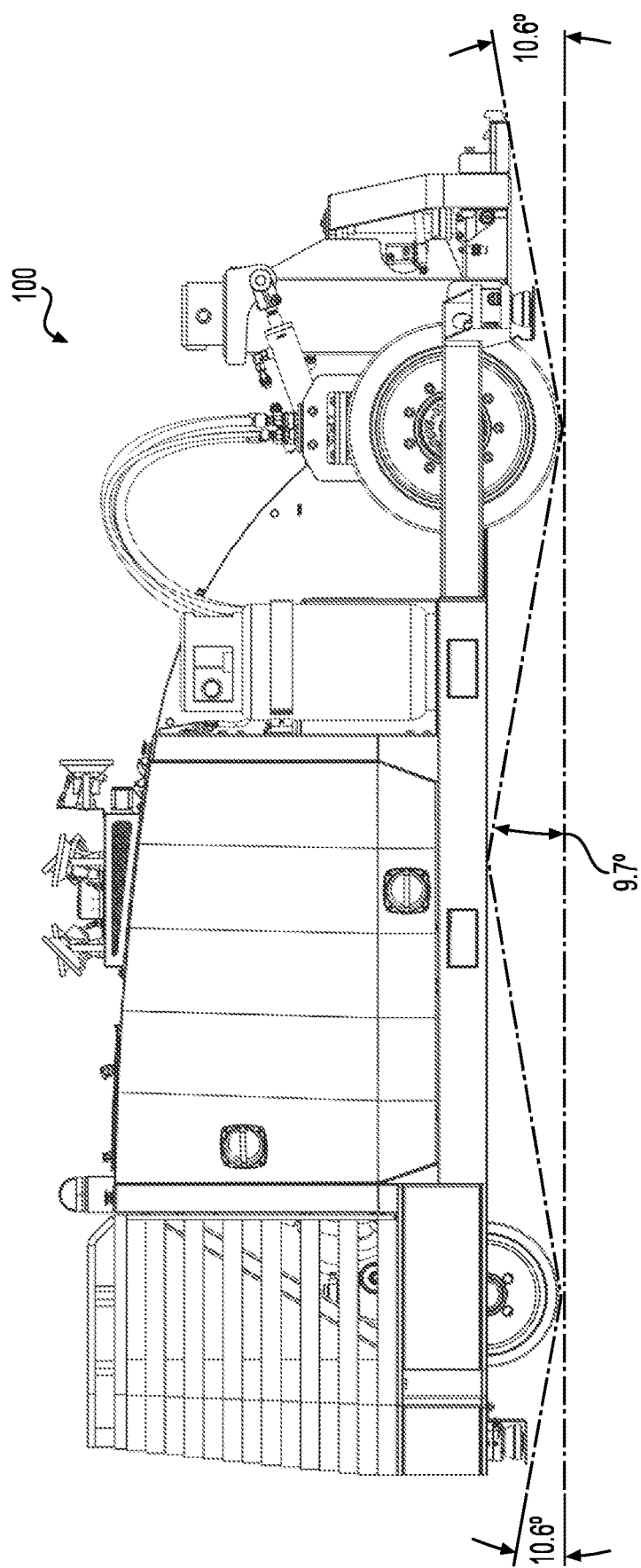
FIG. 6 depicts a side view of the ACR showing depart and breakover angles.

FIGS. 5A and 5B depict rear and side views of ACR 100 showing various preferable overall dimensions in inches. FIG. 6 depicts a side view of ACR 100 showing the approach depart and breakover angles.

Figure 7A:
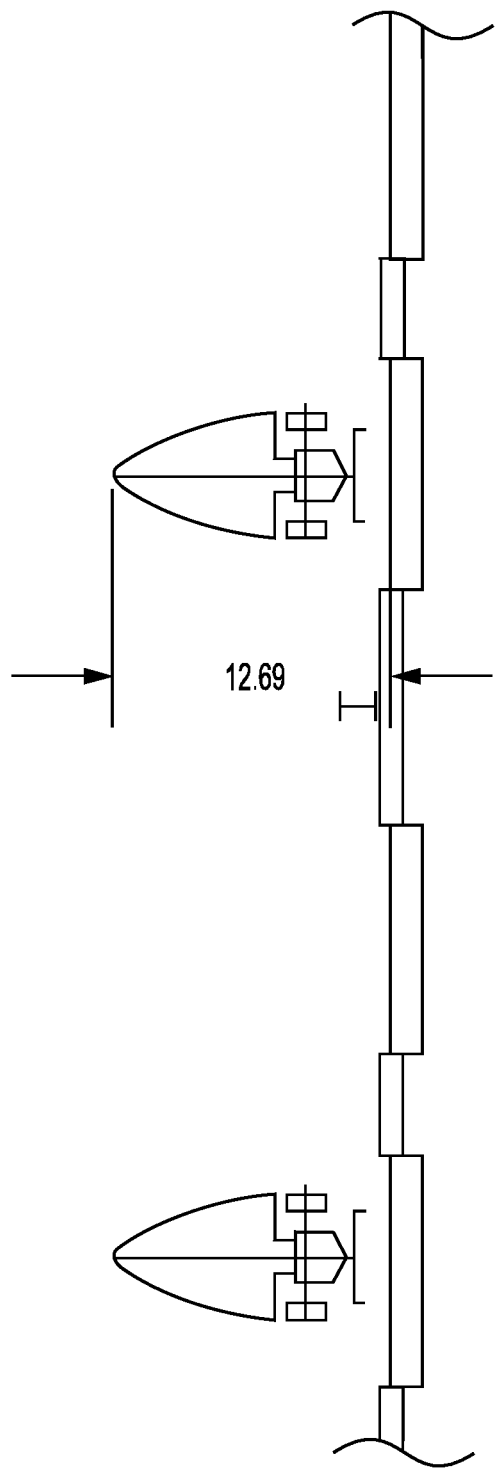
FIGS. 7A-7D depict the steps used by the ACR to move between doors of a cross-dock.
Figure 7B:
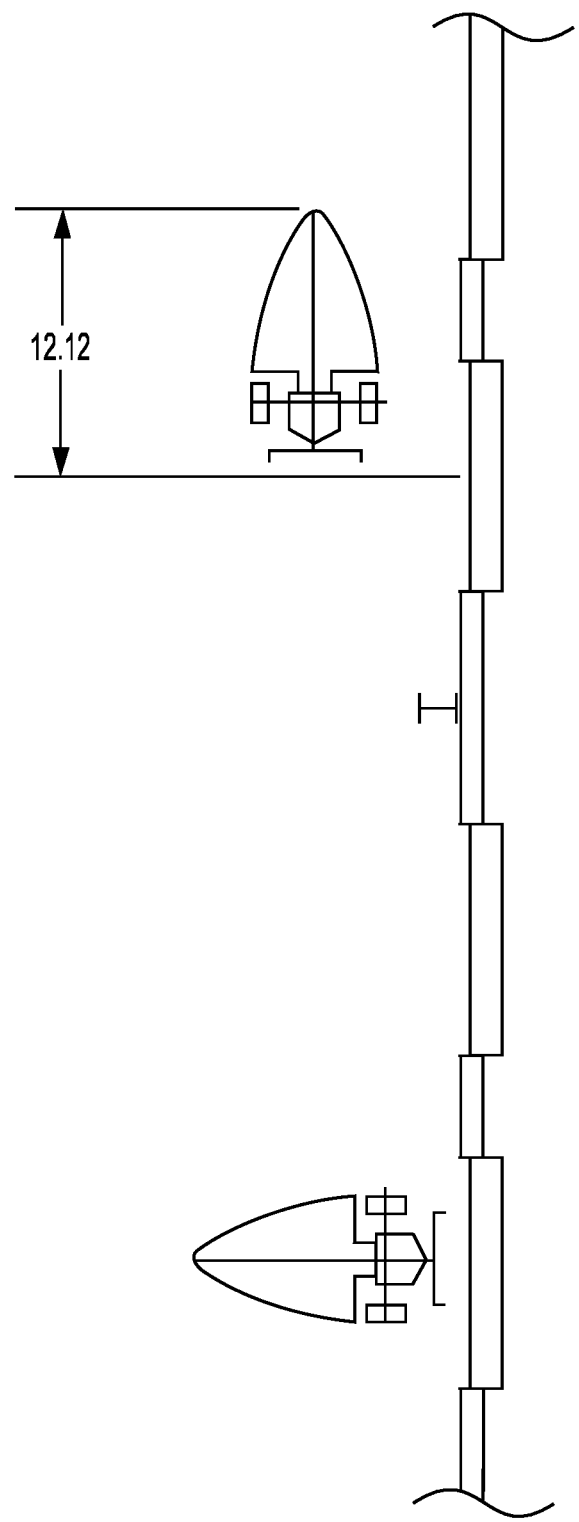
Figure 7C:
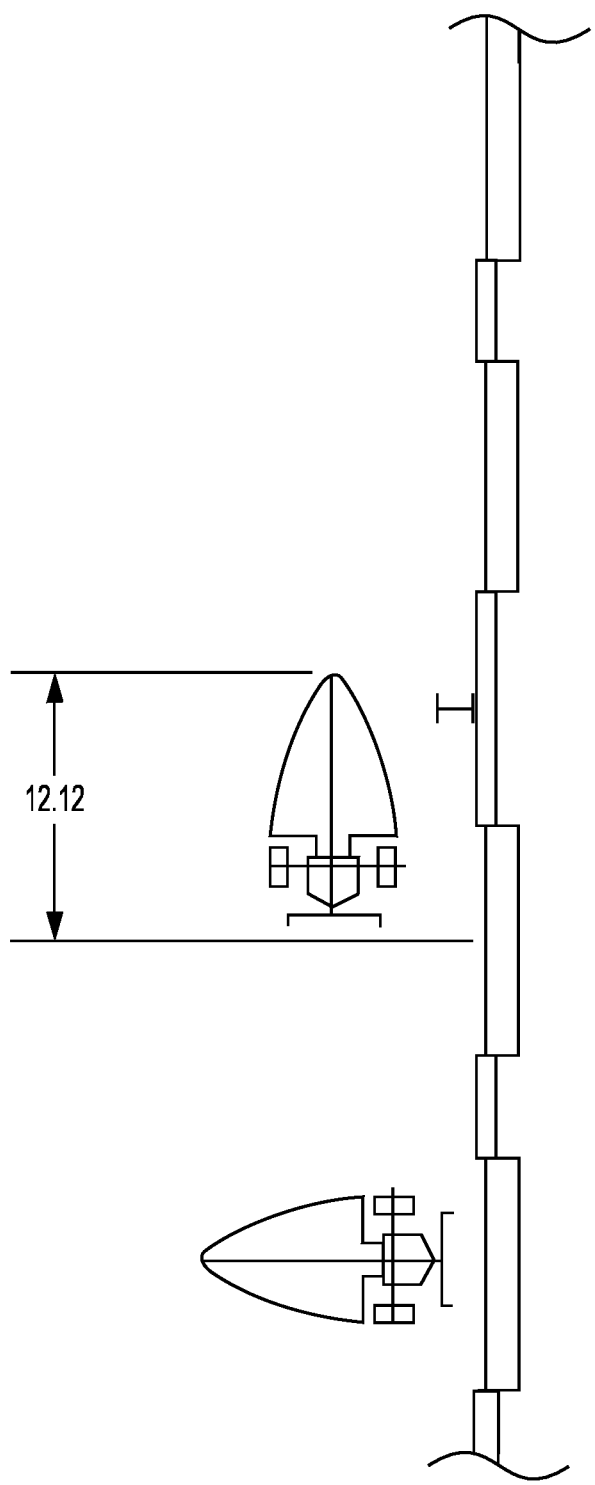
Figure 7D:
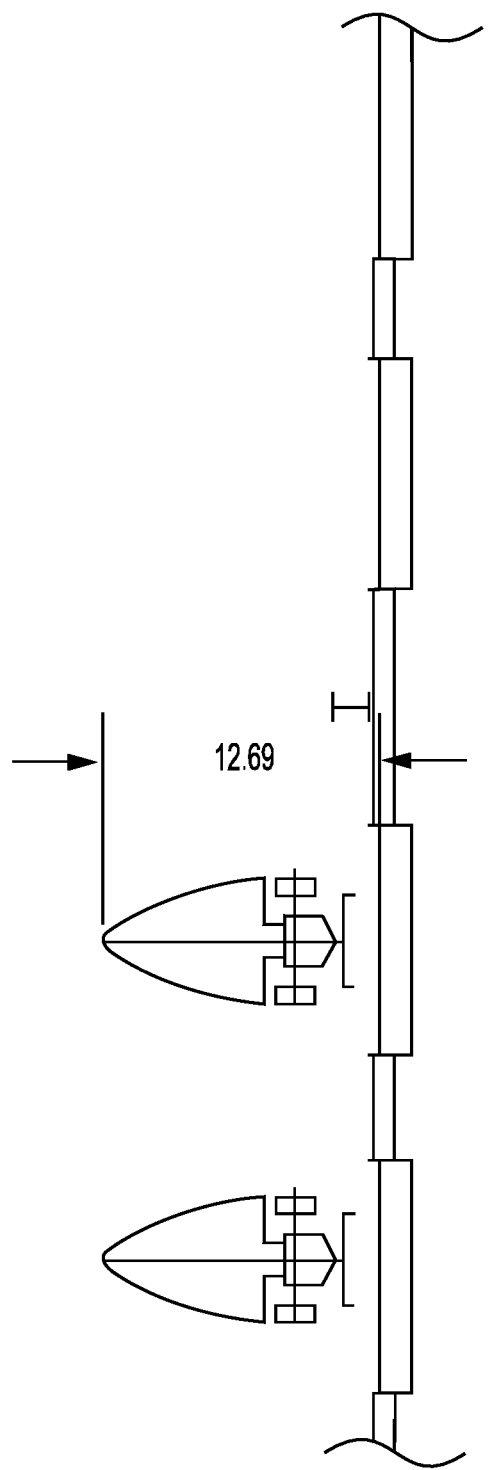

As previously discussed, ACR 100 is capable of operating in a variety of steering modes. FIGS. 7A-7D depict the process used by ACR 100 to move between loading dock doors utilizing two wheel steering by front drive assembly 104. First, the front wheel of front drive assembly 104 is positioned straight ahead and the rear drive assembly 108 is turned to the tightest turning radius. Rear drive assembly 108 is then actuated until ACR 100 is positioned 900 with respect to the dock doors as depicted in FIG. 7B. The rear drive assembly 108 is straightened and ACR moves to the next scheduled door as depicted in 7C. The ACR then rotates to engage the MP at the door as depicted in FIG. 7D. Using this method, the ACR can quickly drop off a first MP and then move to a second MP while wasting minimal power.

Figure 8:
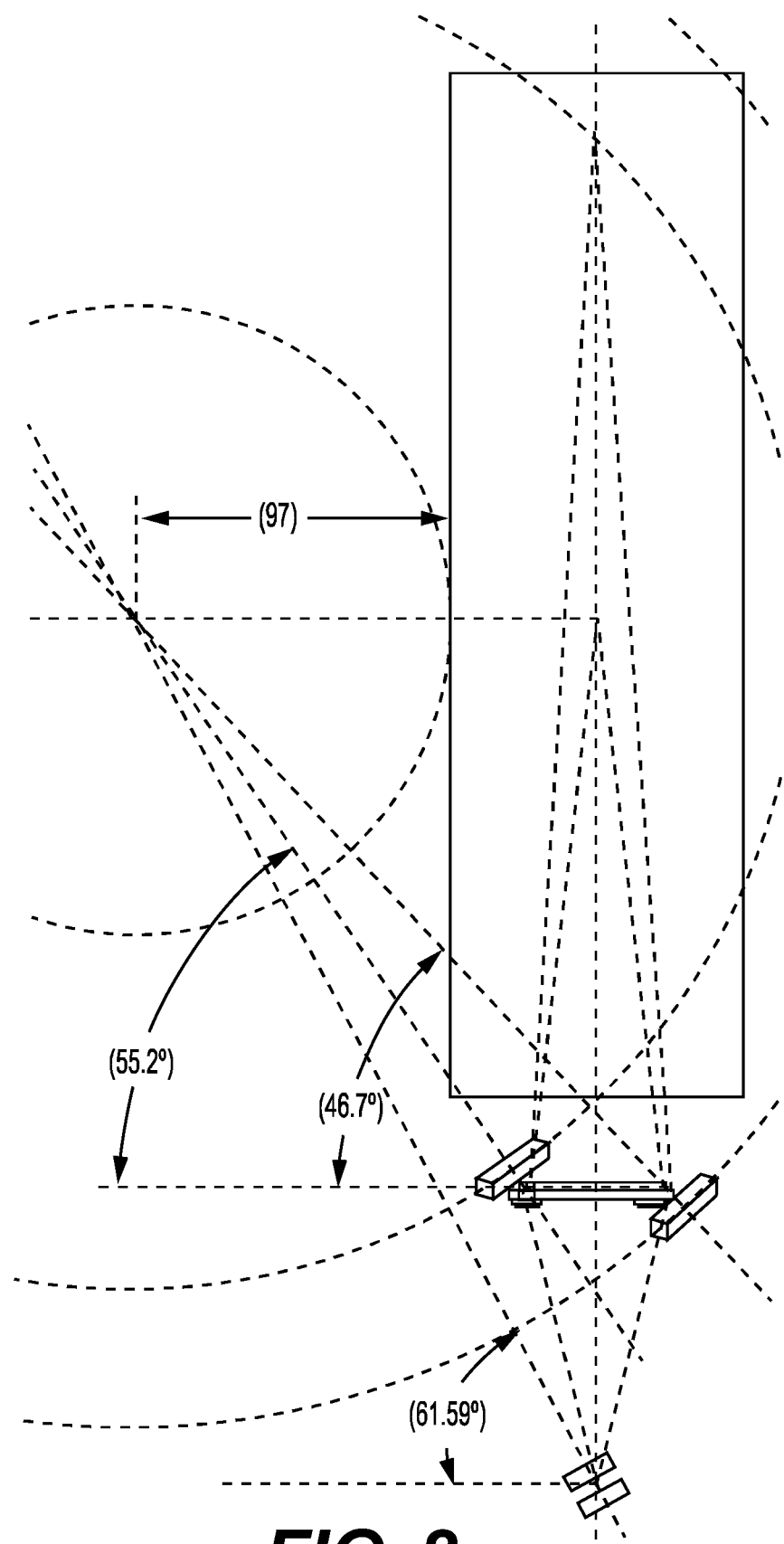
FIG. 8 depicts the Ackerman steering turning radius of the ACR.

In certain instances Ackerman steering may be utilized by ACR 100 while conveying an MP. When an MP is coupled to ACR 100, the MP rollers are the rear axle of the coupled system. The maximum turning radius in this situation can be achieved by rotating the front drive assembly 104 and the rear drive assembly 108 in the same direction so that Ackerman steering can be executed as depicted in FIG. 8. Ackerman steering maximizes the steering force of ACR 100 because the tire reaction force is perpendicular to the pivot point. Ackerman steering is particularly well suited for lower speed maneuvers (e.g. under 1 mph) where minimal wheel slip can be maintained.

Counterweight Assembly 114

Figure 9A:
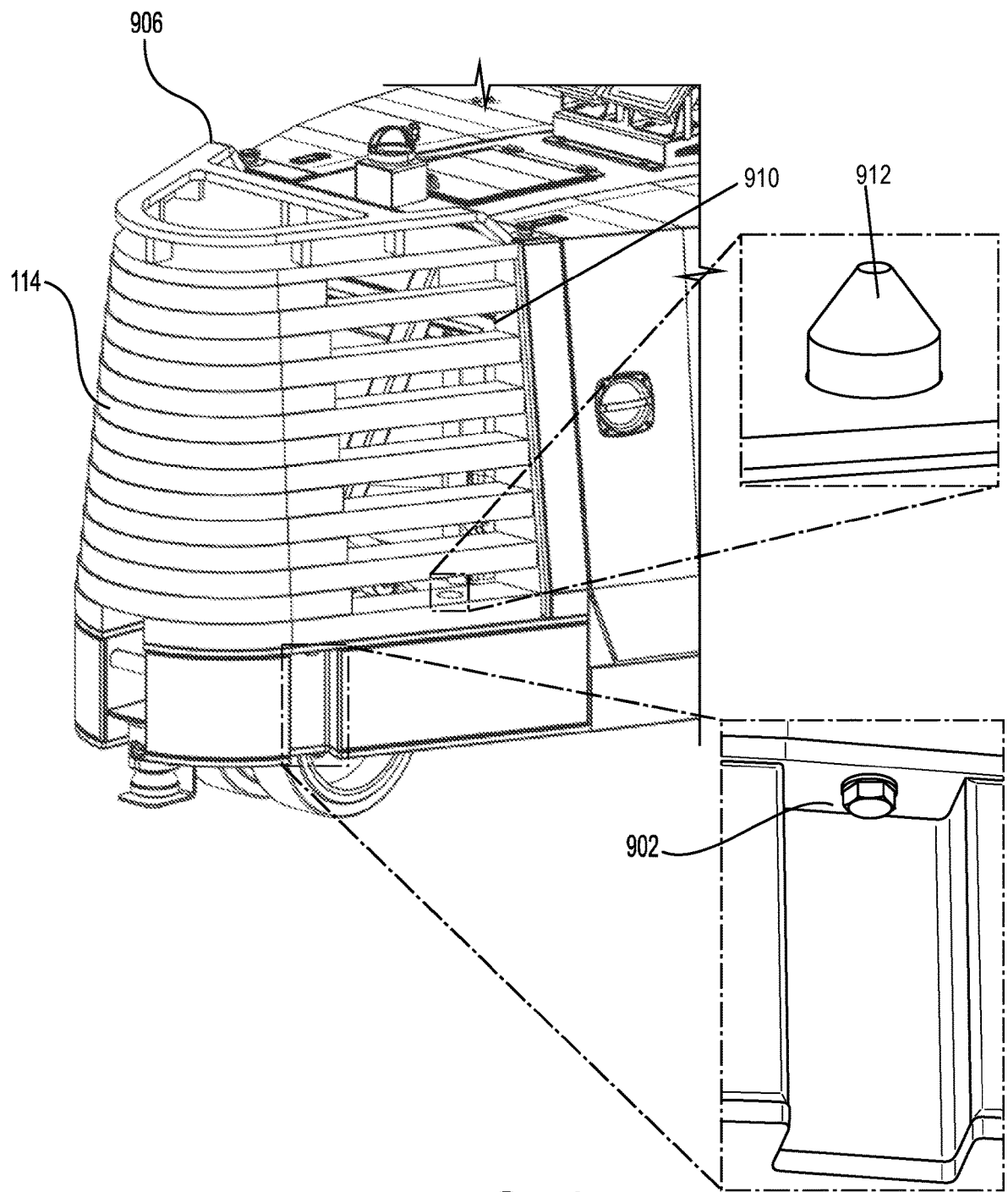
FIGS. 9A-9C depict the counterweight in isolation.
Figure 9B:
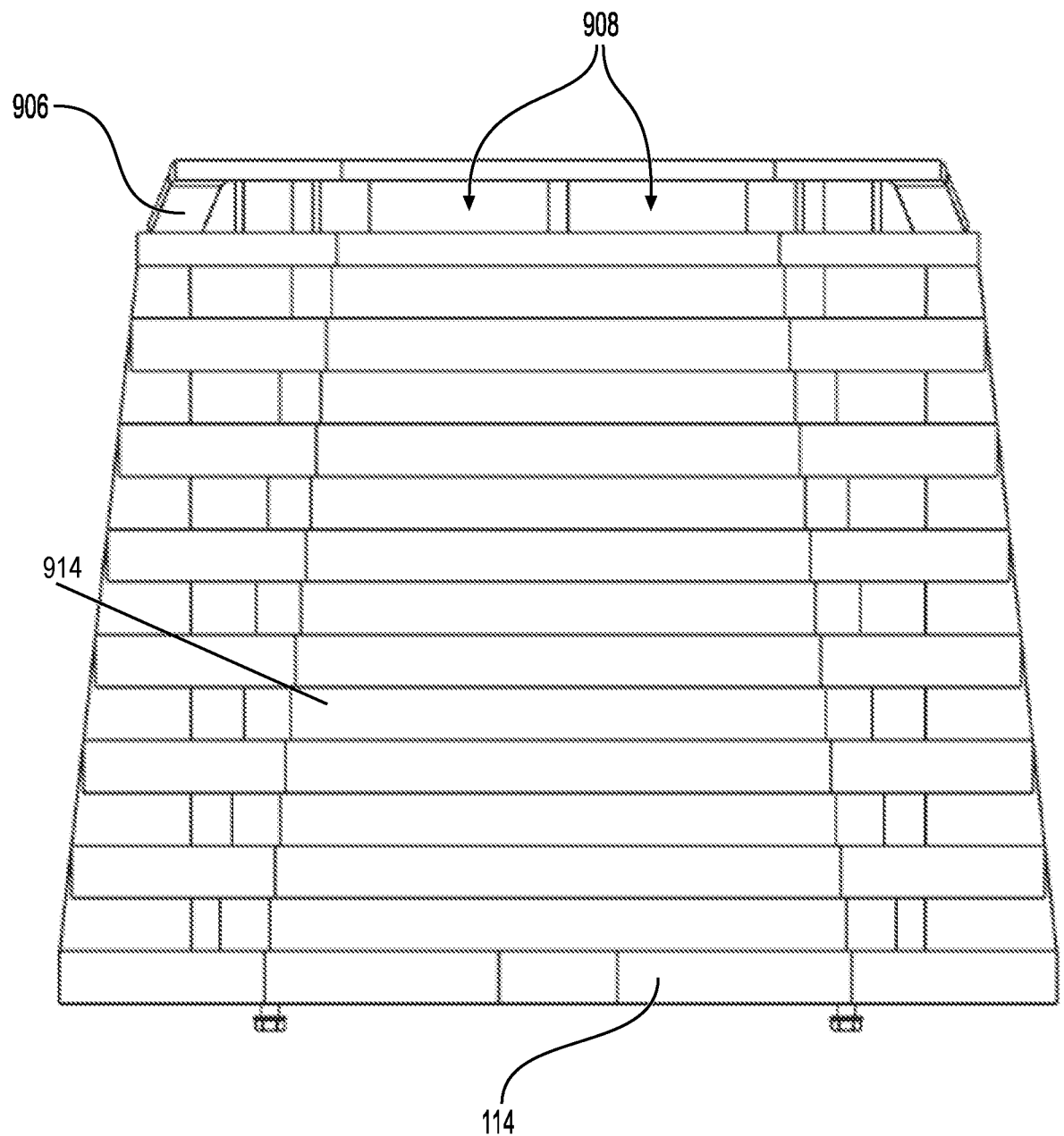
Figure 9C:
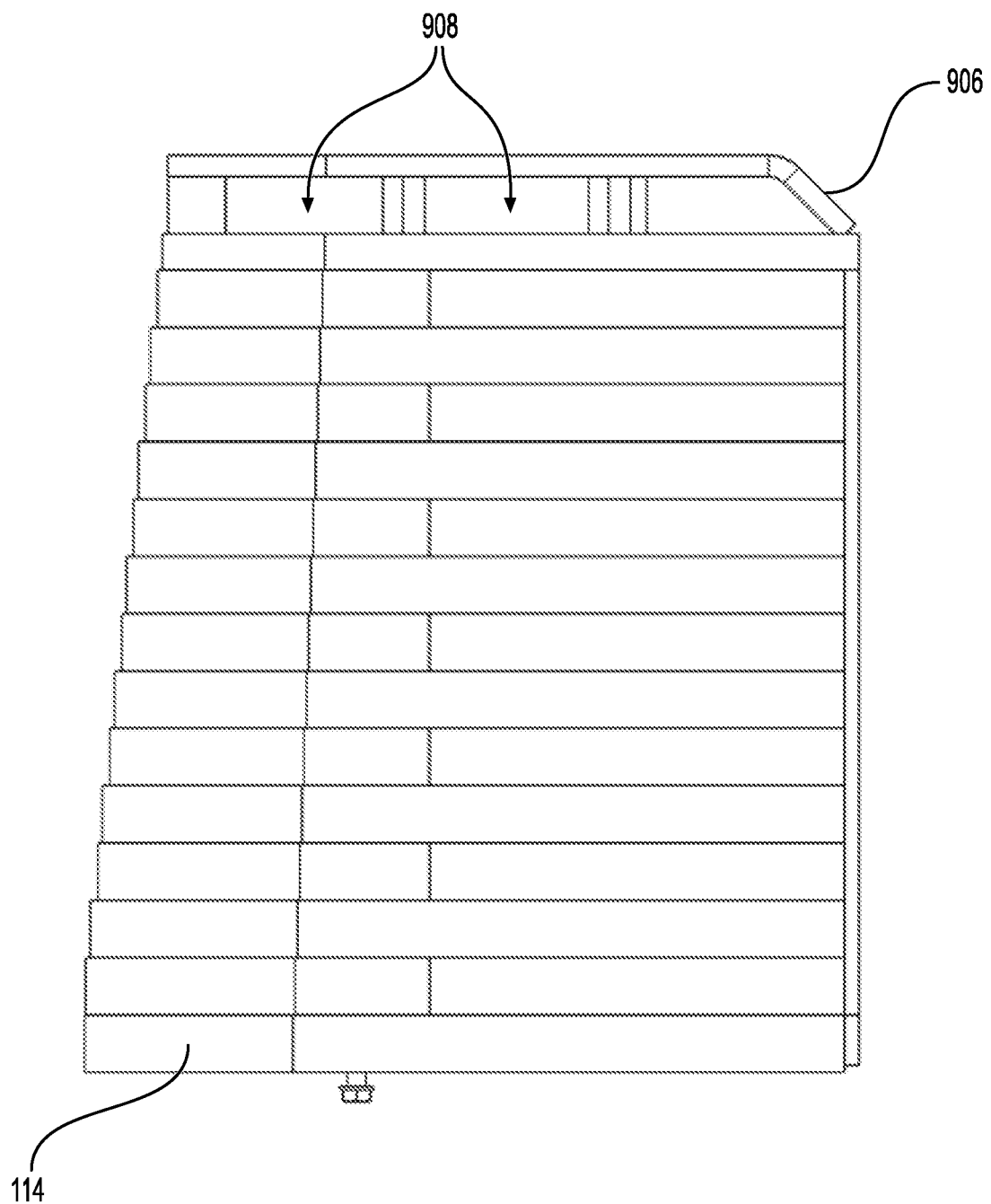

Referring next to FIGS. 9A-9C, depicted are perspective, front, and side views of counterweight assembly 114, respectively. Counterweight assembly 114 is positioned at the machine rear of ACR 100 and provides counterbalance weight for ACR 100 when an MP is being conveyed. Preferably, the majority of the weight in counter balance assembly 114 is positioned over or around rear wheel assembly 108 to provide traction and balance.

Preferably, counterweight assembly 114 weighs approximately 2,000 lbs. and is secured to main frame 106 by one or more bolts 902. A pair of openings 904 on each side of counterweight assembly 114 mate with alignment pins affixed to a top surface of main frame 106. The upper portion of counterweight assembly 114 comprises a rail 906 having forklift pockets 908 which allow the counterweight assembly to be lifted from ACR 100 from either the side or rear. Further, counterweight assembly 114 comprises a plurality of vent openings 910 which allow airflow to oil cooler 136 and other internal components of ACR 100. Counterweight assembly 114 preferably has a fully solid rear portion 914 with no openings where the majority of the weight is concentrated to provide maximum counterbalance.

Main Frame 106

Figure 10:
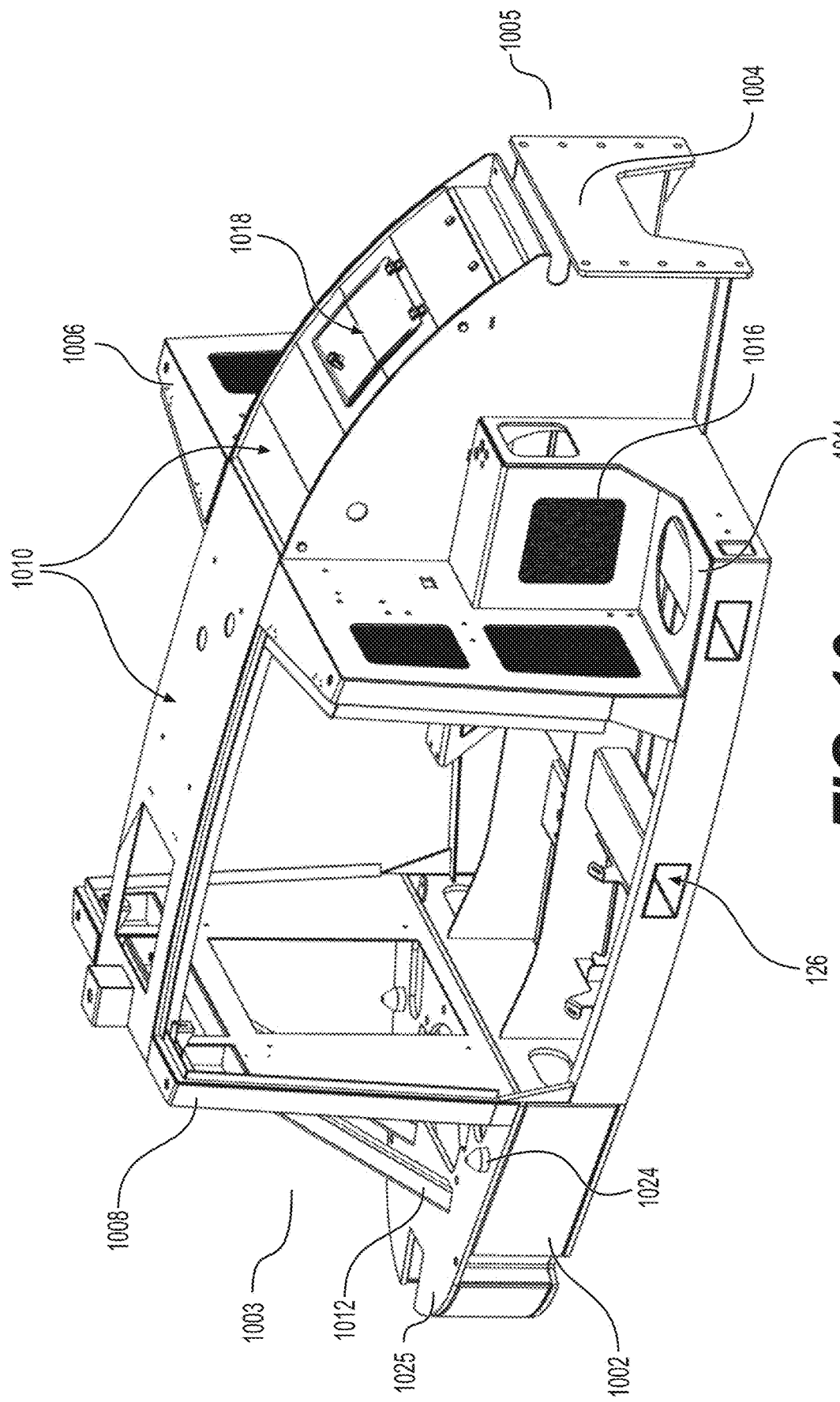
FIGS. 10-11 depict the main frame in isolation.
Figure 11:
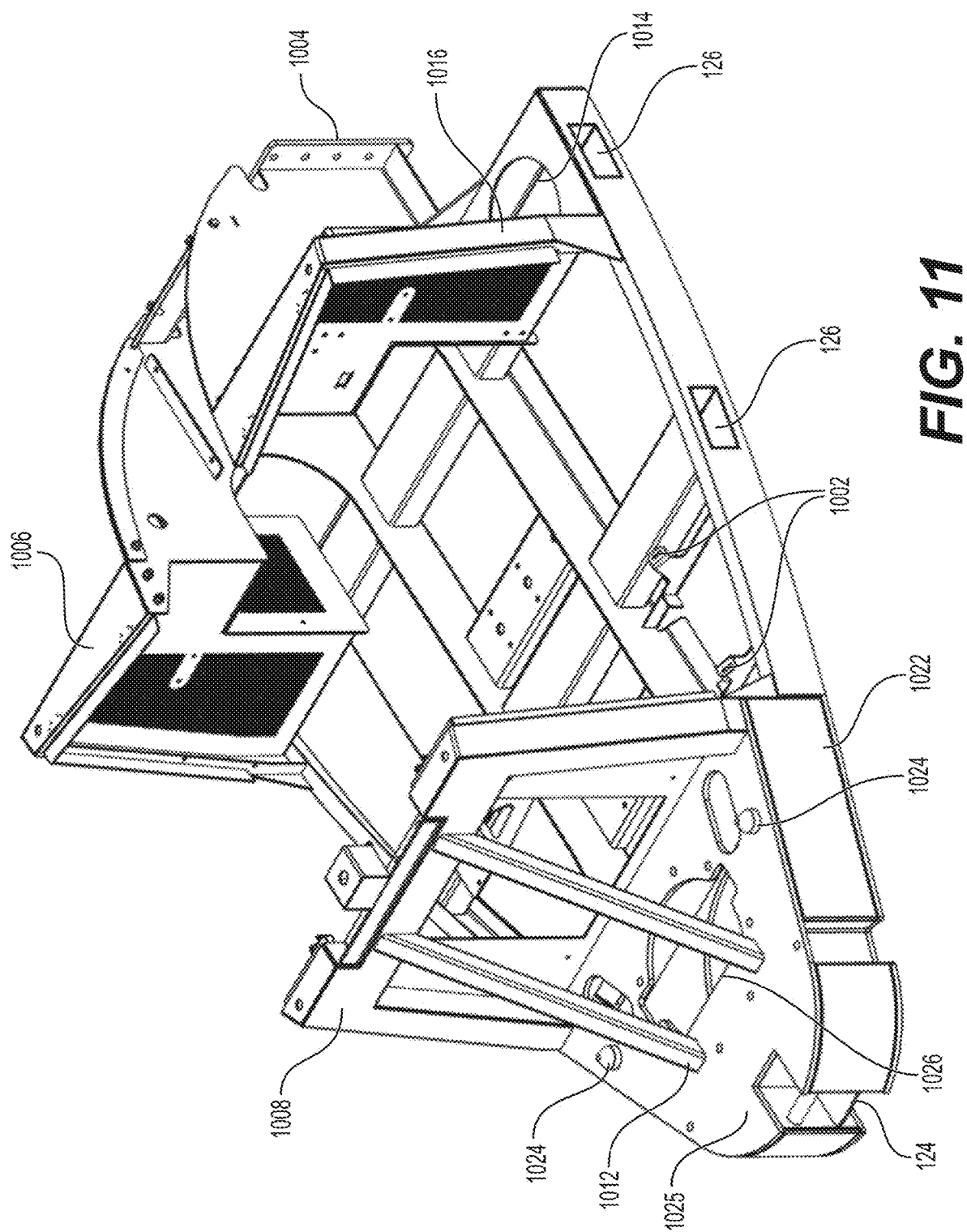

Main frame 106 is depicted in isolation in FIG. 10 comprising base 1002, axle mount plate 1004, front support 1006, rear support 1008, removable center sections 1010, and angled supports 1012. FIG. 11 depicts main frame 106 with removable center sections 1010 fully removed. As previously discussed, base 1002 comprises two through channels which function as forklift pockets 126. Preferably, forklift pockets 126 are formed by 6"×3"×⅛" metal tubes to accommodate the tines of a standard forklift. The majority of main frame 106 is preferably formed from 3⁄16" thick plate grade 50 steel. Removable center sections 1010 allows for easy installation of the power components (engine 134, pump stack 144, etc.) during vehicle assembly and overhaul.

Base (main frame) 1002 further comprises tank openings 1014 which are sized to accommodate tanks 128. Tanks 128 may further be coupled to base 1002 via retention straps or other means as depicted in FIGS. 1 and 2. Front drive assembly 104 is directly coupled to axle mount plate 1004 utilizing a plurality of bolts at a front end 1005 of base 1002. This simple and straightforward connection allows the entire front drive assembly 104 to be easily removed from ACR 100 if needed.

A plurality of engine supports 1022 are coupled to base 1002 and support engine 134 above the base 1002. The rear end 1003 of base 1002 comprises two projections 1024 on top surface 1025 which mate with openings 904 to facilitate the correct positioning of counterweight assembly 114.

Front support 1006 comprises a plurality of screened openings 1016 which provide airflow to the interior of ACR 100. The removable center sections 1010 comprise a hydraulic tank access 1018 adjacent hydraulic tank 142 and an engine access 1020 adjacent engine 134.

FIG. 11 depicts rear drive opening 1026 to which front drive assembly 104 is coupled. Angled supports 1012 help to protect front drive assembly 104 during placement of counterweight assembly 114 while also reinforcing the overall structure of main frame 106.

Access Panels 132

Figure 12B:
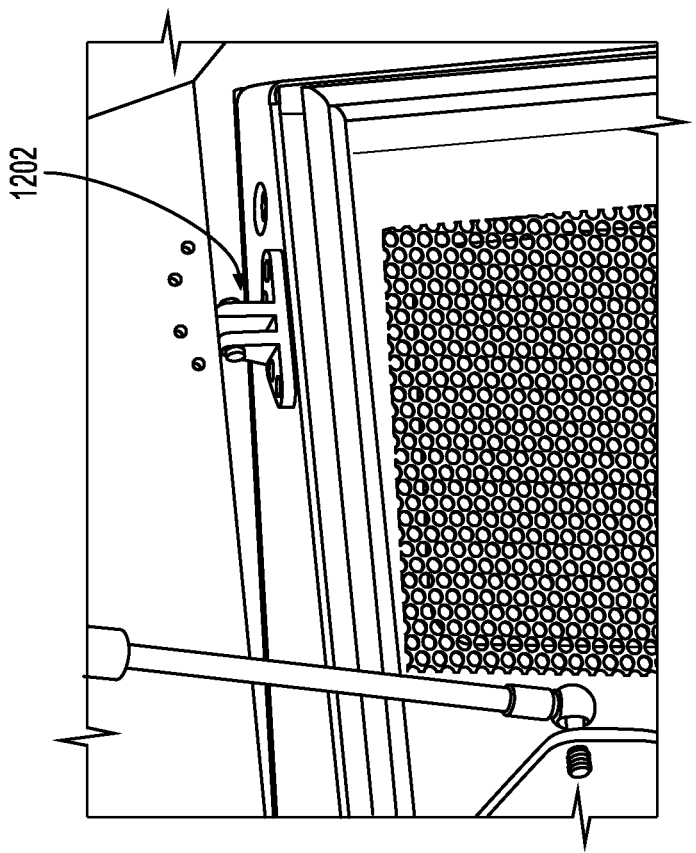
FIGS. 12A-12B depict the access panels in isolation.
Figure 12A:
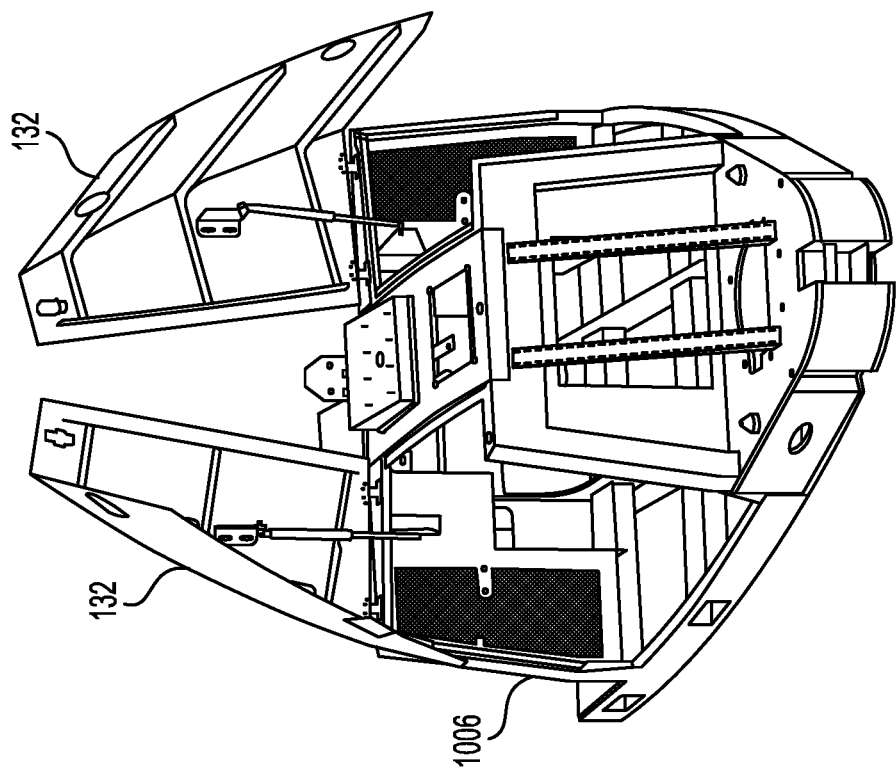

FIGS. 12A and 12B depict access panels 132 in an open position with respect to main frame 106. As shown, each access panel 132 is coupled to an upper surface of front support 1006 via two quick disconnect hinges 1202. Gas springs 1204 coupled to the underside of access panels 132 maintain access panels 132 in the open position. Preferably, the portion of access panel 132 that contacts front support 1006 is surrounded by a round bulb seal 1206 to provide a door seal. Access panels 132 can be decoupled from ACR 100 by removing one end of gas spring 1204 from front support 1006 and pressing down to unhook the access panel 132 from quick disconnect hinges 1202.

Referring next to FIGS. 13A and 13B, the sides of access panel 132 may comprise one or more handles 1208 for opening and closing. A lockable latch 1210 may also be installed adjacent rear support 1008 to maintain access panel 132 in the closed and sealed position. Hydraulic tank access 1018 and engine access 1020 may also be outfitted with a turn latch 1212 for preventing accidental opening of the accesses.

Rear Drive Assembly 108

Figure 14:
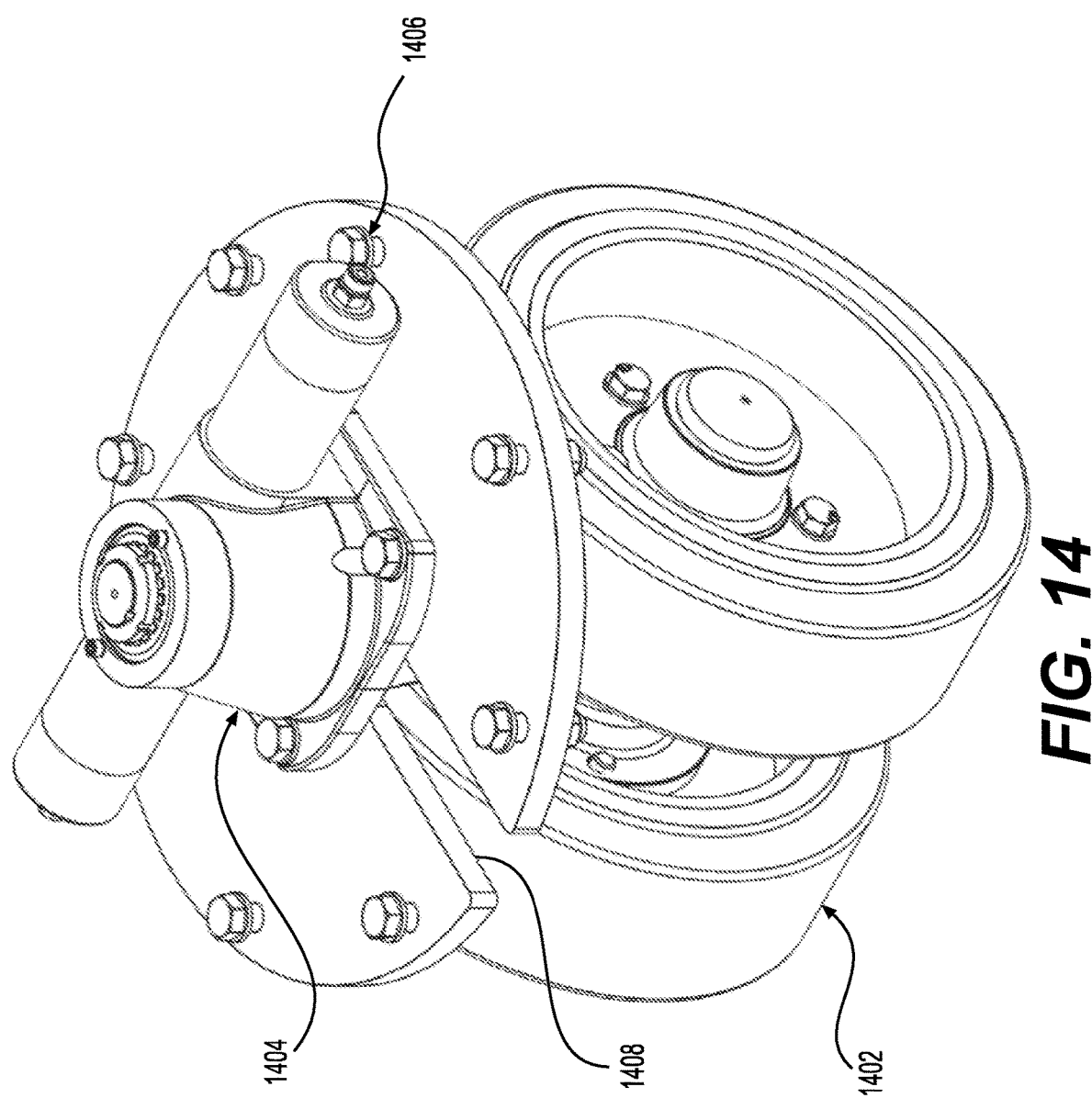
FIGS. 14-16 depict the rear drive assembly in isolation.
Figure 15:
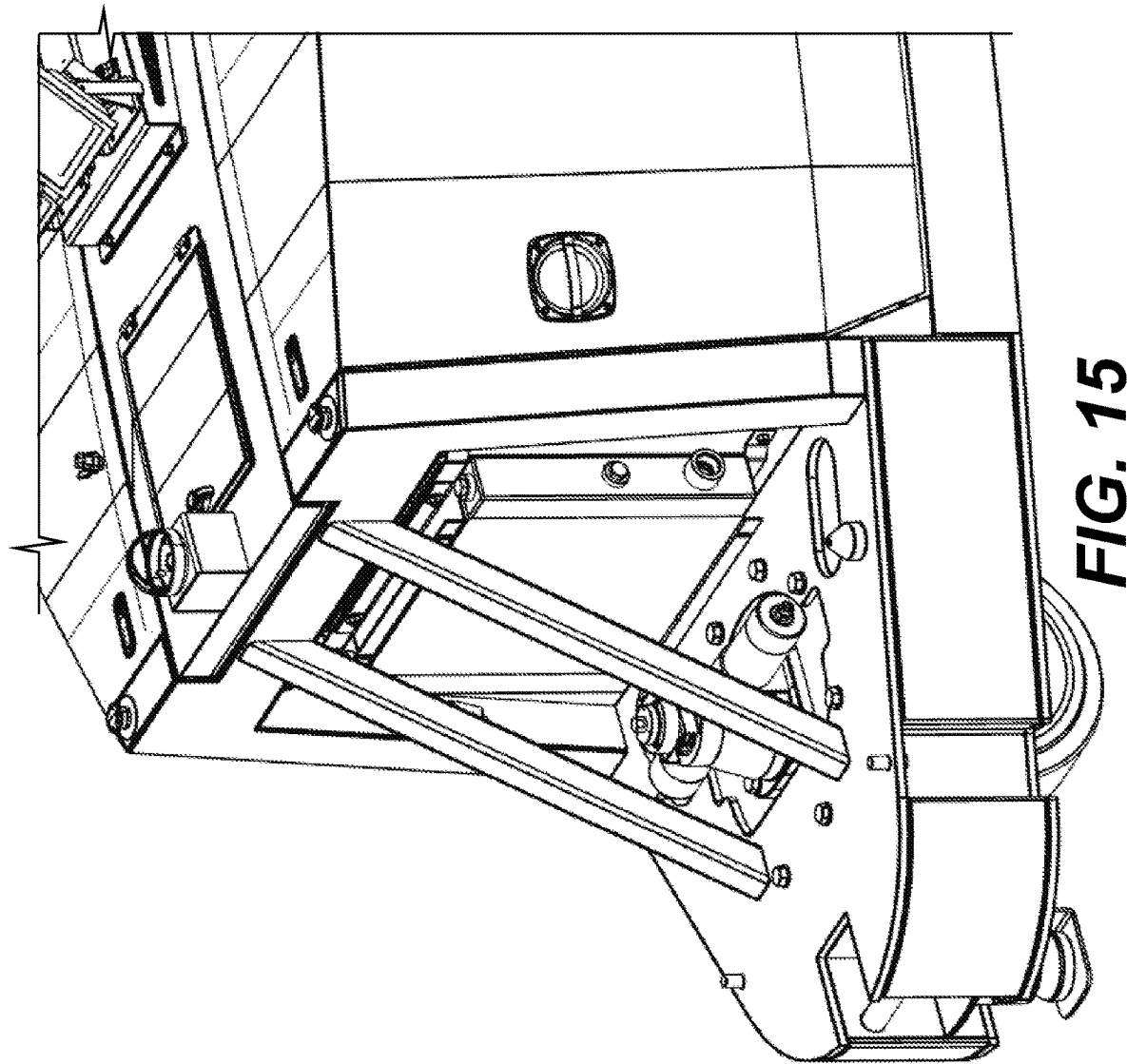

FIG. 14 depicts rear drive assembly 108 in isolation. Rear drive assembly 108 comprises rear wheels 1402, steering unit 1404, and mounting plate 1406. The rear drive assembly is coupled to rear drive opening 1026 through the bottom of base 1002 and is bolted in place as depicted in FIG. 15. The steering unit 1404 can then be coupled to power system 110 to turn rear wheels 1402.

Preferably, steering unit 1404 is a Bonfiglioli steering unit for double rear wheels capable of turning left and right up to 85° from center. Rear wheels 1402 preferably have a 15" outer diameter, an 11.25" inner diameter, and a 5" width.

Figure 16:
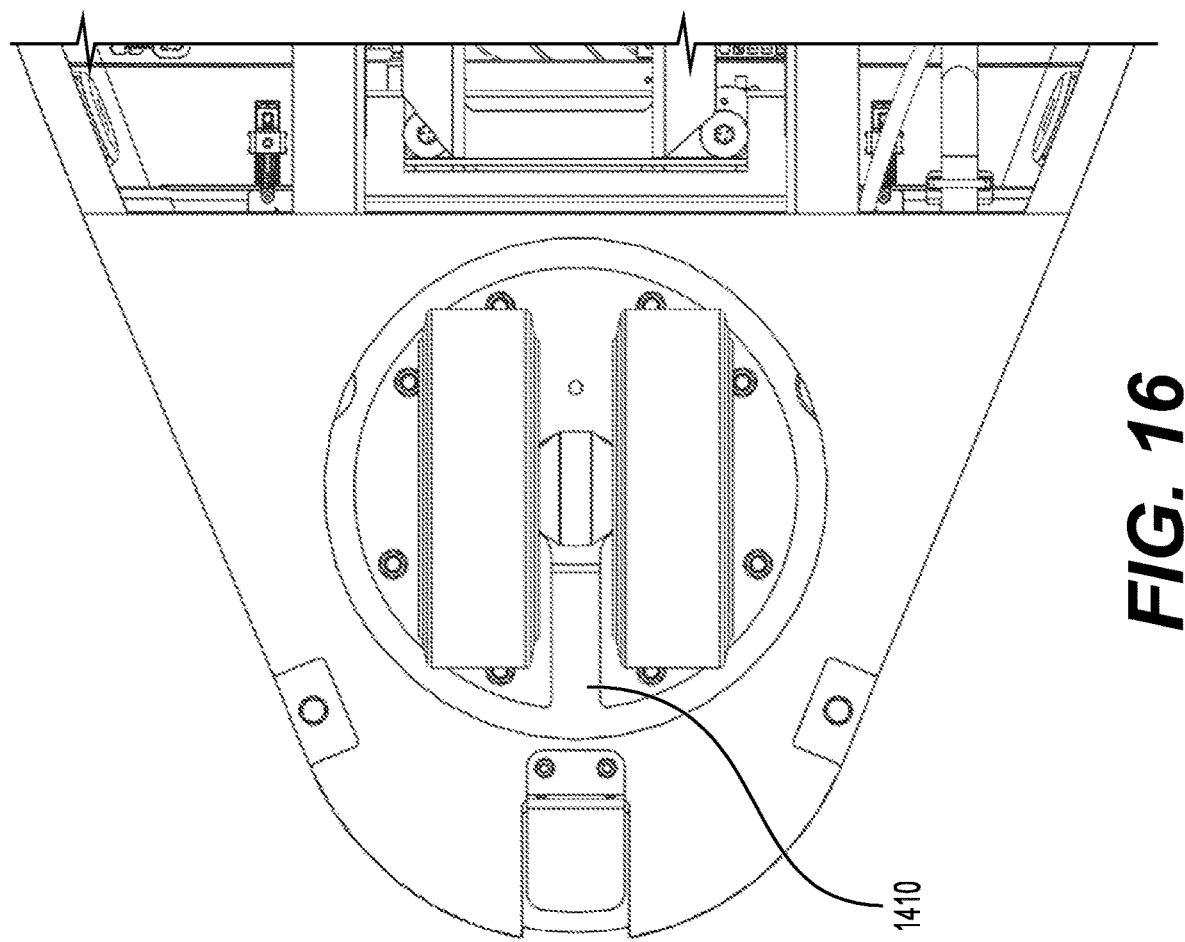

Mounting plate 1406 is preferably circular and formed from ¾" plate steel. A front or rear of mounting plate 1406 comprises slot 1408 which mates with a corresponding projection 1410 in main frame 106 as depicted in FIG. 16. This helps to greatly reduce the torque placed on the bolted connection between main frame 106 and rear drive assembly 1408.

Fuel Delivery System

Figure 17:
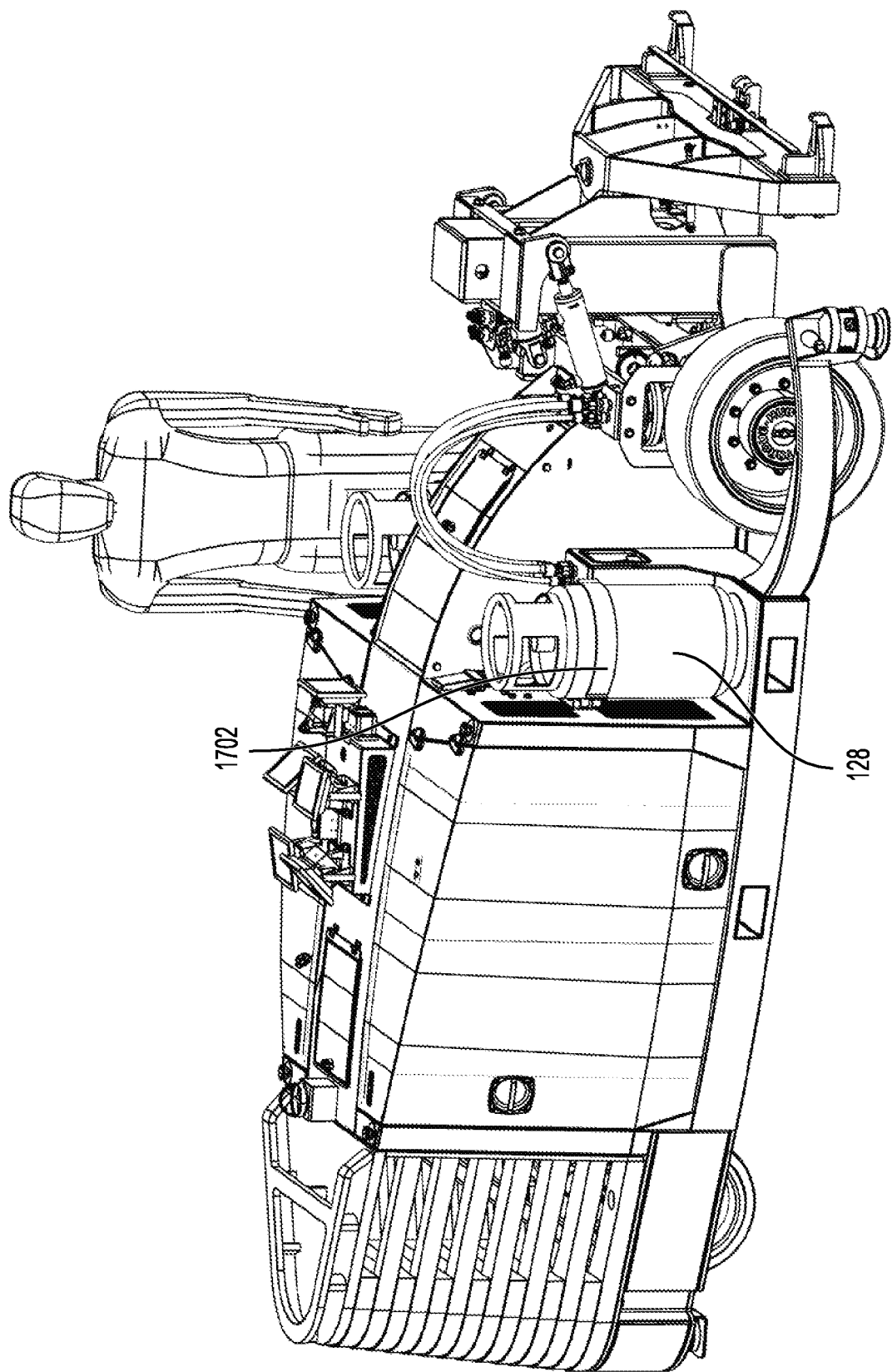
FIGS. 17-18 depict the fuel system.

Fuel tanks 128 are placed in tank openings 1014 and secured to main frame 106 using a tank bracket 1702 as depicted in FIG. 17. This provides a secure attachment while still maintaining easy access to each fuel tank 128.

Figure 18:
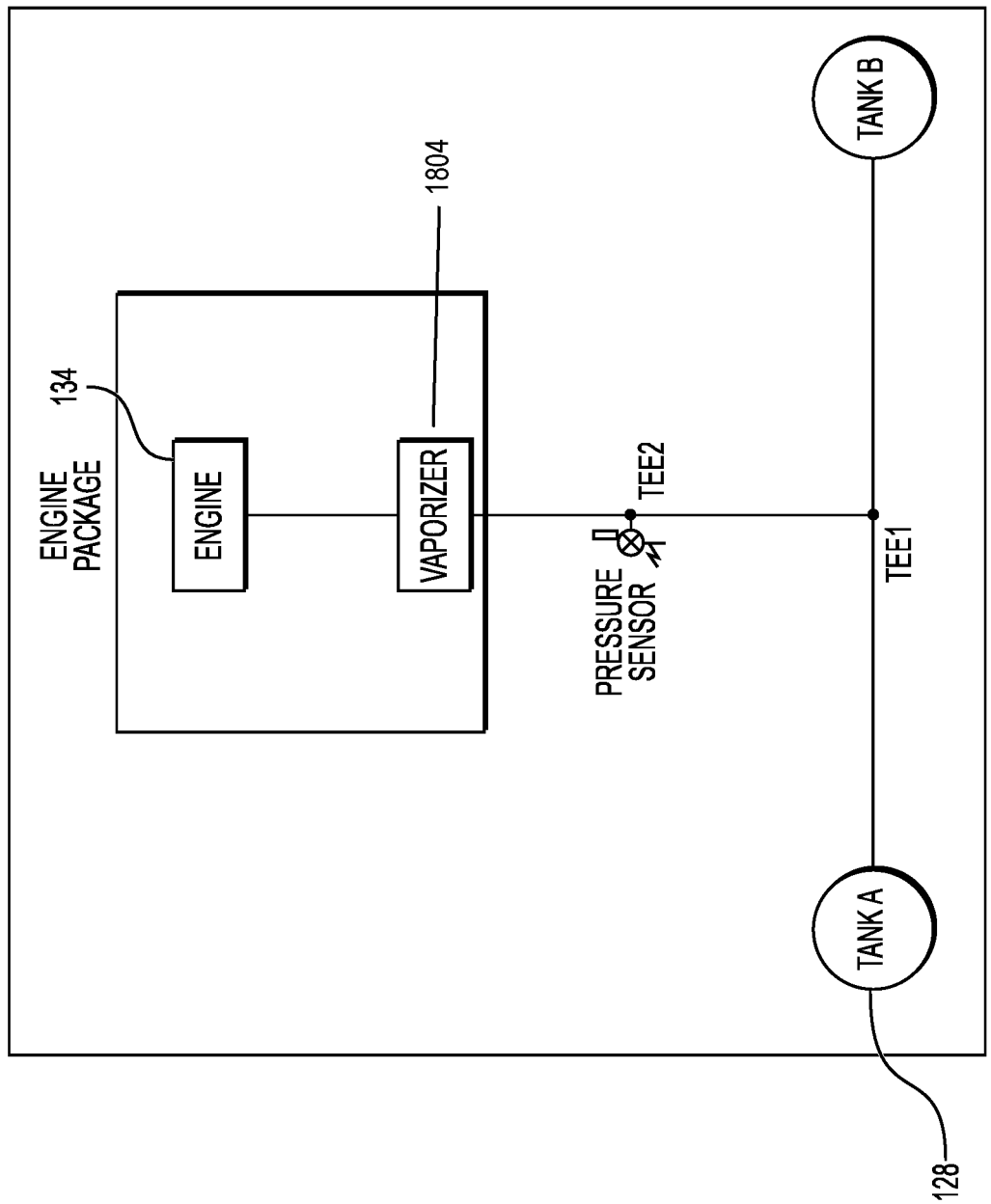

FIG. 18 depicts a schematic of the fuel delivery system. The tanks 128 are each in line with a pressure sensor 1802 in each line. If the fuel is low, an alarm will be initiated letting a user know to switch, refill, or to replace a tank 128. Fuel computation rate data is also archived for further analyzation in order to determine system wear and tear and predict breakdowns. A vaporizer 1804 converts the liquid propane into gas for consumption by engine 134. Each fuel tank 128 may further comprise a fuel lock off in each line. Each tank 128 preferably has a 9.9 gallon capacity, weighs approximately 43.5 lbs., having a height of 33.9" and a diameter of 12.3".

Front Drive Assembly 104

Figure 19A:
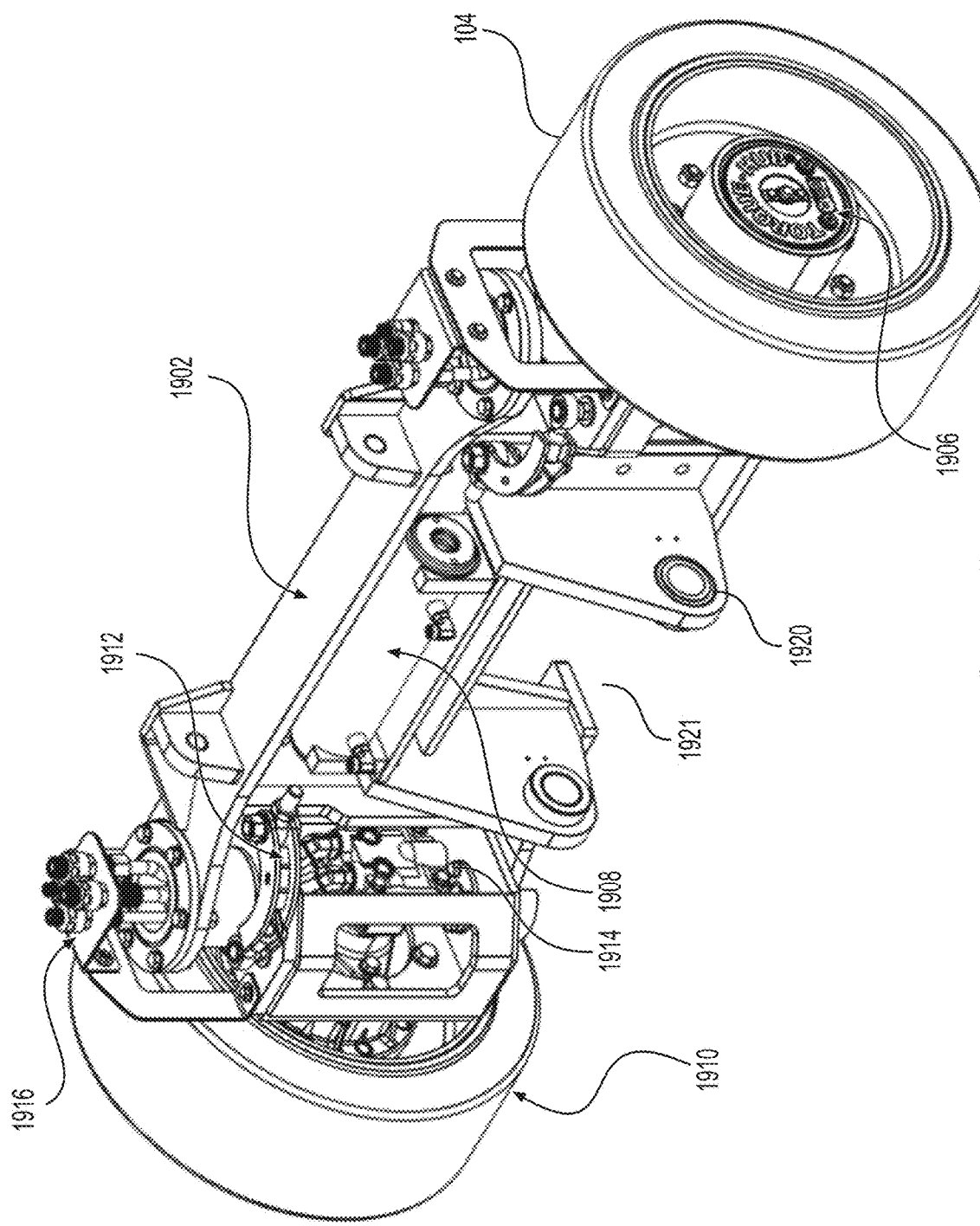
FIGS. 19A-19B depict the front drive assembly in isolation.
Figure 19B:
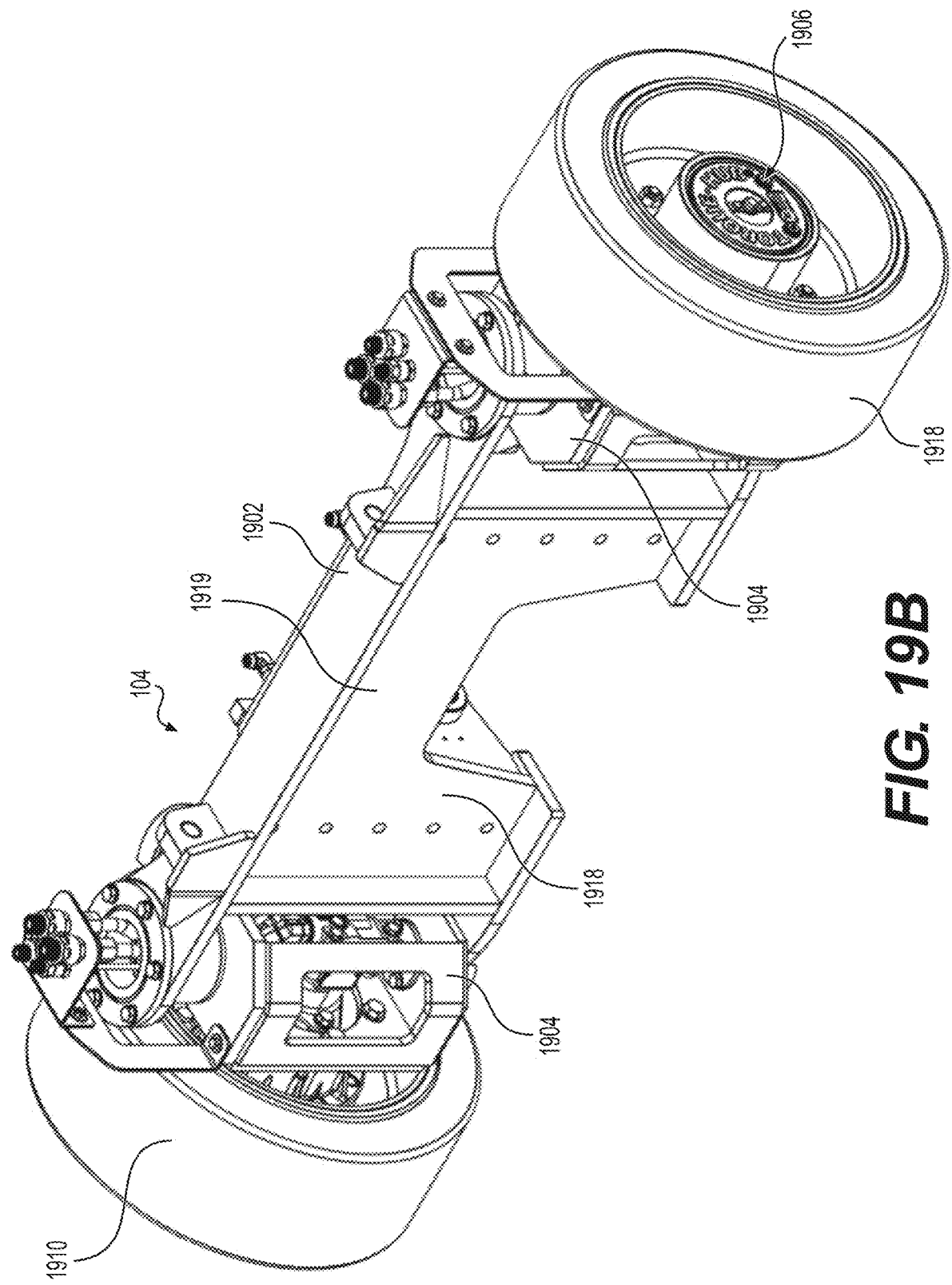

FIG. 19A depicts a front perspective view of front drive assembly 104 and FIG. 19B depicts a rear perspective view of front drive assembly 104. Front drive assembly 104 generally comprises axle weldment 1902, two knuckle weldments 1904, torque hubs 1906, dual acting cylinder 1908, front wheels 1910, steering linkages 1912, hydraulic motors 1914, and swivel adapters 1916. The rear of axle weldment 1902 comprises joint surface 1918 at first end 1919 which couples front drive assembly 104 directly to axle mount plate 1004 via a plurality of bolts. This allows for easy removal or maintenance of front drive assembly 104. For maintenance and/or emergency procedures, the torque hub's 1906 planetary gearing can be quickly disengaged, this allowed for the wheels 1910 to free spin and ACR 100 to be towed.

Figure 20:
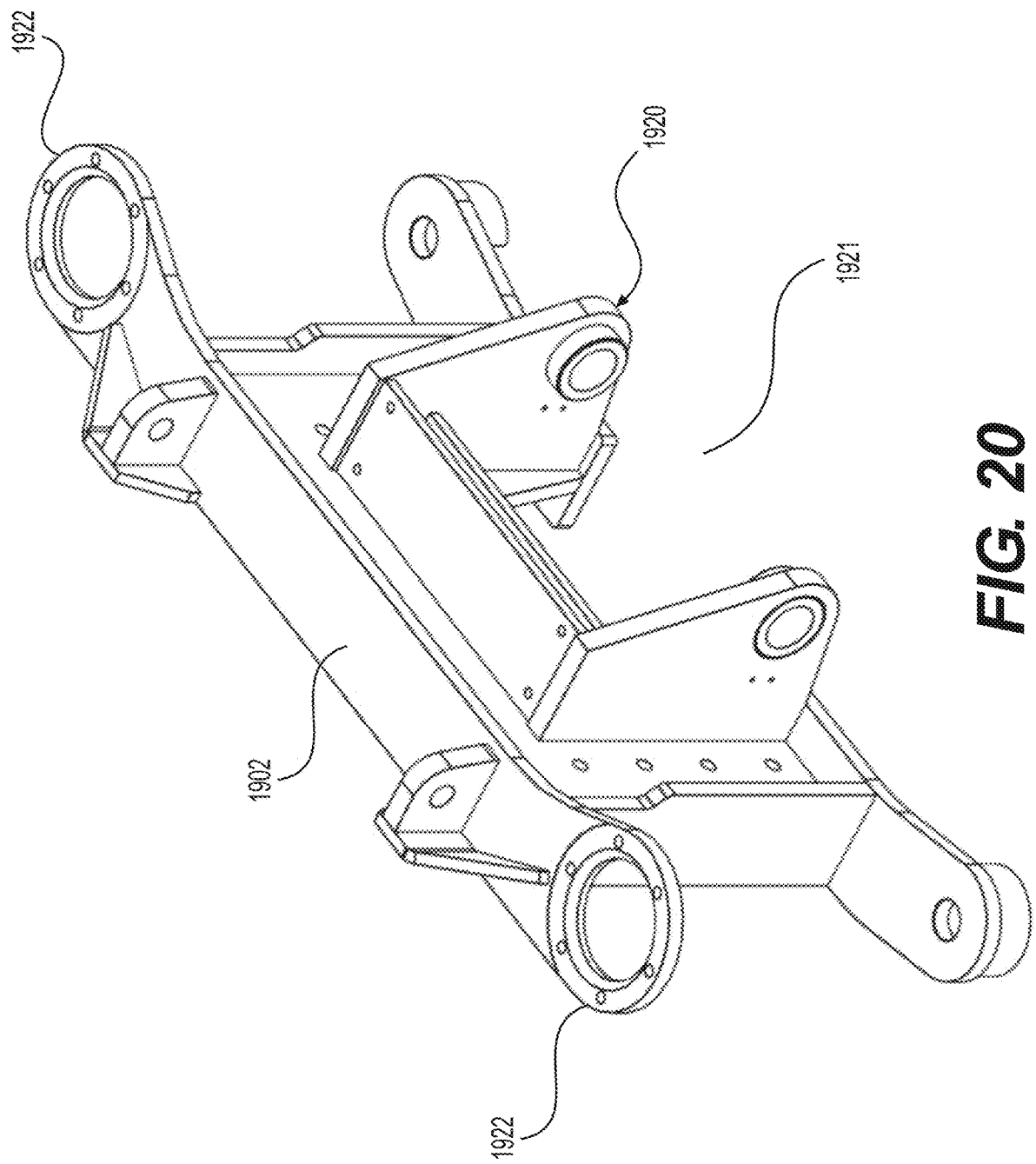
FIG. 20 depicts the axle weldment in isolation.

FIG. 20 depicts axle weldment 1902 in isolation. Axle weldment 1902 further comprises mast plates 1920 extending form a front surface of axle weldment 1902. As will be described later, mast plates 1920 rotatably couple lift carriage 102 to ACR 100 at second end 1921. Each end of axle weldment 1902 comprises knuckle pivots 1922 about which knuckle weldments 1904 are inserted and rotate.

Figure 21:
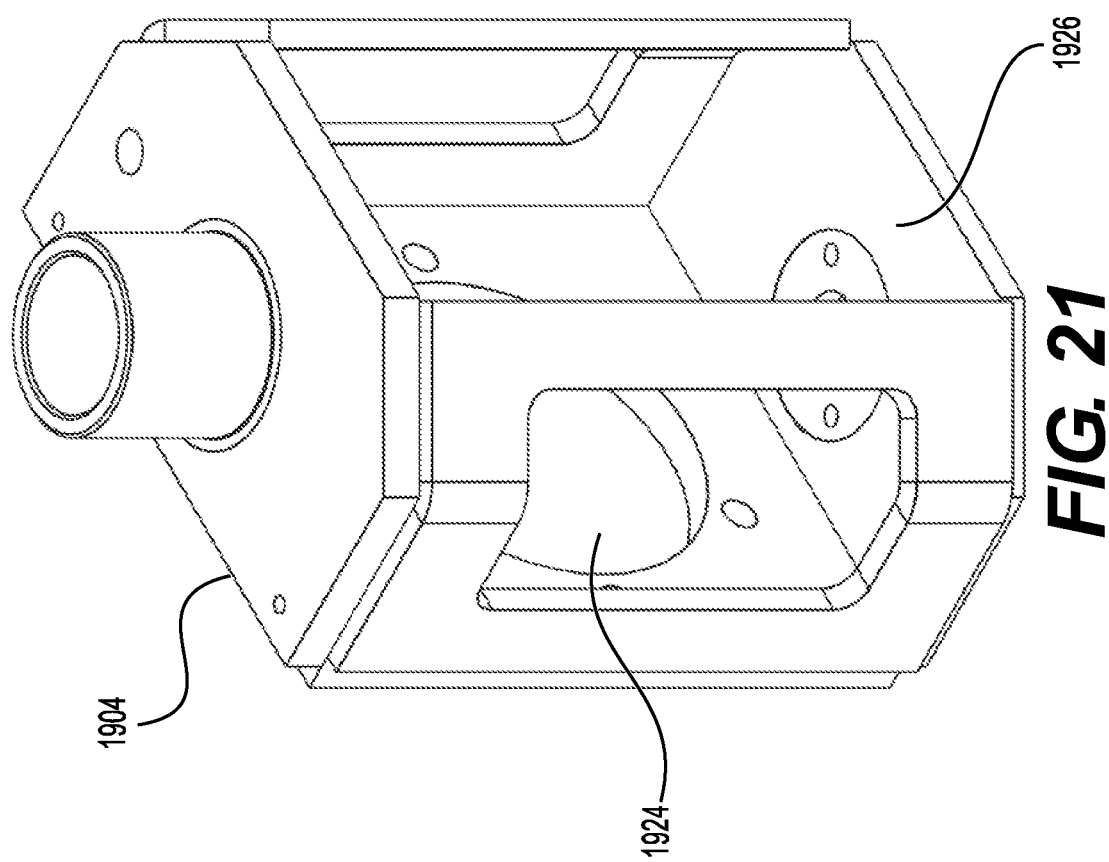
FIG. 21 depicts the knuckle weldment in isolation.

FIG. 21 depicts a view of a single knuckle weldment 1904 in isolation. The interior of knuckle weldment 1904 is open to accommodate hydraulic motor 1914. Torque hub 1904 extends through circular bore 1924 in knuckle weldment 1904. Front wheel 1910 is press fit onto torque hub 1904. A bottom surface of knuckle weldment 1904 comprises opening 1926 through which a pin is placed to couple knuckle weldment 1904 to knuckle pivots 1922. Swivel adapters 1916 interface hydraulic motor 1914 to power system 110 through openings in the top surface of knuckle pivot 1922 and knuckle weldment 1904 as depicted in FIG. 19B.

Figure 22:
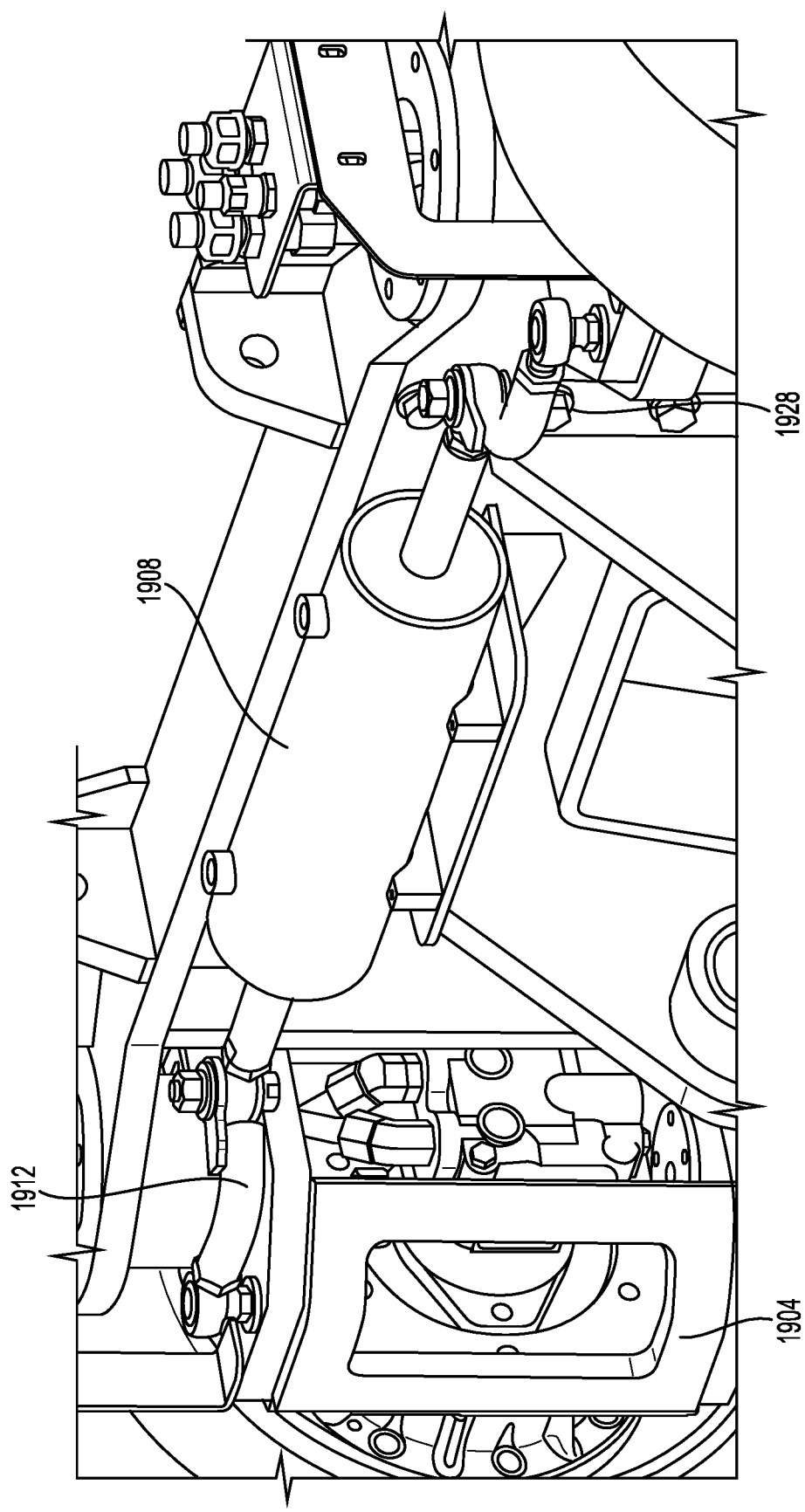
FIG. 22 depicts the steering cylinder.

FIG. 22 depicts an enhanced view of dual acting cylinder 1908 which is used to steer front wheels 1910. Each piston of dual acting cylinder 1908 is coupled to a curved steering linkage 1912 via ball joint 1928. The opposite end of each steering linkage 1912 is coupled to the top surface of knuckle weldment 1904. Thus, by actuating each piston of dual acting cylinder 1908, wheels 1910 can be independently steered by rotating knuckle weldment 1904 about knuckle pivots 1922. The central body of dual acting cylinder 1908 is coupled to cylinder shelf 1930 which extends from axle weldment 1902.

Figure 23:
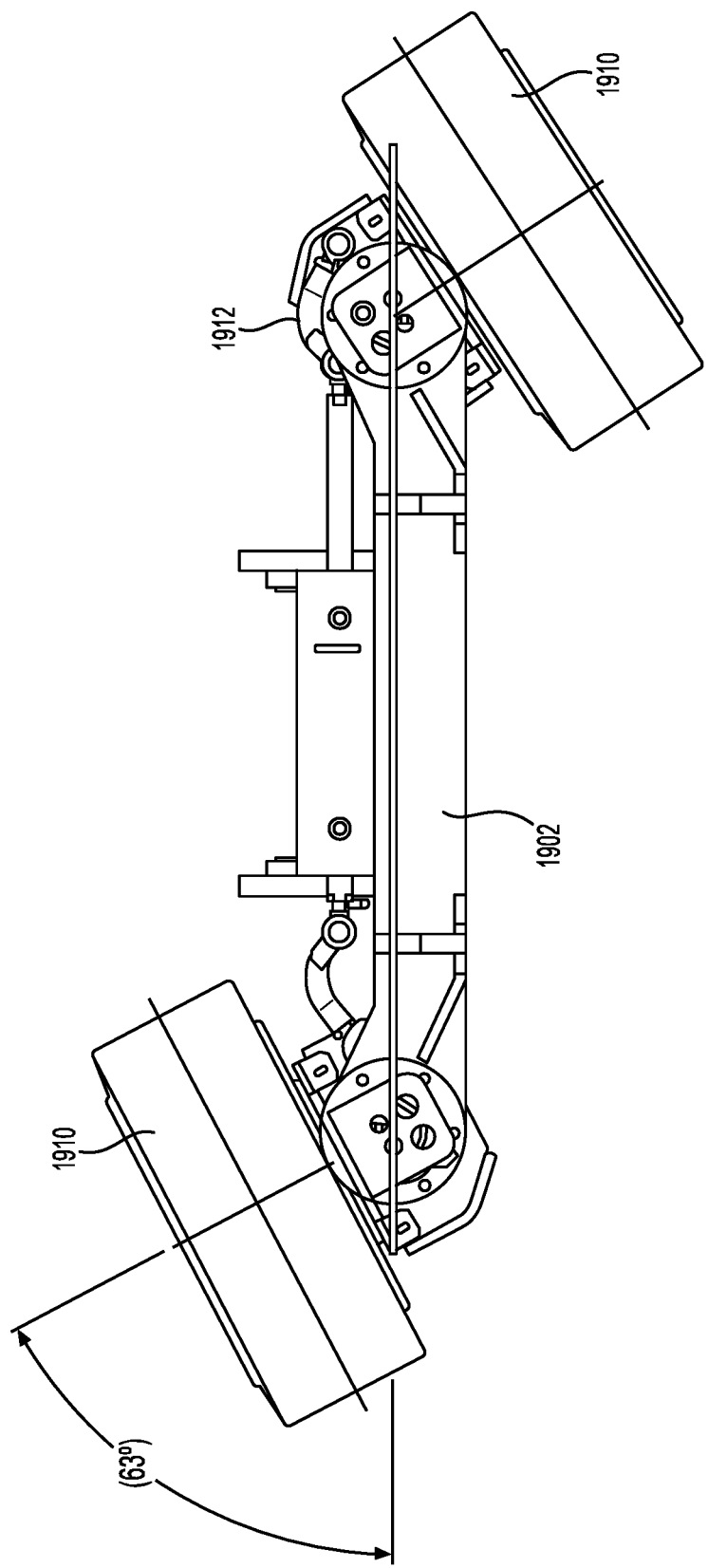
FIG. 23 depicts the range of motion of the front drive assembly.

The construction of front drive assembly 104 allows each front wheel 1910 to be independently rotated by up to 630 as depicted in FIG. 23. Also, because each front wheel 1910 is coupled to a separate hydraulic motor 1914 and torque hub 1906, they can be rotated in the same direction or in opposite directions.

Lift Carriage 102

Figure 24B:
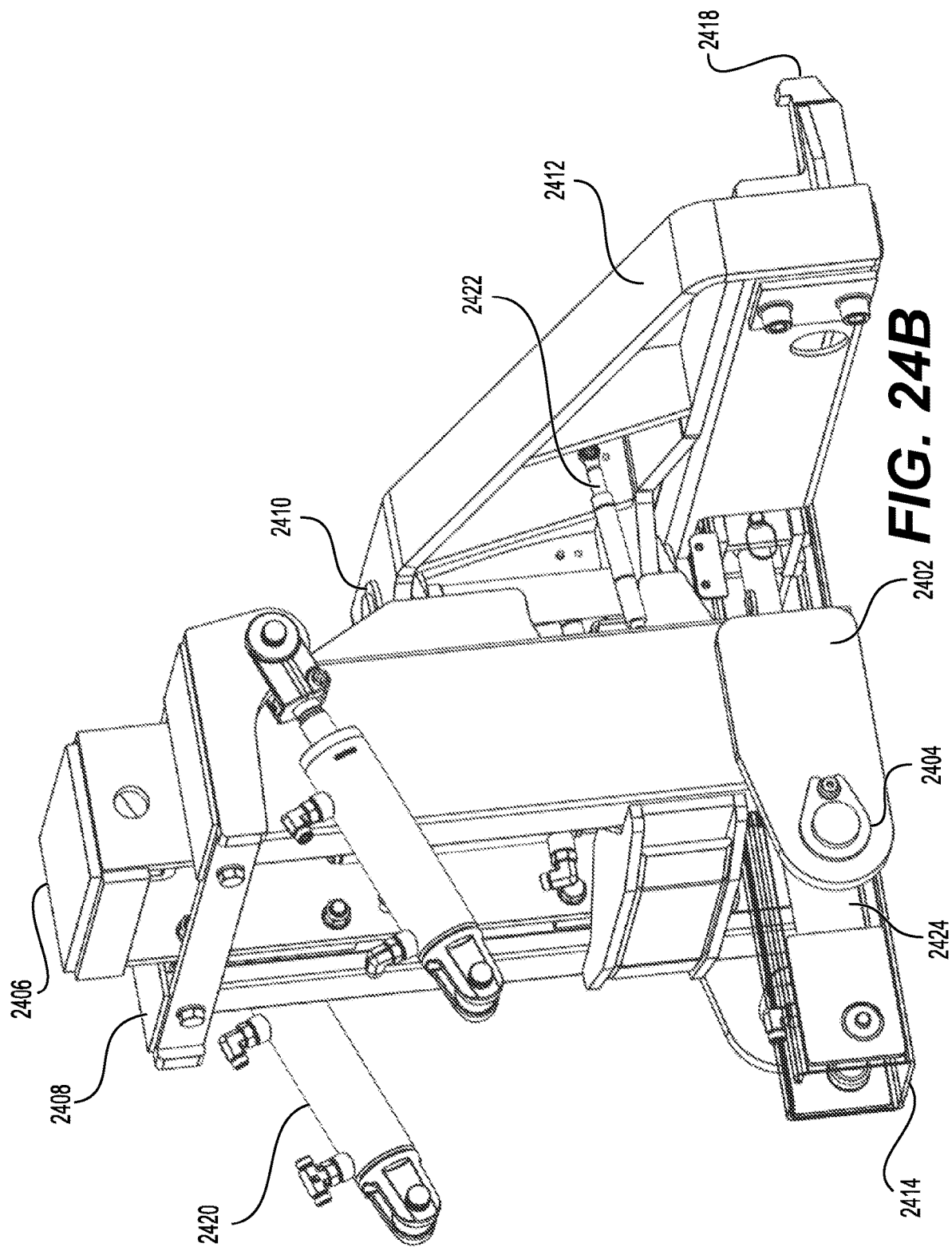

FIG. 24A depicts a front view of lift carriage 102 in isolation and FIG. 24B depicts a rear view of lift carriage 102 in isolation. Lift carriage 102 allows for limited three degrees of movement with respect to ACR 100 as will be described.

As depicted in FIG. 24A, lift carriage 102 generally comprises mast 2402, mast pivot 2404, mast carriage 2406, mast crown 2408, pivot pin 2410, drawbar frame 2412, drawbar tube 2414, drawbar hook assembly 2416, lifting lugs 2418, tilt cylinders 2420, centering dampeners 2422, and drawbar cylinder 2422. In FIG. 24B, drawbar tube 2414 is shown transparent to depict drawbar cylinder 2424 which exerts a pulling or pushing force on drawbar hook assembly 2416 during conveyance of a MP by ACR 100. Similarly, mast 2402 is shown transparent to depict how mast carriage 2406 can move vertically with respect to mast 2402.

Lift carriage 102 is coupled to ACR 100 via two different connections. First mast pivot 2404 is coupled to mast plates 1920 to form pivot joint 2405 and tilt cylinders 2420 couple mast crown 2408 to main frame 106 as depicted in FIG. 1. The expansion and contraction of tilt cylinders 2420 allow the entire lift carriage 102 to be pivoted about mass pivot 2404. Because this is the only connection of lift carriage 102 to ACR 100, lift carriage 102 can easily be removed in a fashion similar to front drive assembly 104.

Figure 25:
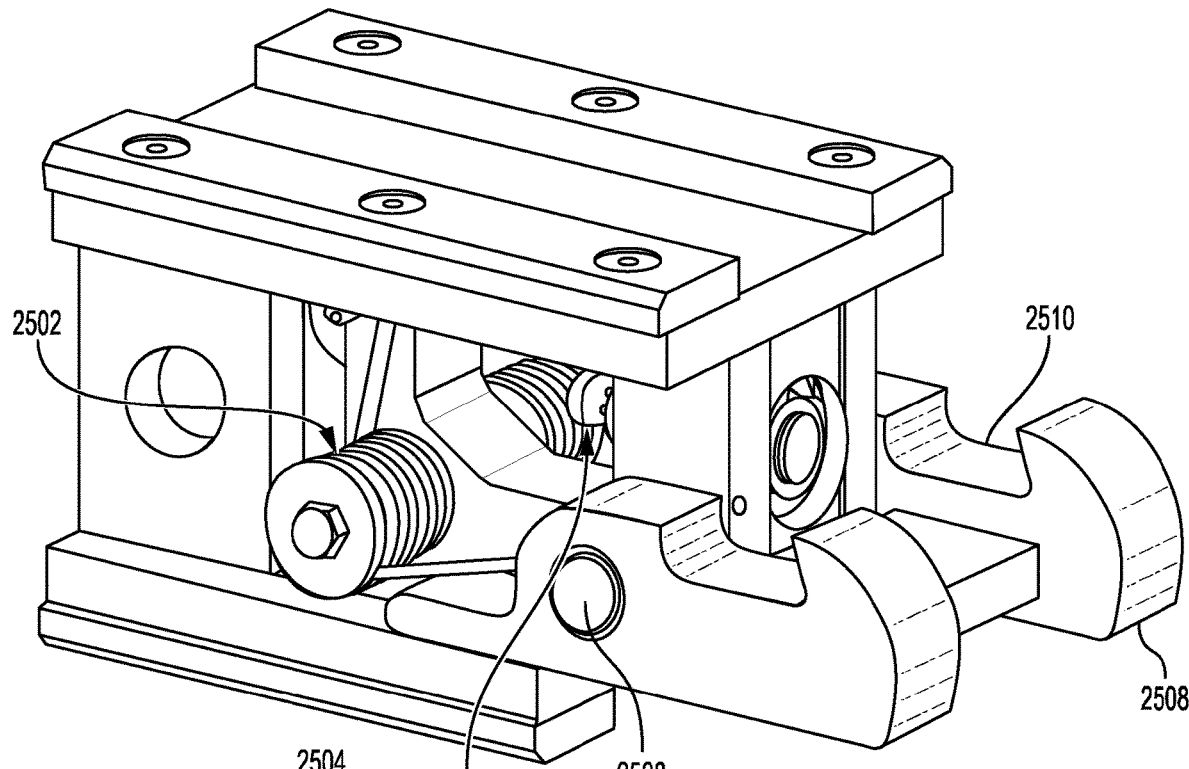
FIGS. 25 and 26A-26C depict the drawbar hook assembly in isolation.

Drawbar hook assembly 2416 is depicted in isolation in FIG. 25 comprising torsion springs 2502, inductive proximity sensor 2504, hook 2506, and pivot joint 2508. Hook 2506 is coupled to drawbar hook assembly 2416 via pivot joint 2508, allowing hook 2506 to pivot downward under an applied force when coupling to an MP. Torsion springs 2502 provide a biasing force against the deflection of hook 2506 to maintain its position when not coupled to an MP and to assist in hooking. The output from the inductive proximity sensor 2504 is monitored by ACR 130 and this information is utilized during the automated coupling process. The output from inductive proximity sensors 2504 are also monitored to determine the fully extended and fully retracted position.

Figure 26A:
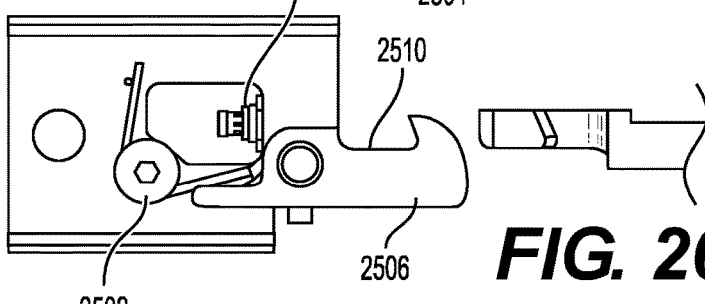
Figure 26B:
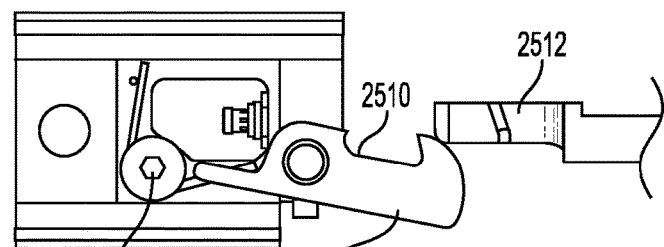
Figure 26C:
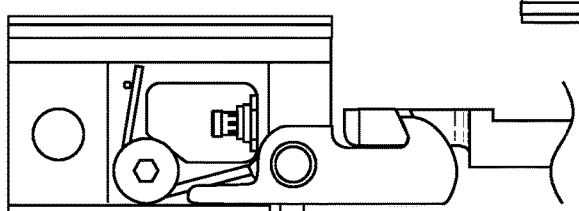

Hook 2506 is specifically designed to interface with a T-hook on the MP and has T-channel 2510 which engages the T of the T-hook 2512. FIGS. 26A-26C depict the coupling of hook 2506 to a T-hook 2512 of an MP. As hook 2508 engages the T of T-hook 2512, it is deflected downward about pivot joint 2508 as depicted in FIG. 26B. Then, when T-hook 2512 engages T-channel 2510, the biasing force provided by torsion springs 2502 pivots hook 2506 upward to engage T-hook 2512. Drawbar hook assembly 2416 thus negates the need for pre-positioning when ACR 100 is engaging with an MP and the exact position of the T-hook 2512 is not required.

Figure 27:
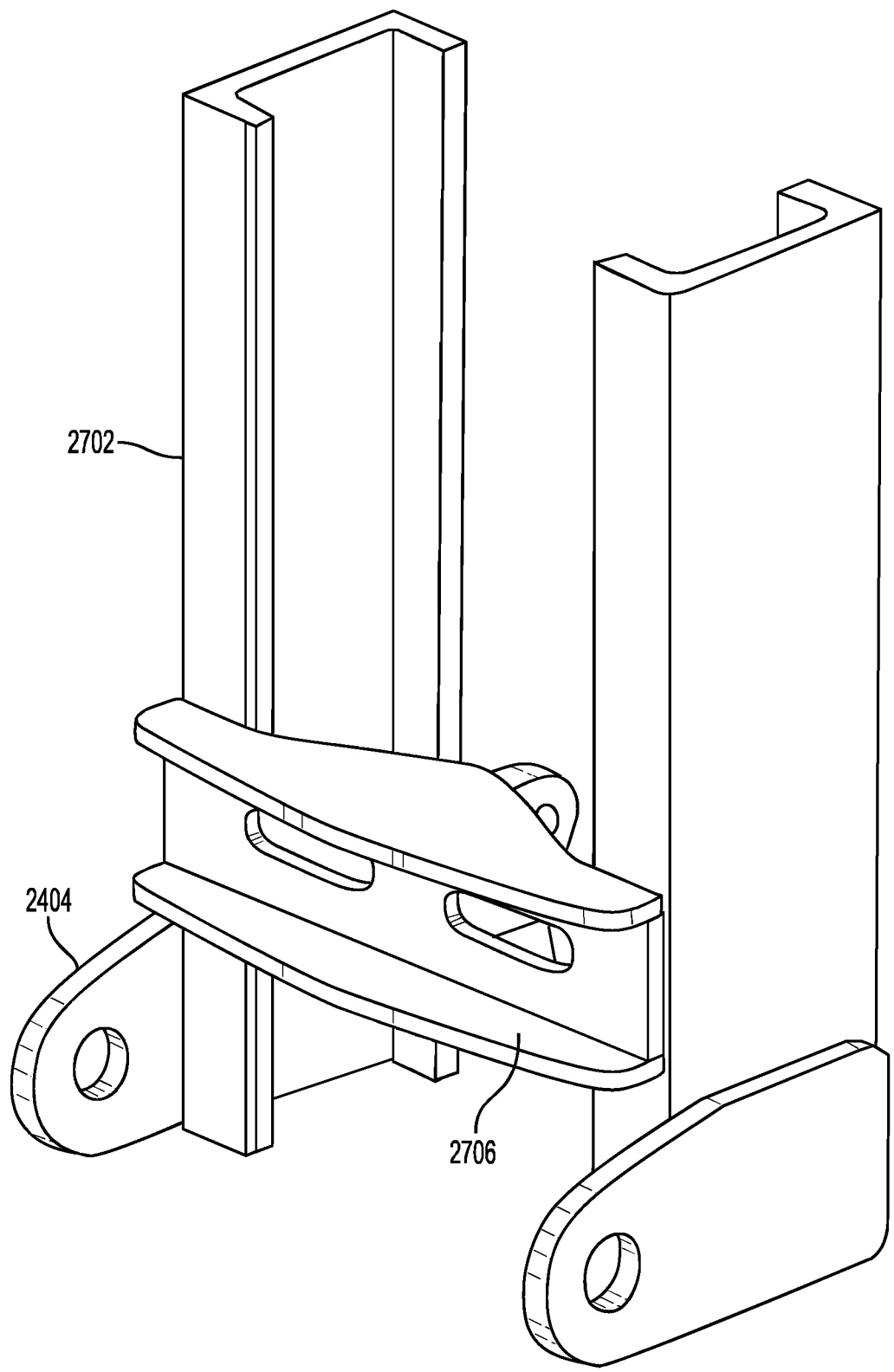
FIG. 27 depicts the mast in isolation.

FIG. 27 depicts mast 2402 in isolation. Mast 2402 is formed from two adjacent mast rails 2702 which are joined together by lift cylinder mount 2704. The mast pivots 2404 are coupled to the bottoms of rails 2702. A first end of lift cylinder 2706 is coupled to lift cylinder mount 2704 and a second end is coupled to mast carriage 2406. The expansion and contraction of lift cylinder 2706 by power system 110 allows drawbar frame 2412 to be moved vertically with respect to ACR 100.

Figure 28:
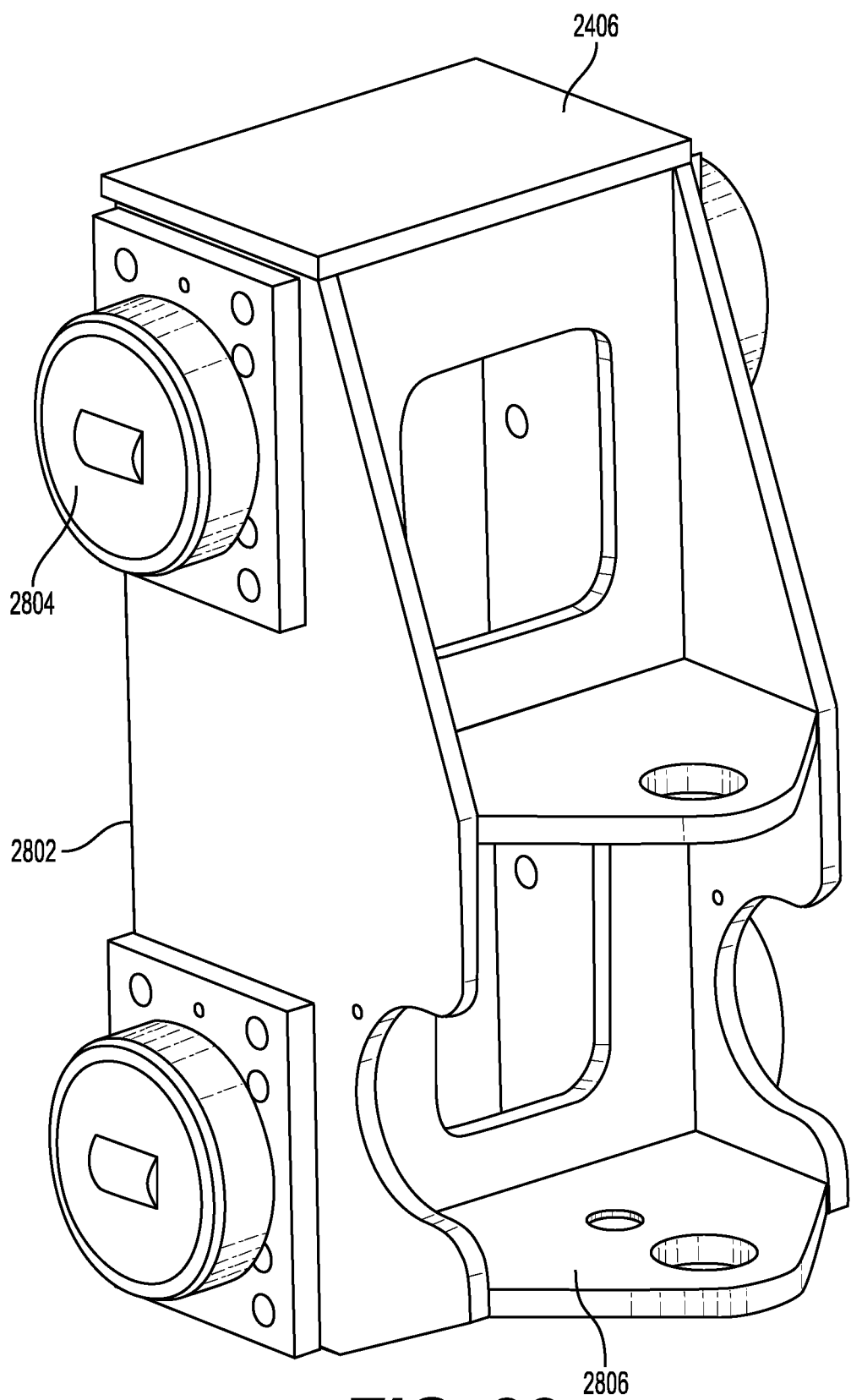
FIG. 28 depicts the mast carriage in isolation.

FIG. 28 depicts mast carriage 2406 in isolation. Mast carriage 2406 comprises lift body 2802, roller bearings 2804, and pivot joint 2806. The roller bearings 2804 allow mast carriage 2406 to slide between mast rails 2702 as lift cylinder 2706 is expanded and contracted. The piston of lift cylinder 2706 is coupled to a connection on the interior of lift body 2802. The roller bearings 2804 are preferably Hevi-Rail® axial bearings with a welded flange plate. Mast crown 2408 prevents roller bearings 2804 from exiting mast rails 2702 as depicted in FIG. 24A.

Figure 29:
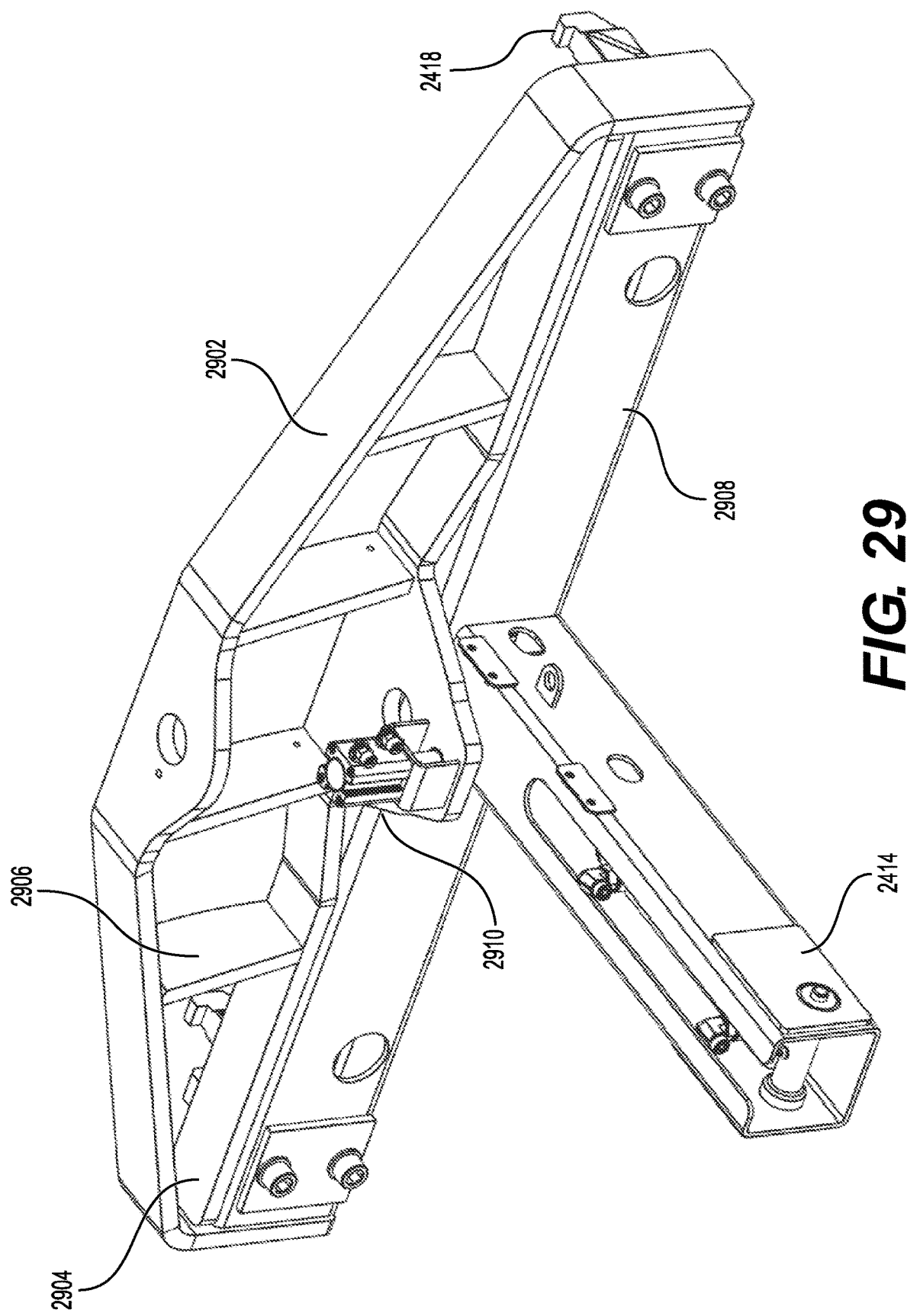
FIG. 29 depicts the drawbar frame.

The front pivoting portion of lift carriage 102, drawbar frame 2412, is depicted in FIG. 29. Drawbar frame 2412 generally comprises upper pivot plate 2902, lower pivot plate 2904, reinforcement plates 2906, attachment bar 2908, and locking pin 2910. Pivot pin 2410 is inserted through pivot joint 2806, upper pivot plate 2902, and lower pivot plate 2904 which allows drawbar frame 2412 to freely pivot with respect to mast carriage 2406. Locking pin 2910 can be used to automatically limit the pivoting motion if desired when it is lowered into an opening in lower pivot plate 2904. A first end of centering dampers 2422 is coupled to reinforcement plates 2906 and a second end is coupled to mast carriage 2406 to dampen the pivoting motion about pivot pin 2410.

Figure 30:
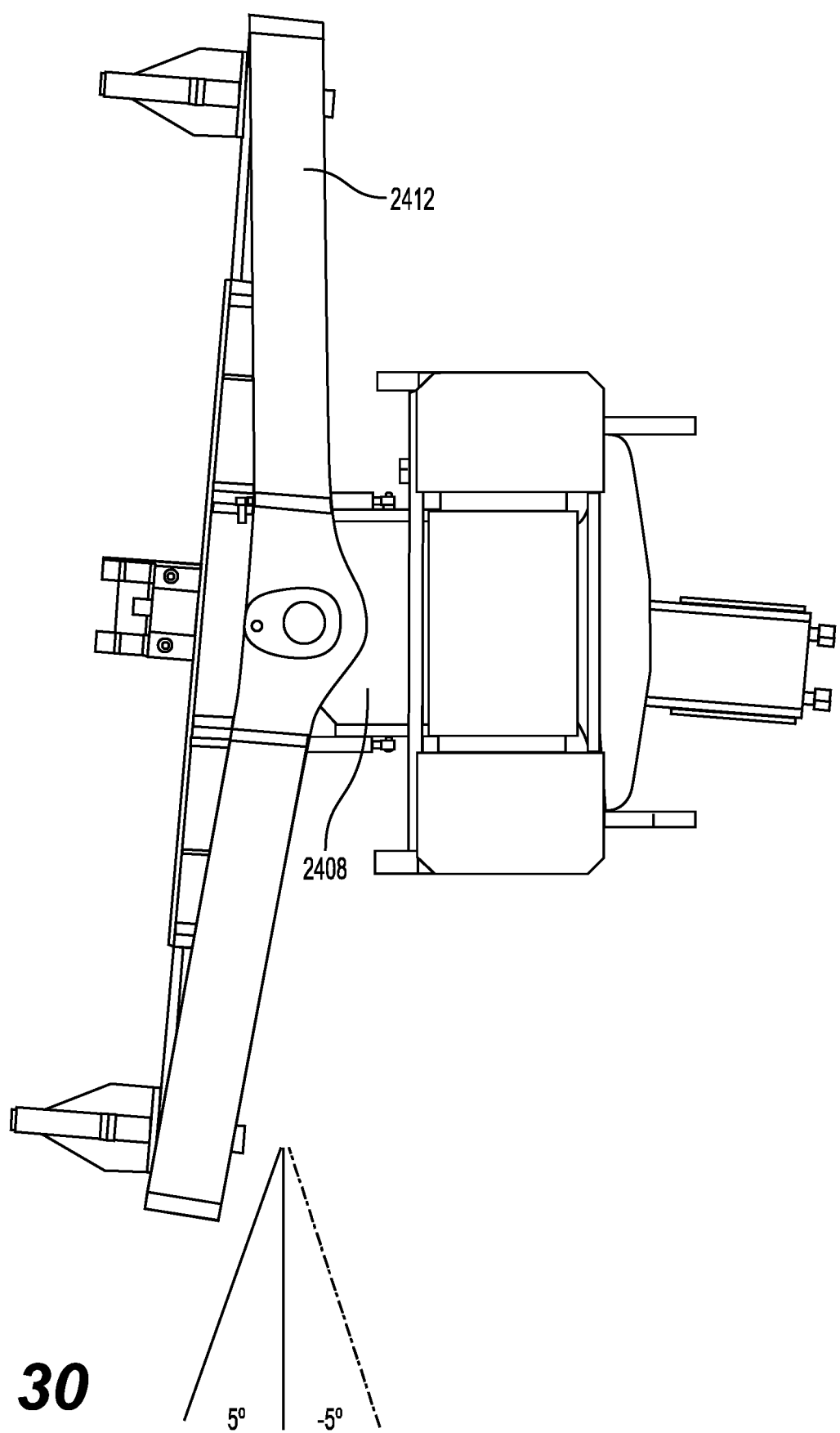
FIGS. 30-31 depict the locking pin.

FIG. 30 shows the pivoting range of motion of drawbar frame 2412 with respect to mast carriage 2406. Drawbar frame 2412 can freely rotate±5° in either direction. Centering dampers 2422 help to maintain drawbar 2412 at a 0° pivot (centered).

Figure 31:
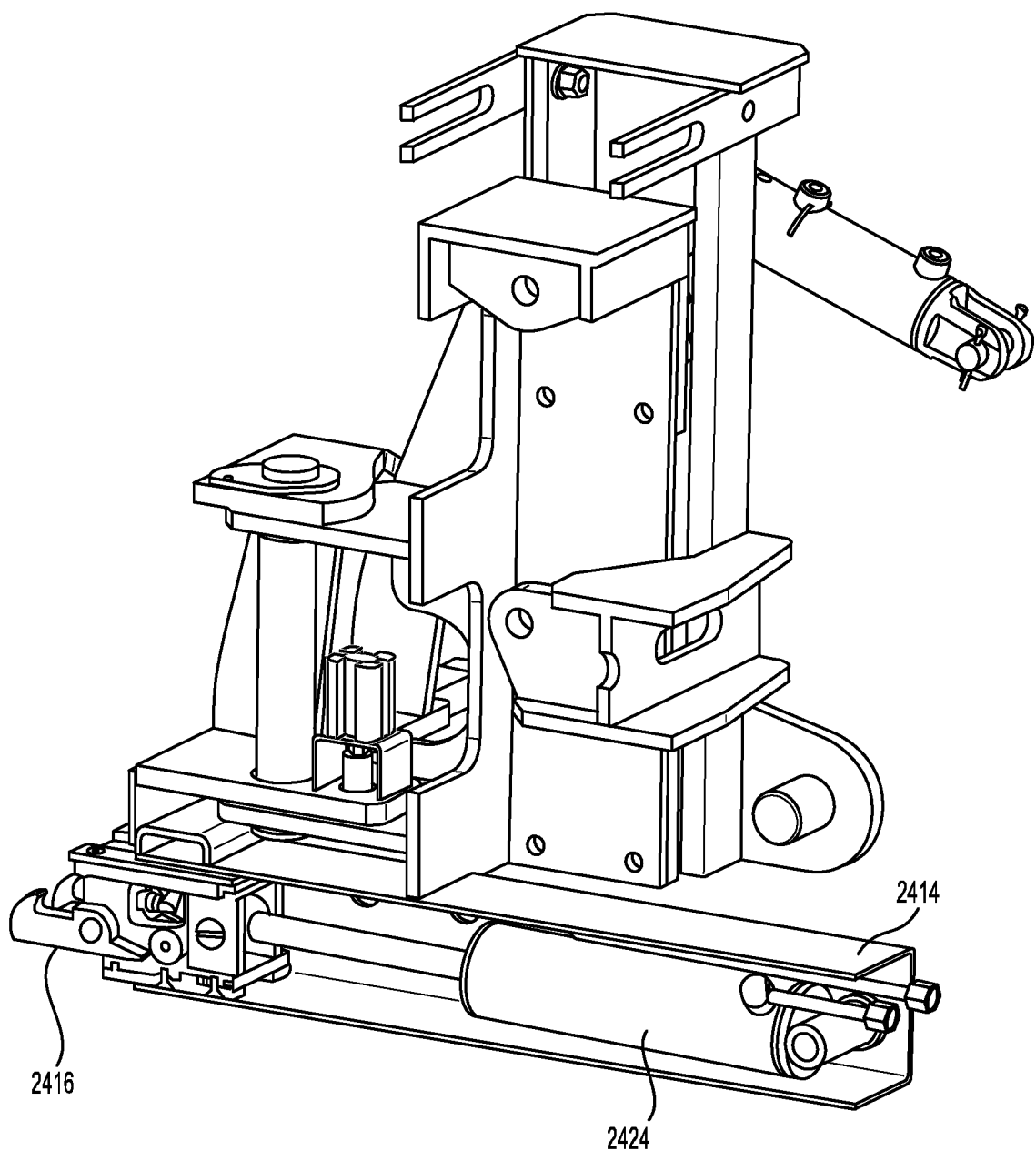

FIG. 31 depicts a partial cutaway view of drawbar tube 2414. A first end of drawbar cylinder 2424 is coupled to an end of drawbar tube and the shaft of drawbar cylinder 2424 is coupled to drawbar hook assembly 2416. Expansion and contraction of drawbar cylinder 2424 by power system 110 causes drawbar hook assembly 2416 to be extended and retracted as needed to engage an MP.

Figure 32:
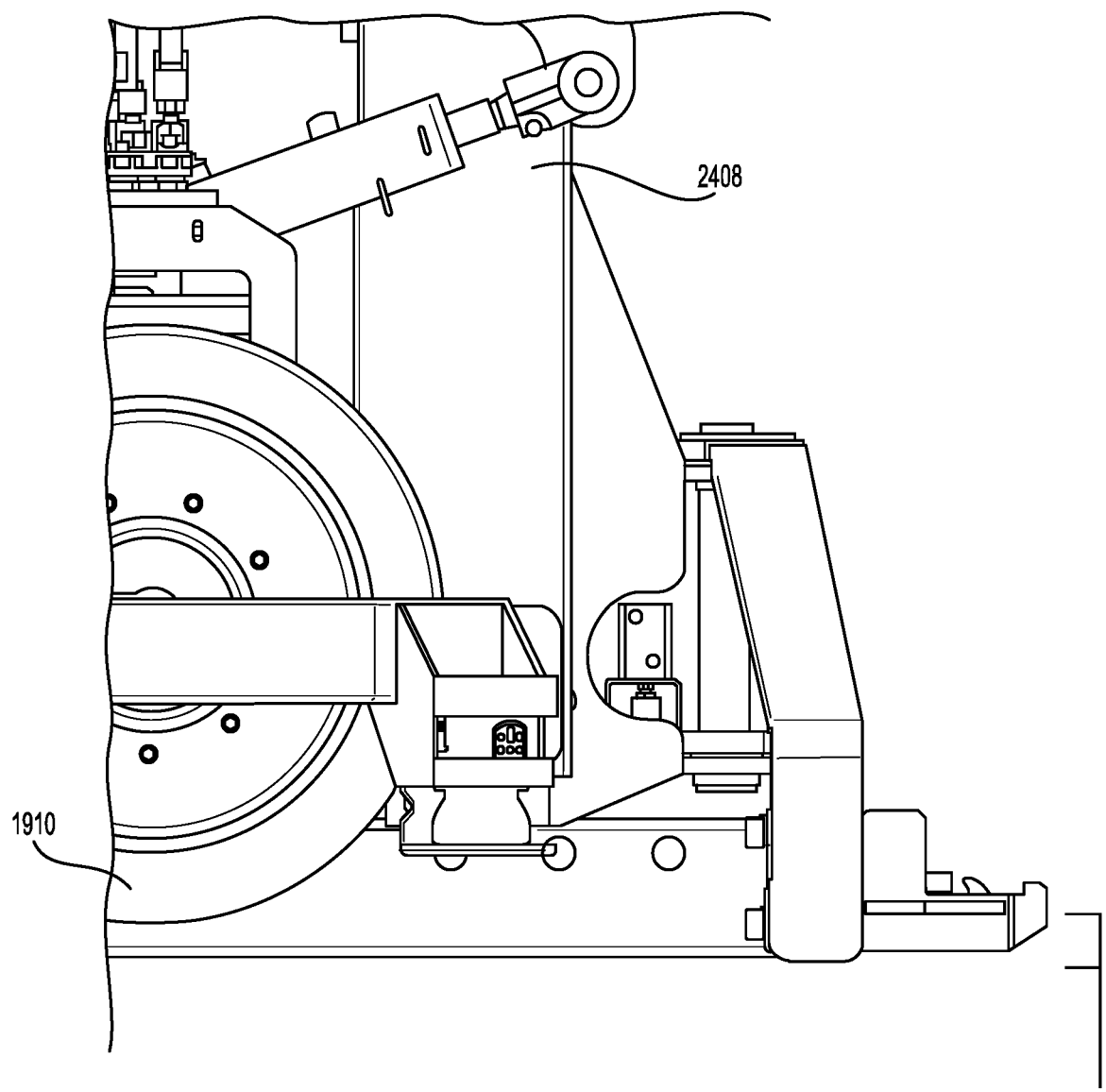
FIG. 32 depicts the vertical range of motion of the lift carriage.

FIG. 32 depicts the lower and upper vertical range of motion of lift carriage 102. When lift cylinder 2706 is fully extended, lifting lugs 2418 are located 1" below the ground plane. When cylinder 2706 is fully retracted, lifting lugs 2418 are located 4.7" above the ground plane. This range of vertical motion is needed because trailer decks are not always level with the cross-dock for a variety of reasons including tire pressure, temperature, construction anomalies, etc.

Figure 33B:
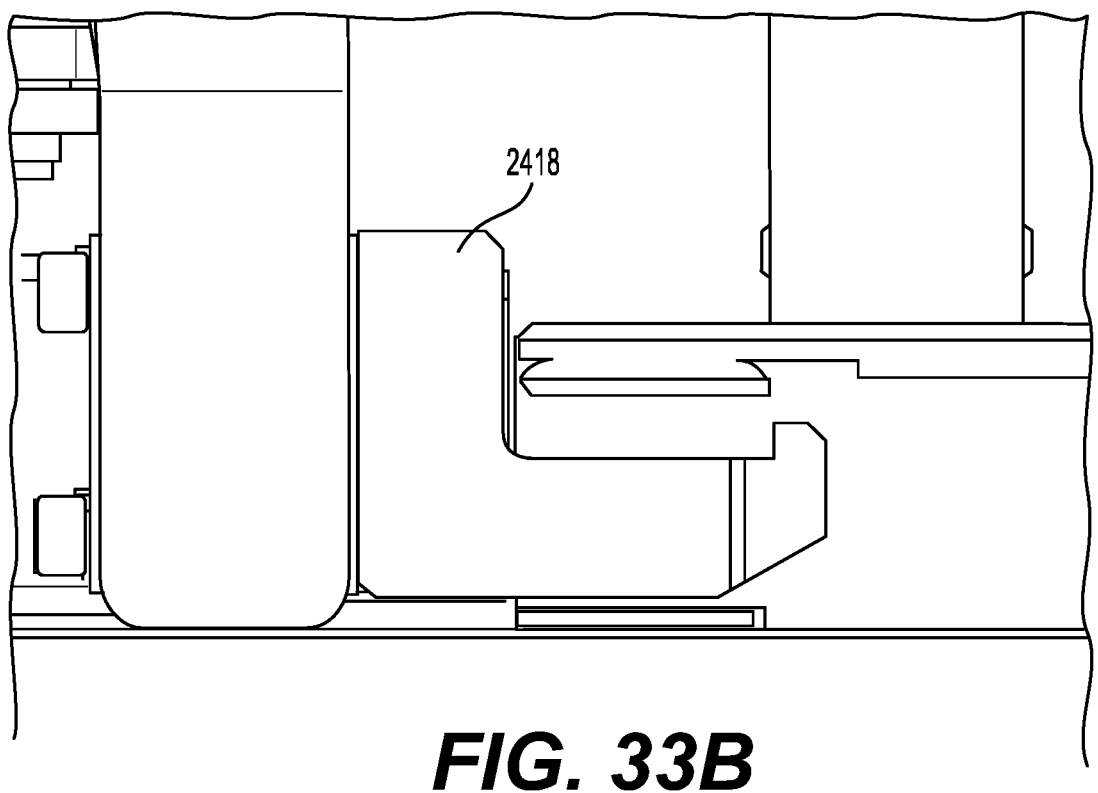
Figure 33C:
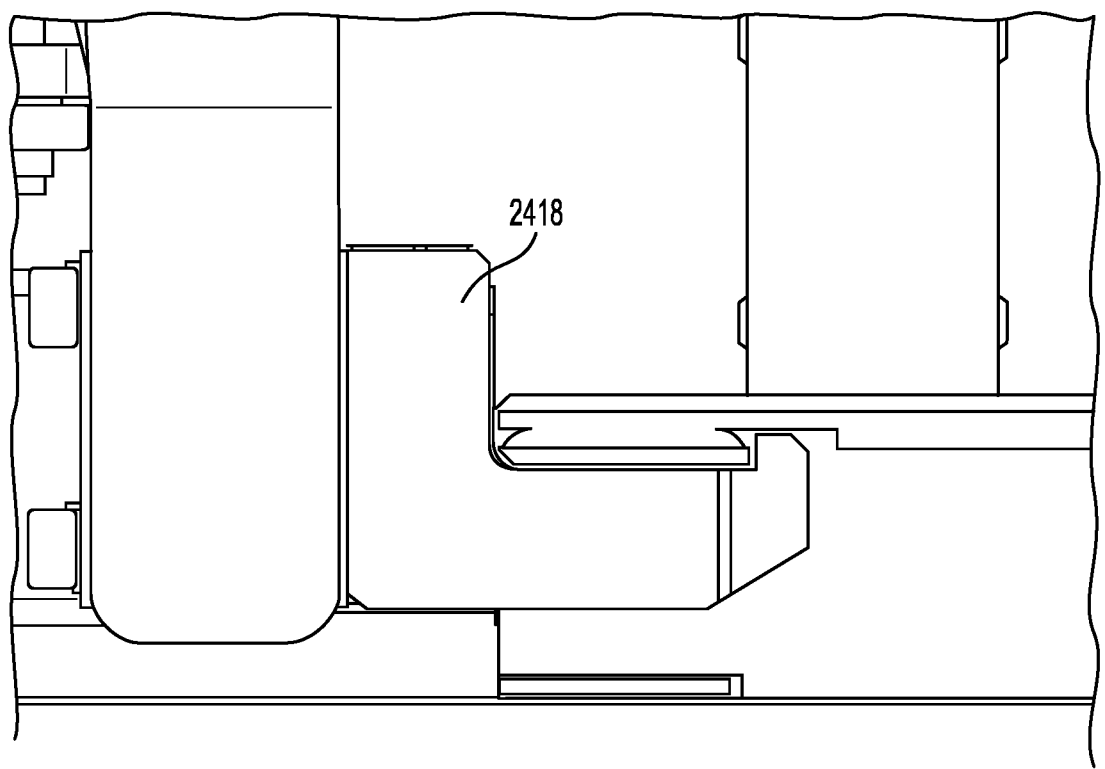
Figure 33D:
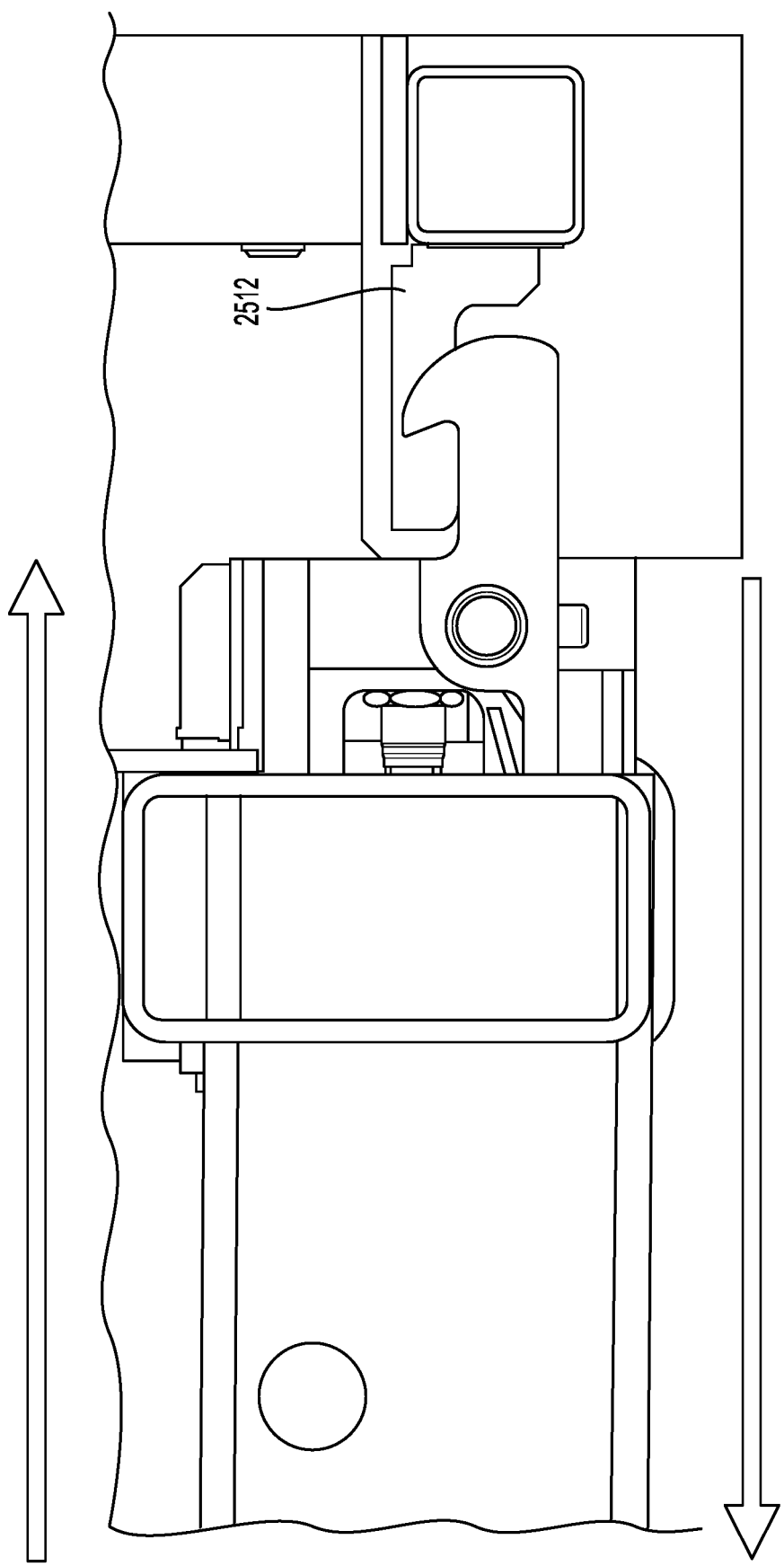
Figure 33E:
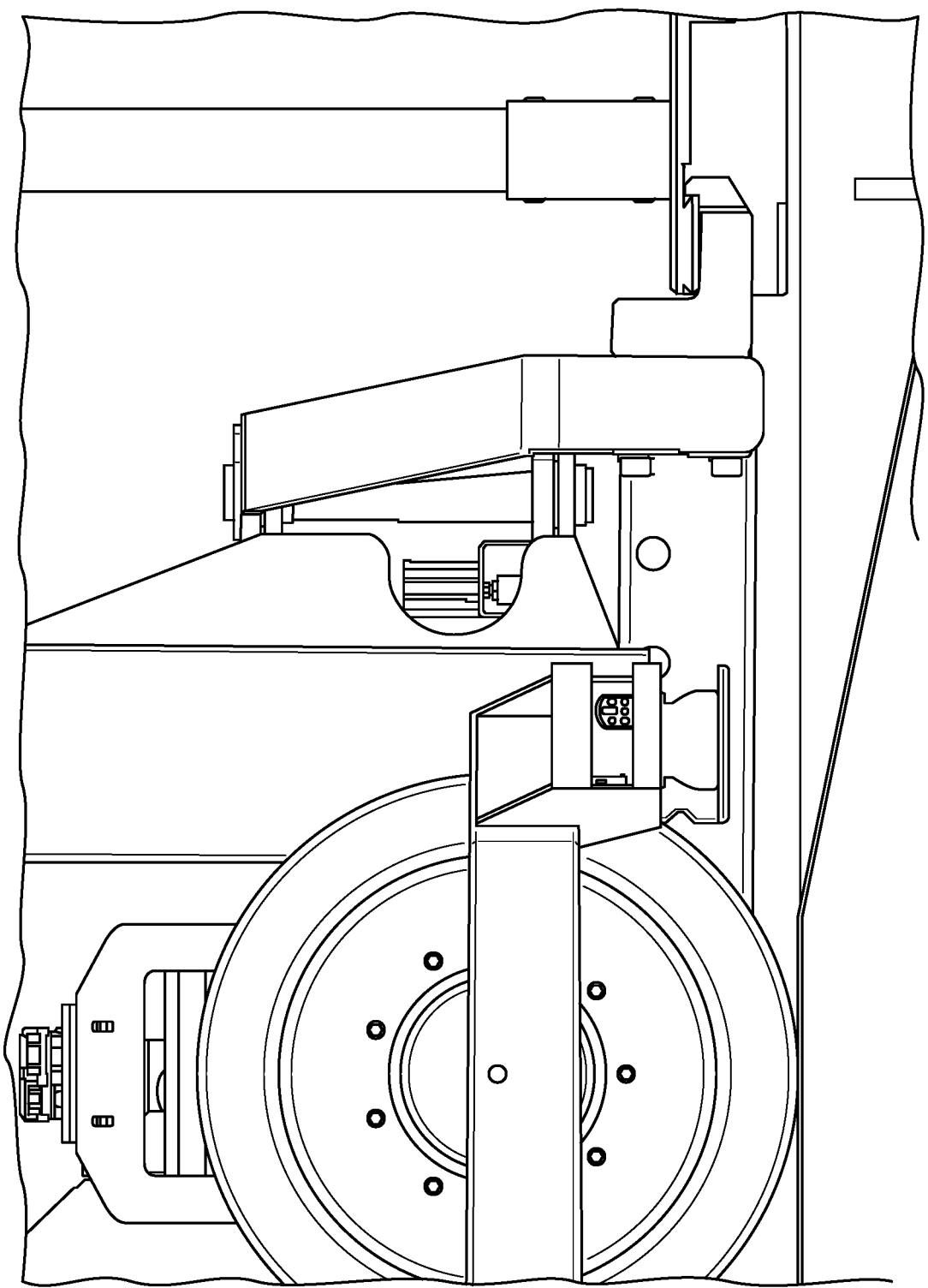

To better illustrate the versatility of lift carriage 102, various MP attachment sequences will now be described. FIGS. 33A-33E depict the steps utilized by ACR 100 to attach to an MP on a flat cross-dock. First, ACR 100 aligns the angle, height, and angle of lifting lugs 2418 with the MP using lift carriage 102 as depicted in FIG. 33A. ACR 100 then engages front drive assembly 104 to insert lifting lugs 2418 into the MP until it contacts the back vertical face of the lifting lugs 2418 as depicted in FIG. 33B. Lift cylinder 2706 is then engaged to lifting lugs 2418 until they engage the pockets of the MP as shown in FIG. 33C. At this point, drawbar cylinder 2424 is extended until drawbar hook assembly 2416 engages T-hook 2512 of the MP as shown in FIG. 33D. Drawbar cylinder 2424 is then retracted fully to cause the wheels on the MP to engage so that it can be maneuvered. ACR computer 138 decides a final height of lift carriage 102 that will be used while conveying the MP as depicted in FIG. 33E. The locking pin 2910 is optionally engaged to prevent pivoting of drawbar frame 2412. Preferably, the maximum lifting height of lift carriage 102 does not exceed 4".

Figure 34A:
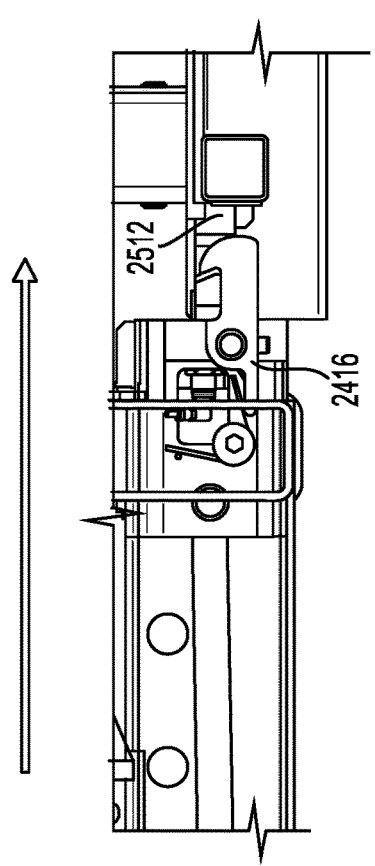
FIGS. 34A-34D depict the MP detachment sequence on a flat floor.
Figure 34B:
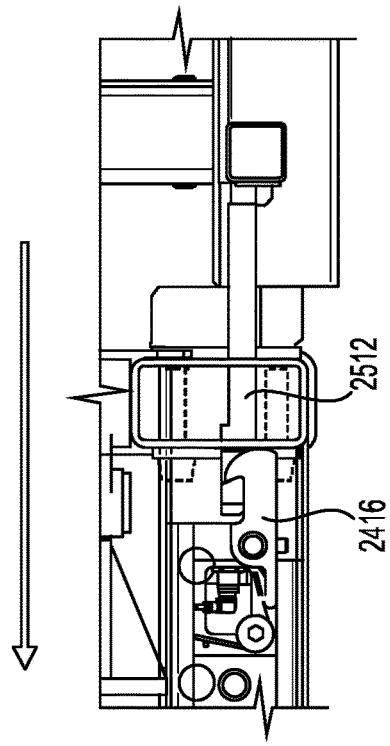
Figure 34C:
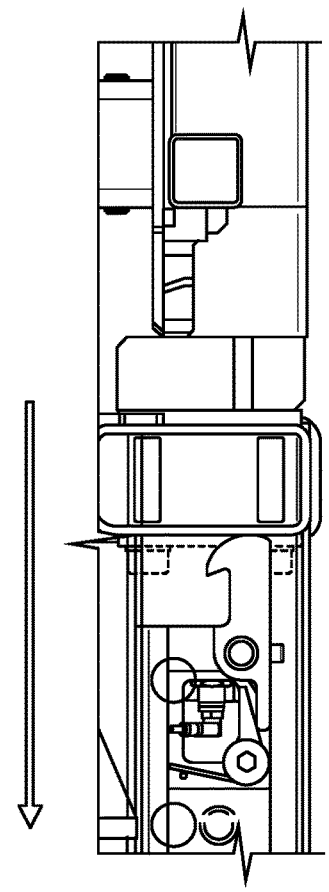
Figure 34D:
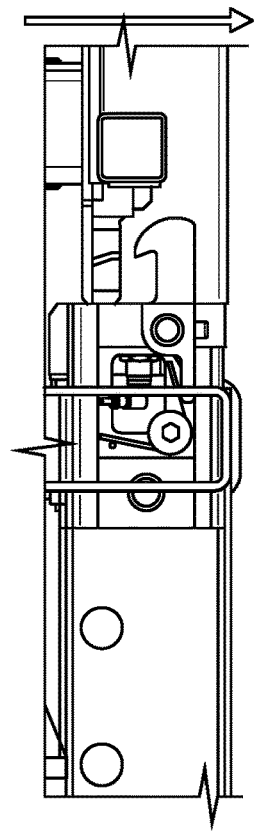

FIGS. 34A-34D depict the detachment sequence used by ACR 100 on a flat floor. Drawbar cylinder 2424 fully extends to free up tension on the T-bar 2512 as depicted in FIG. 34B. The mast carriage 2406 is then lowered by ~1.5" to release the T-bar 2512 as depicted in FIG. 34C. Drawbar cylinder 3424 then fully retracts after disengaging from T-bar 2512 as depicted in FIG. 34D.

Figure 35B:
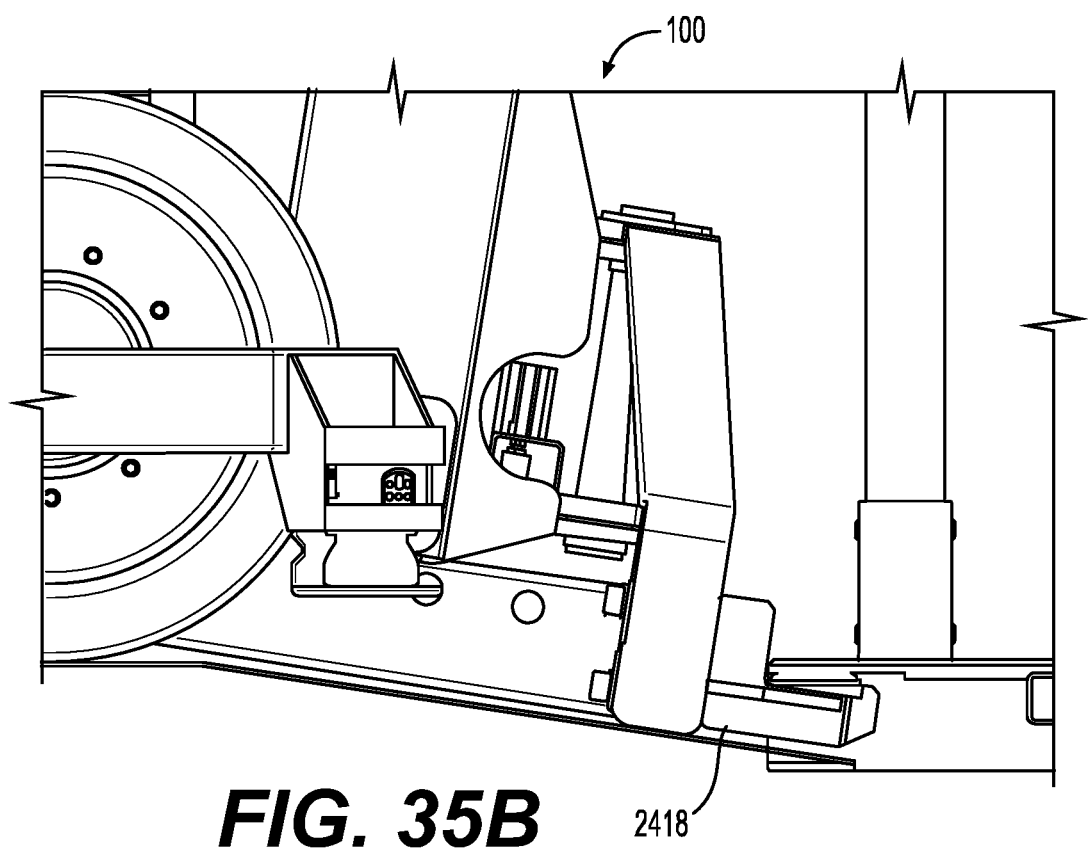
Figure 35C:
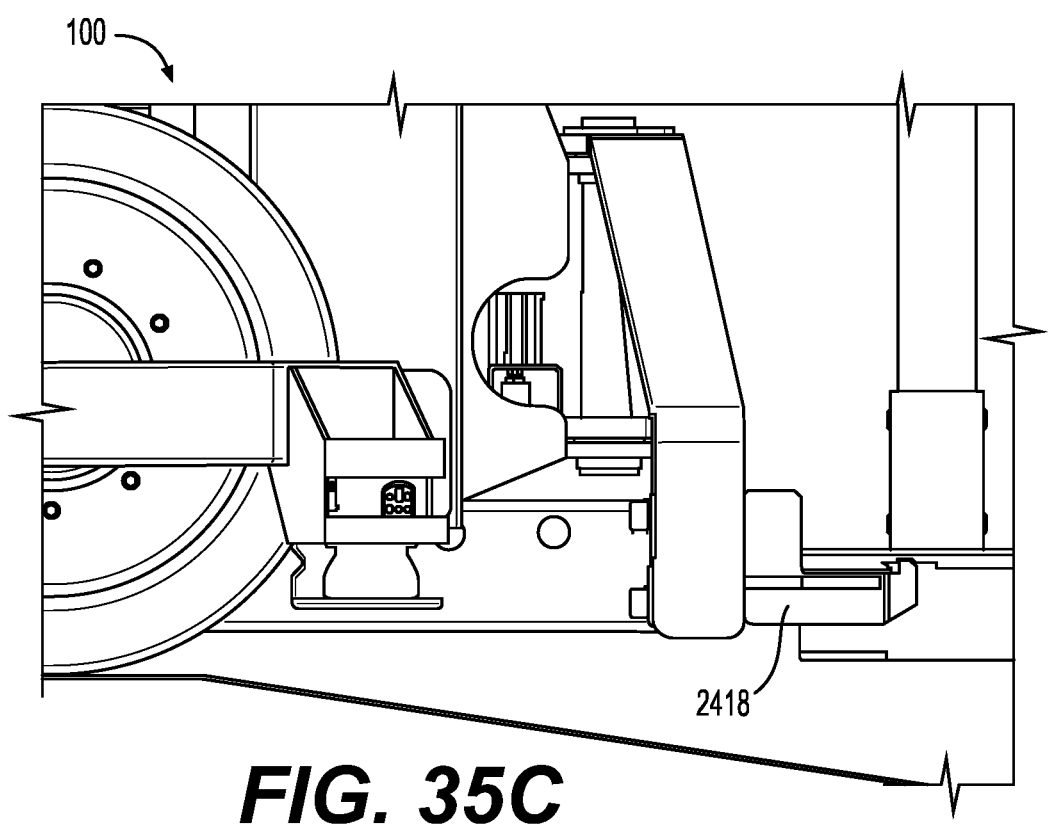
Figure 35D:
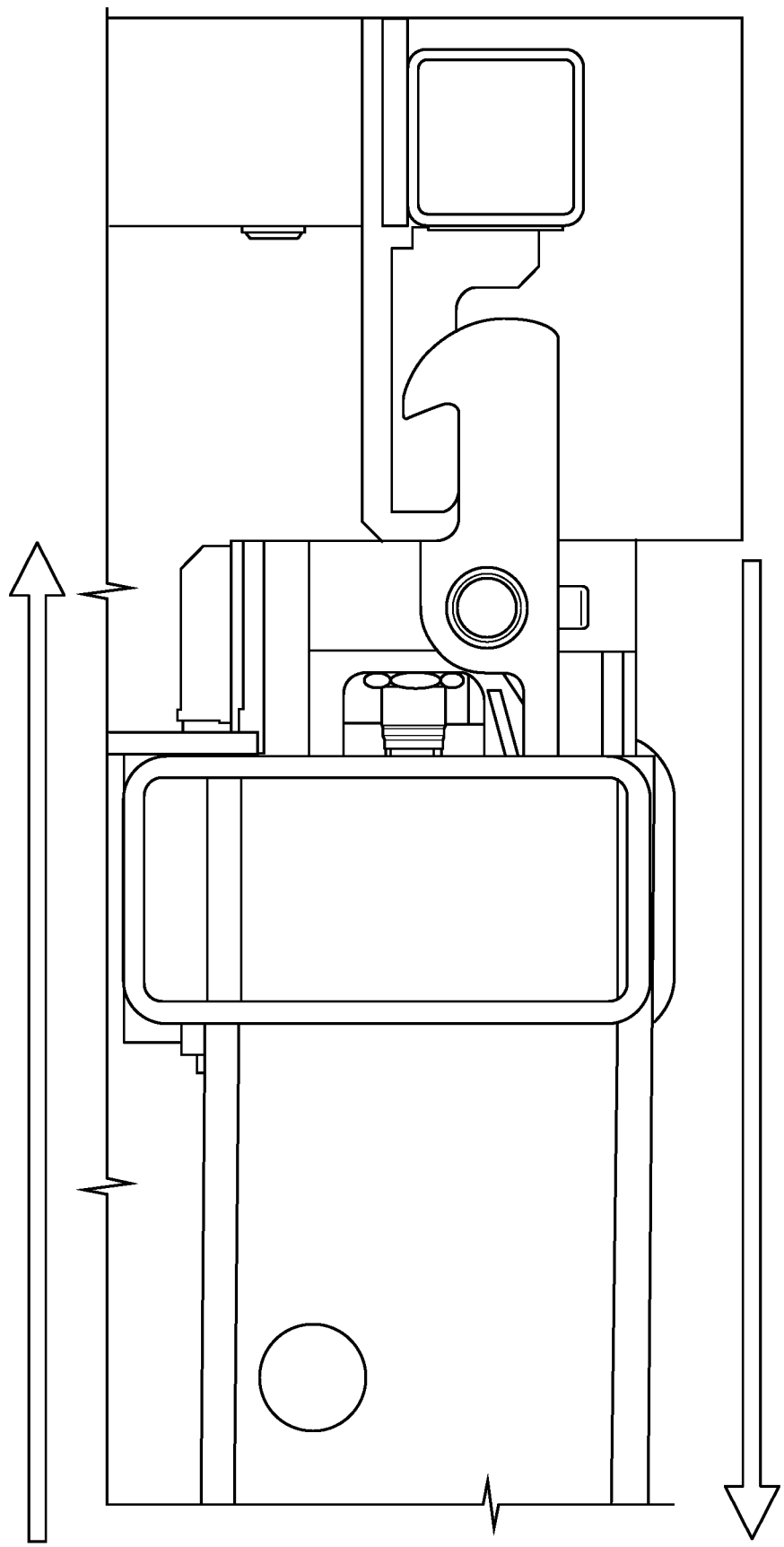
Figure 35E:
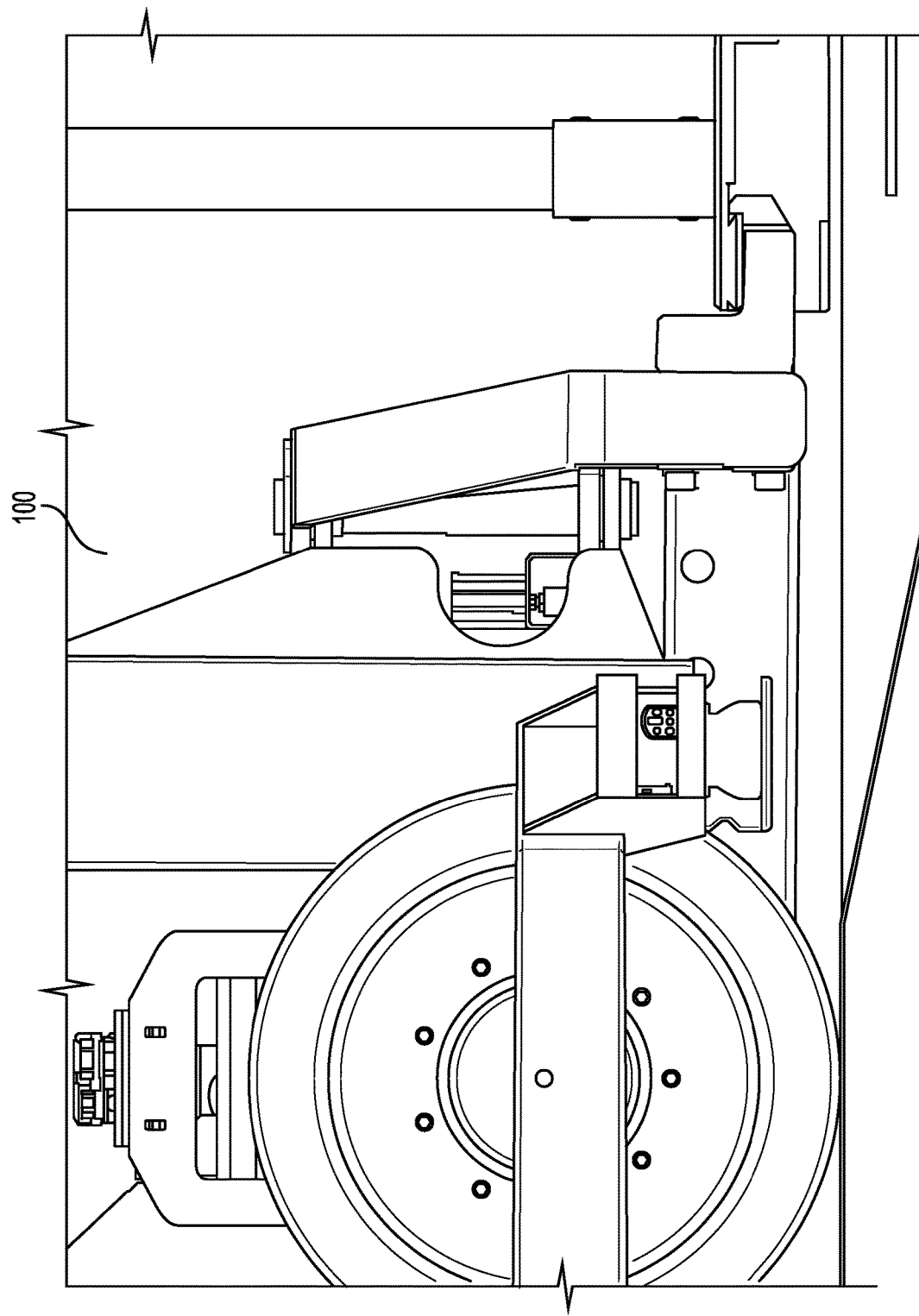

FIGS. 35A-35E depict the steps utilized by ACR 100 to attach to an MP on a 9° angled ramp engagement which may occur on some cross-docks. First, ACR 100 aligns the angle, height, and angle of lifting lugs 2418 with the MP using lift carriage 102 as depicted in FIG. 25B. ACR 100 then engages front drive assembly 104 to insert lifting lugs 2418 into the MP until it contacts the back vertical face of the lifting lugs 2418 as depicted in FIG. 35B. Lift cylinder 2706 is then engaged to lift lifting lugs 2418 until they engage the pockets of the MP as shown in FIG. 35C. This also causes the MP 100 to be aligned with drawbar hook assembly 2416. At this point, drawbar cylinder 2424 is extended until drawbar hook assembly 2416 engages T-hook 2512 of the MP as shown in FIG. 35D. Drawbar cylinder 2424 is retracted fully to cause the wheels on the MP to engage so that it can be maneuvered. ACR computer 138 decides a final height of lift carriage 102 that will be used while conveying the MP as depicted in FIG. 35E. The locking pin 2910 is optionally engaged to prevent pivoting of drawbar frame 2412. Preferably, the maximum lifting height of lift carriage 102 does not exceed 4".

Figure 36A:
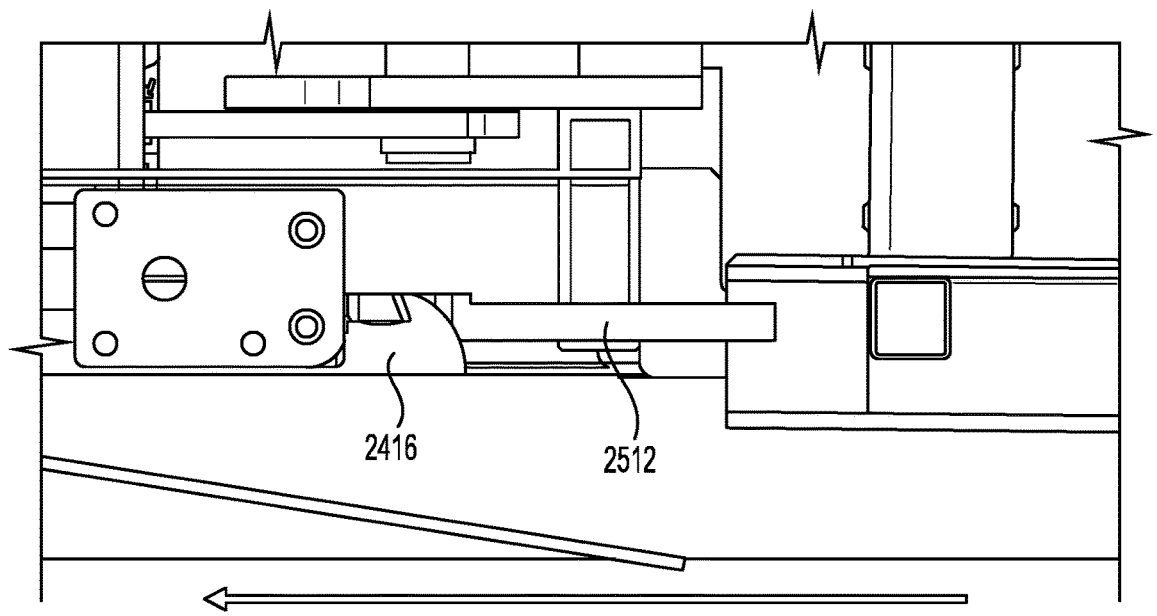
FIGS. 36A-36D depict the detachment sequence during a ramp disengagement.
Figure 36B:
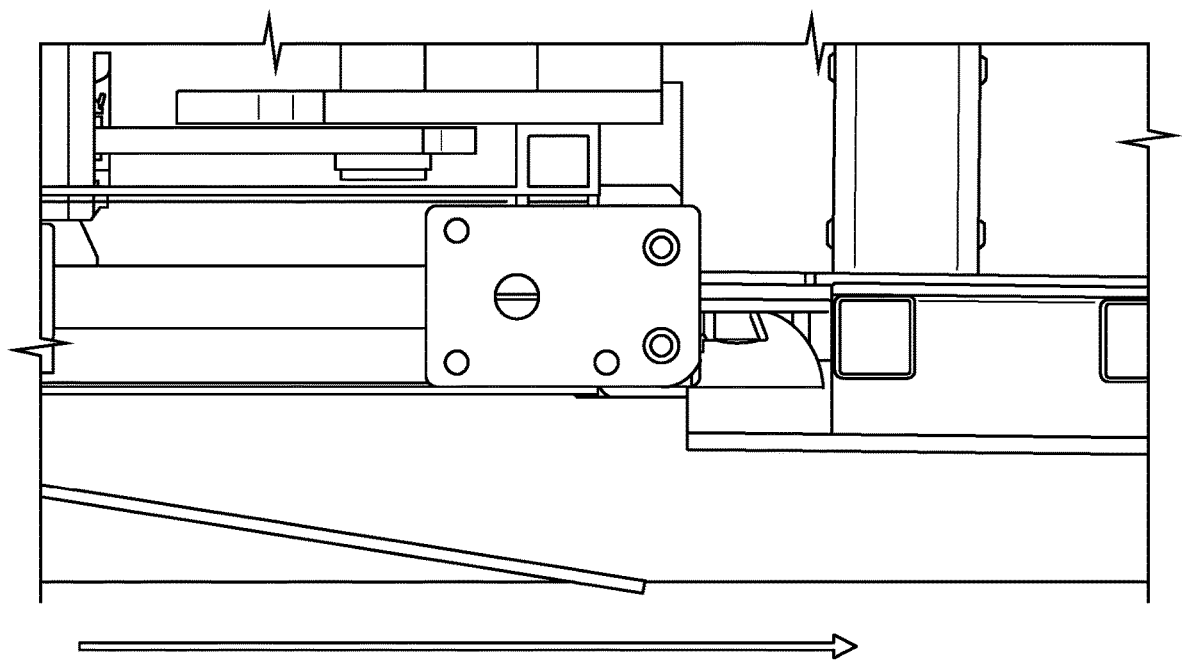
Figure 36C:
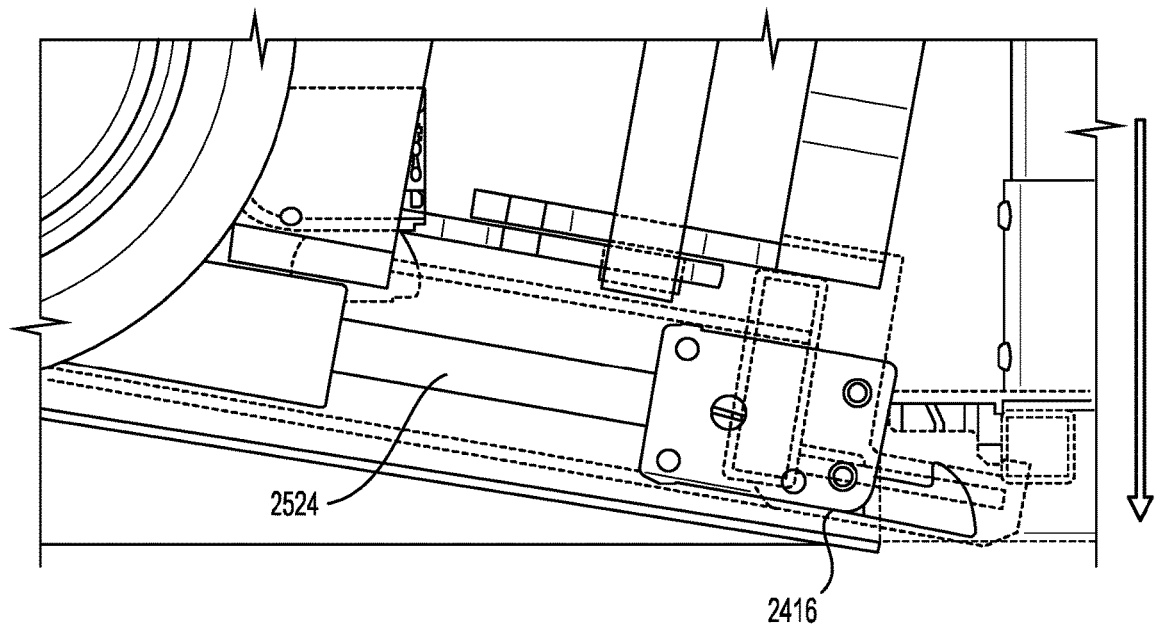
Figure 36D:
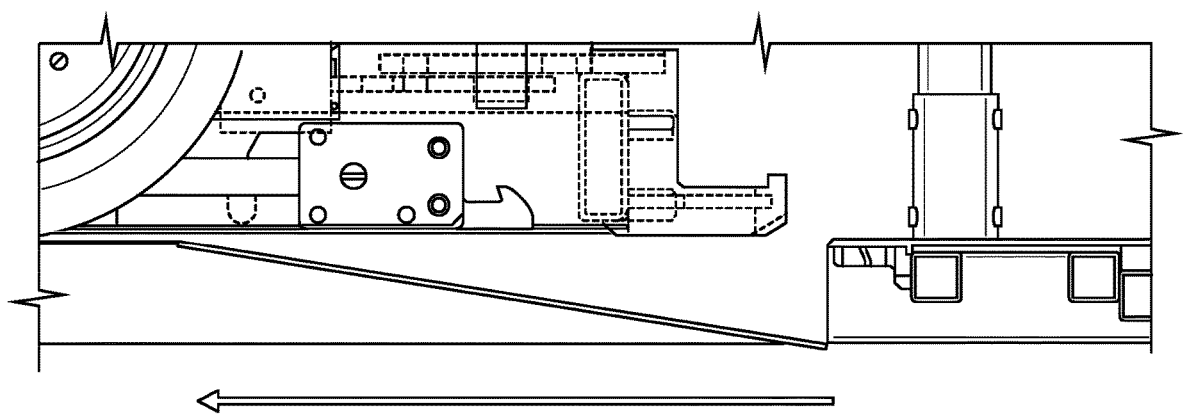

FIGS. 36A-36D depict the detachment sequence used by ACR 100 during a 9° ramp engagement. Drawbar cylinder 2424 fully extends to free up tension on the T-bar 2512 as depicted in FIG. 36B. The mast carriage 2406 is then lowered and the tilt cylinders 2420 are adjusted to set down the MP as depicted in FIG. 35C. Drawbar cylinder 3424 then fully retracts after disengaging from T-bar 2512 as depicted in FIG. 34D and drawbar frame 2412 can be tilted back to horizontal.

Safety and Navigation System 112

Figure 37:
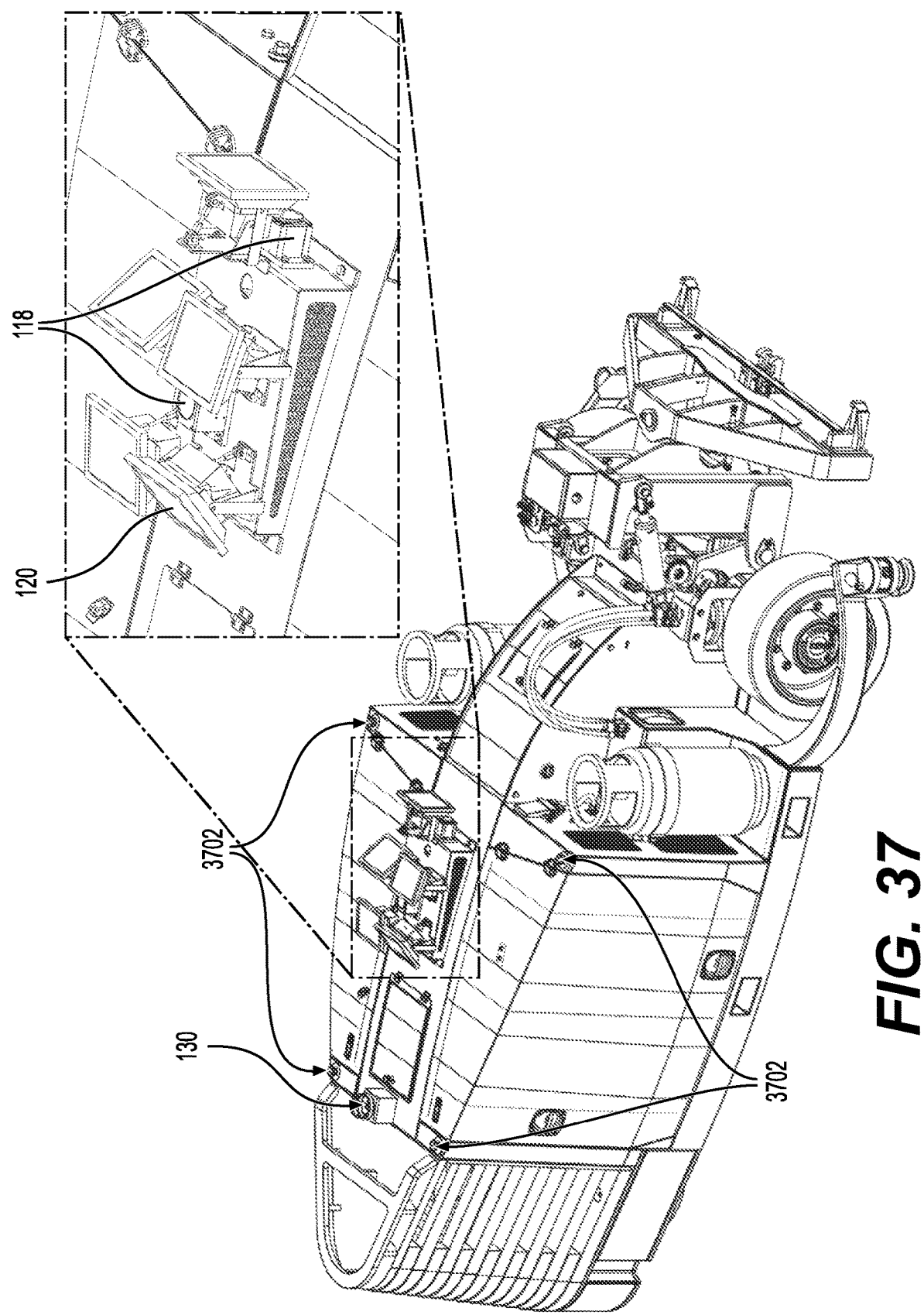
FIGS. 37-38 depict safety features of the ACR.

Because ACR 100 is wholly autonomous and designed to operate on a cross-dock where other people or machines may be present, a robust safety and navigation system 112 is required as depicted in FIG. 37. A beacon light 130 is mounted to the top of ACR 100 which allows a user to quickly ascertain its status. Preferably beacon light 130 is green during normal operation, yellow while moving, and red if there is an error or ACR 100 requires attention. ACR 100 also comprises a plurality of emergency stop buttons 3702 which are arranged adjacent the access panels 132. Pressing any of the emergency stop buttons 3702 immediately stops the operation of ACR 100 and places it into a standby state.

ACR 100 primarily navigates a cross-dock by utilizing IR lights 120 in combination with cameras 118. Reflected IR light is captured by camera 118 and is used by ACR computer 137 to determine location and for navigation. IR navigation also allows ACR 100 to function in a completely dark or dimly lit environment. Data from camera 118 is also in order to detect an MP and the MP's position in the map. The ACR 100 also uses odometry data from the vehicles wheel, inertial measuring unit data, and point cloud data from LIDAR'S 116. The combination of this data allows an estimation of its location which can be cross-referenced with the IR light data.

Figure 38:
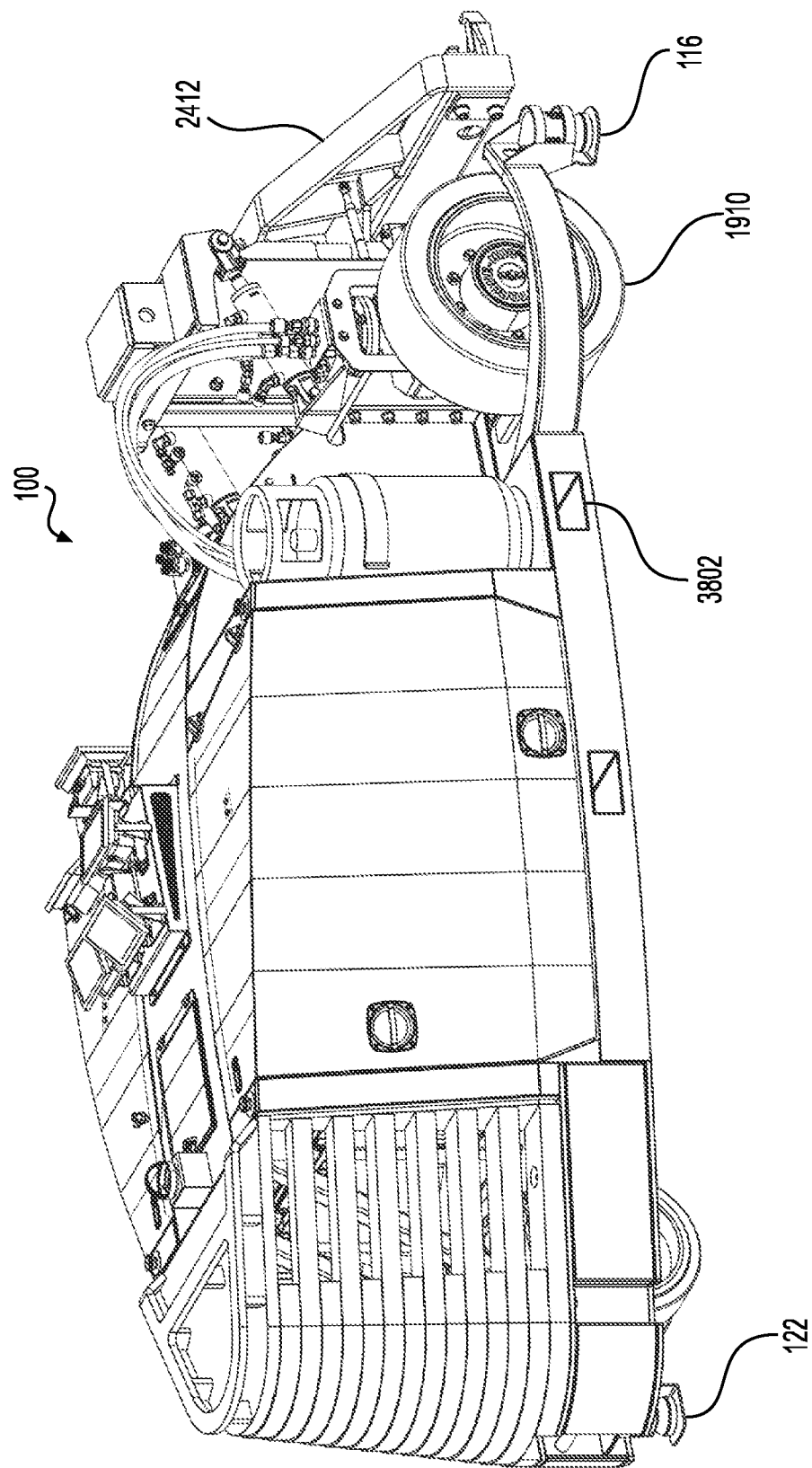
Figure 39:
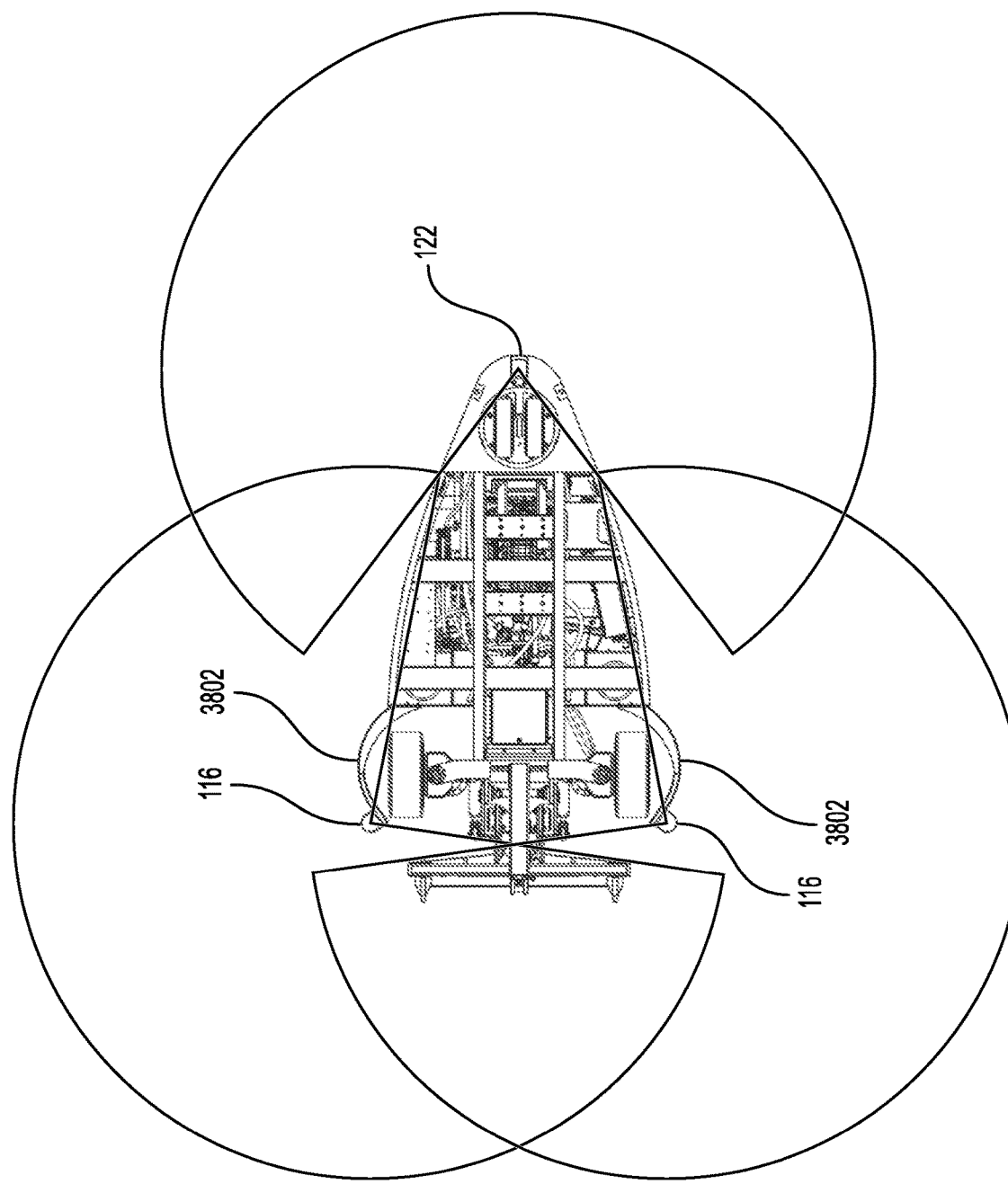
FIG. 39 depicts the LIDAR coverage of the ACR.

FIG. 38 depicts the locations of the two front LIDAR's 116 and the rear LIDAR 122. Each front LIDAR 116 is mounted on a LIDAR mount 3802 which places the LIDAR in front of the front wheels 1910 and adjacent drawbar frame 2412. FIG. 39 depicts an overhead view of ACR 100 showing the LIDAR coverage provided by front LIDAR's 116 and rear LIDAR 122. As can be seen, the placement of front LIDAR's 16 on LIDAR mounts 3802 greatly increases the coverage area of the LIDARs and reduces the blind area of ACR 100 to only areas in which no workers or machinery would be present. The LIDAR'S 116 and 122 are also used as a means of object detection. The ACR computer 138 uses the point cloud data in order to detect an MP and the MP's position in the map. This is done by the use of profile matching Power System 110

Figure 40:
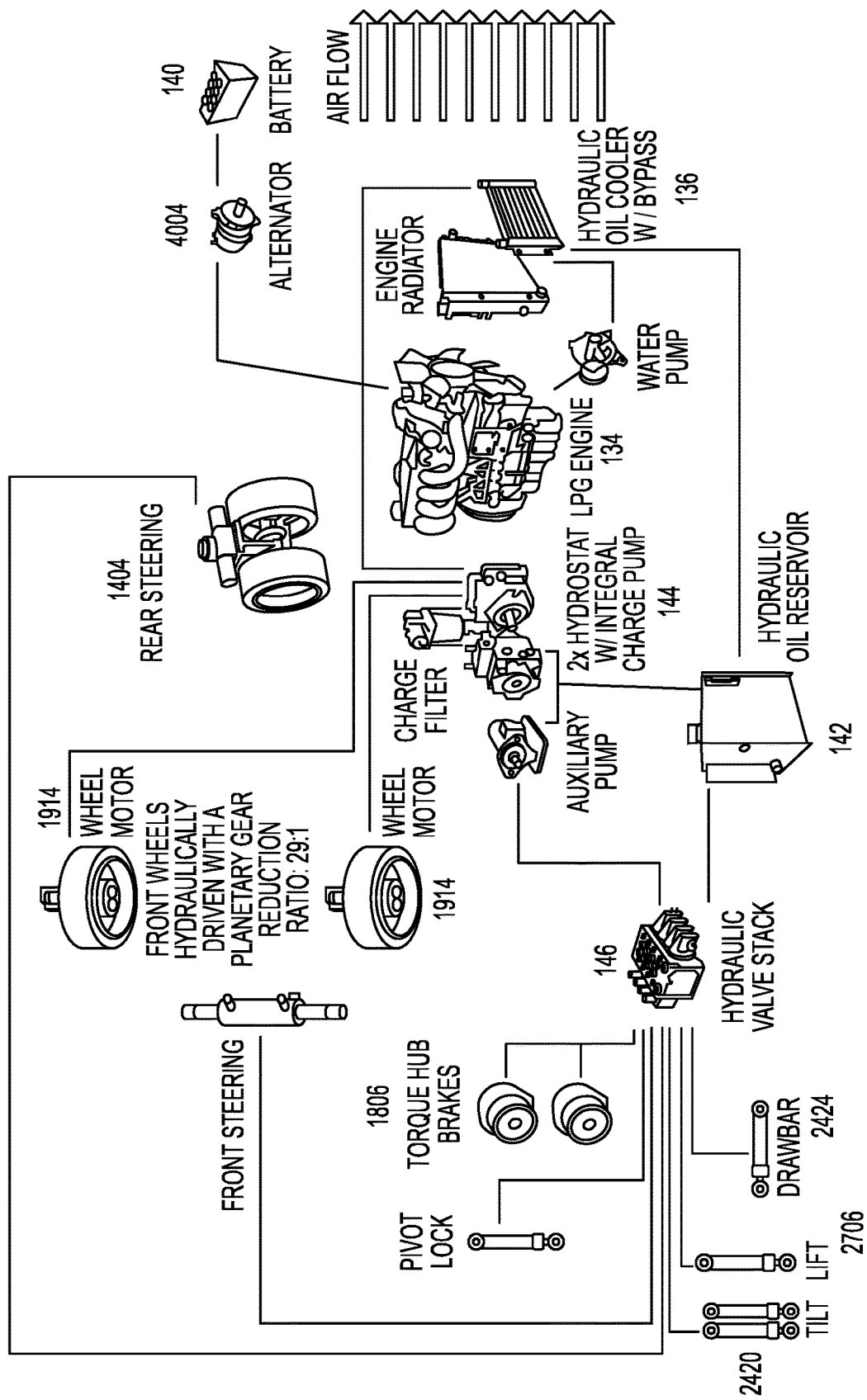
FIG. 40 depicts a schematic of the power system of the ACR.

FIG. 40 depicts a schematic diagram of power system 110 which includes both hydraulic and electrical sources. Engine 134 provides the primary power for the majority of the functions of ACR 100. Engine 134 is cooled by engine radiator 4002 which is located adjacent oil cooler 136. Engine 134 is coupled to battery 140 via alternator 4004, which in turn is coupled to ACR computer 138.

Engine 134 powers pump stack 144 which is cooled by oil reservoir 142 and oil cooler 136. One or more hydraulic pumps from pump stack 144 directly power hydraulic motors 1914 which turn the front wheels 1910. Hydraulic motors 1914 require the most power output because they are responsible for moving ACR 100 and MPs about the cross-dock. An auxiliary pump from pump stack 144 is coupled to hydraulic valve stack 146 which regulate the hydraulic power to the remainder of the hydraulically controlled components of ACR 100, namely steering unit 1404, dual acting cylinder 1908, pivot pin 2410, torque hubs 1906, drawbar cylinder 2424, lift cylinder 2706, and tilt cylinders 2420.

The power unit is a standard engine. Engine data and commands are transmitted to the low level system via CANBUS communication protocol. The exhaust piping is a custom design for the ACR 100 application in order to allow for the fumes to escape via the rear of the ACR 100. This is particularly useful when the ACR 100 is inside a trailer. The three wheel design was chosen as a cost saving method without compromising maneuverability or stability of the system.

Figure 41A:
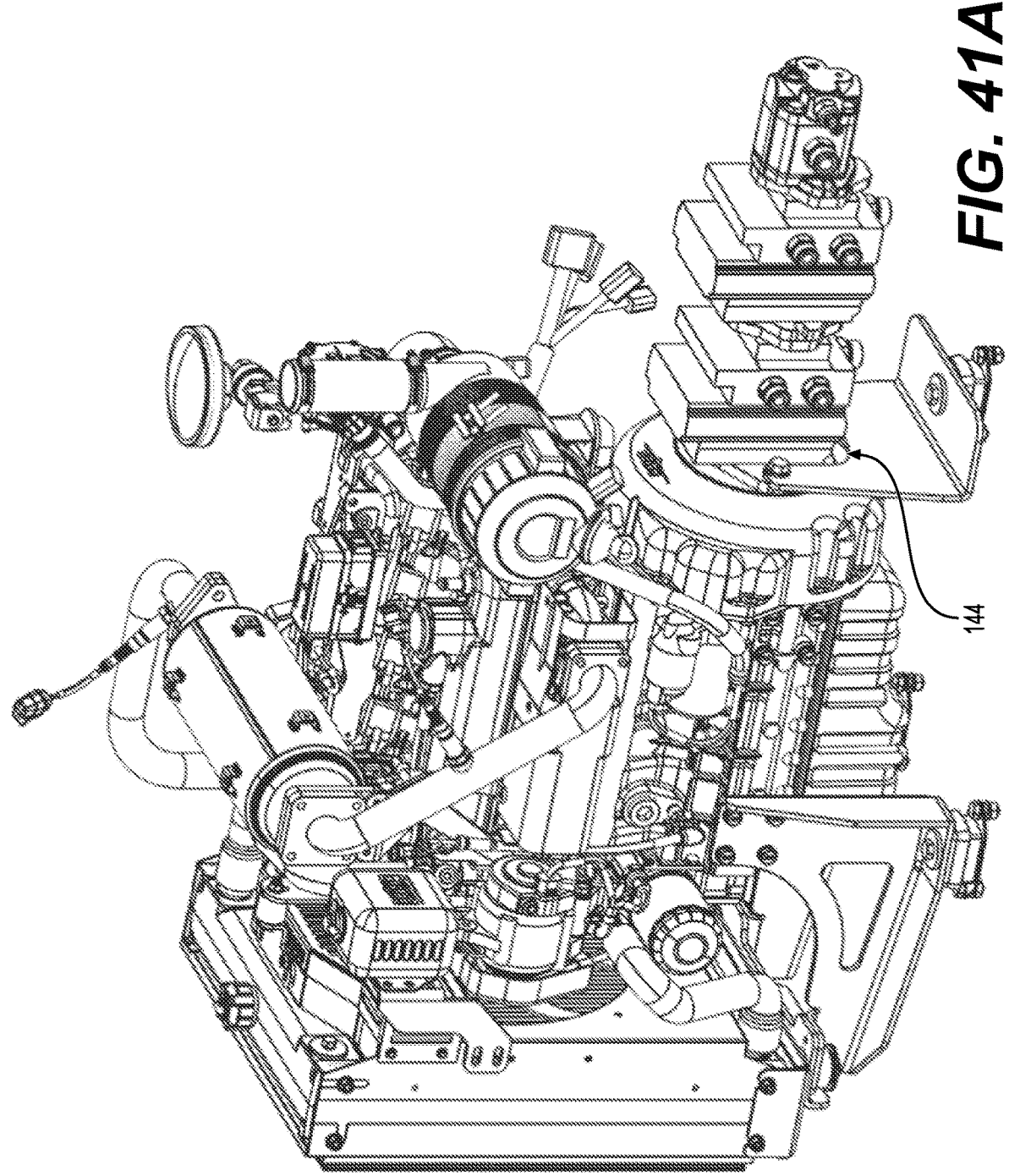
FIGS. 41A-41B depict the engine and hydraulic pumps in isolation.
Figure 41B:
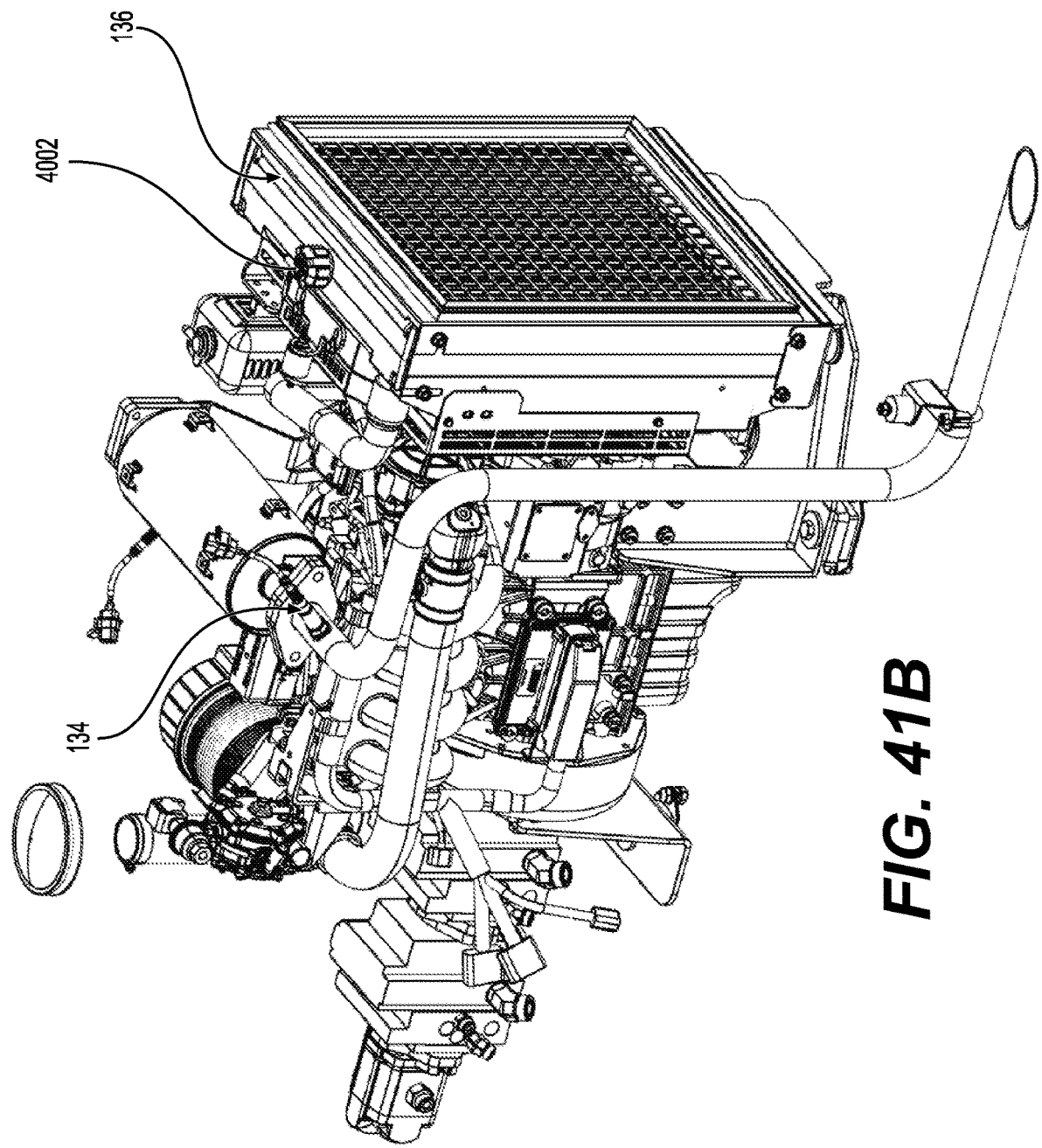

FIGS. 41A and 41B depict engine 134 and pump stack 144 in isolation. Engine radiator 4002 is located immediately adjacent engine 134 and oil cooler 136 so that both can receive external airflow through vent openings 910. Engine isolator 4102, mounted to a bottom of engine 134 and coupled to engine supports 1022, isolate engine 134 from main frame 106 (e.g., reduces vibrations, etc.).

Engine 134 is preferably a Kubota WG 1605-L-E3 4 cylinder motor having an output of 57 HP at 3600 RPM with a weight of 265 lbs. Alternator 4004 is preferably a 12V, 105A alternator.

Pump stack 144 preferably comprises a plurality of pumps (e.g., 2 or more). At least two of the pumps preferably have a displacement of 1.24 in^3. An auxiliary pump of the pump stack 144 is preferably a Turolla pump having a displacement of 0.66 in^3.

ACR Sensors

As previously discussed, ACR 100 comprises a high level control system and a low level control system. The high level control system receives high level move instructions from a cross-dock system, such as that described in U.S. Pat. No. 9,367,827, issued Jun. 14, 2016, or U.S. Pat. No. 10,147,059, issued Dec. 4, 2018, the entire contents of which are hereby incorporated by reference in their entirety. A sample move instruction carrier out by ACR 100 may comprise picking up an MP at a dock door and conveying it to a particular spot on the cross-dock. The high level control system of ACR 100, which is executed by ACR computer 138, then determines the required moves to execute the move instruction including route, pickup height, etc. and modifies these instructions as necessary to avoid any obstacles. The high level control system communicates these instructions to the low level control system using CAN cards. The low level control system responds with feedback information after each operation has been completed. A sample CAN card message sent to the low level control system may indicate a desired lift height, a wheel angle, a tilt angle, etc. The low level control system then executes each CAN card by adjusting the appropriate component of ACR 100.

Maintaining the separation between the high level control system and the low level control system allows either system to easily be swapped out or upgraded. For example, after a period of time a better method of determining routes may become available and the high level control system can be upgraded to include the new routing software without requiring any reprogramming or alteration of the low level control system. Essentially, the high level control system handles the large scale functions of ACR 100, such as obstacle avoidance and navigation, while the low level control system carries out a plurality of individual commands in order to achieve the goals of the high level control system.

Low level control system refers to engine control, hydraulic control, auxiliary functions, and remote control. High level control system refers to the autonomous guidance for the low level controls of the ACR 100. Attachment range refers to the full distance from the rear of the ACR 100 to the back of the MP. Pre-engage range refers to the distance from the front hooks of the ACR 100 to the back of the MP.

In order to determine that the actions by the low level control system have been achieved (e.g., expansion of a cylinder by a specified amount), ACR 100 comprises a variety of sensors which are monitored by ACR computer 138. For example, the lift carriage 102 comprises a plurality of sensors so that the height, tilt angle, and pivot angle can all be monitored in real time. In order to maintain reliable operability of ACR 100, the control tolerance of the steering angle is ±1°, velocity is ±0.1 m/s, vertical position is ±2 mm, and tilt angle is ±1°.

The data gathered by these various sensors can also be utilized by other systems of ACR 100, such as the safety and navigation system 112, to diagnose malfunctions or unexplained phenomena such as toppled freight or cargo.

FIG. 42 depicts the mounting location of the front wheel angle sensors 4202 adjacent front wheels 1910 and having a central axis coinciding with the pivot axis of knuckle weldments 1904. Front wheel angle sensors 4202 monitor the turn angle of each front wheel 1910. Front wheel angle sensor 4202 is preferably a TURCK contactless encoder with 16 bit resolution (0.01°).

Figure 43:
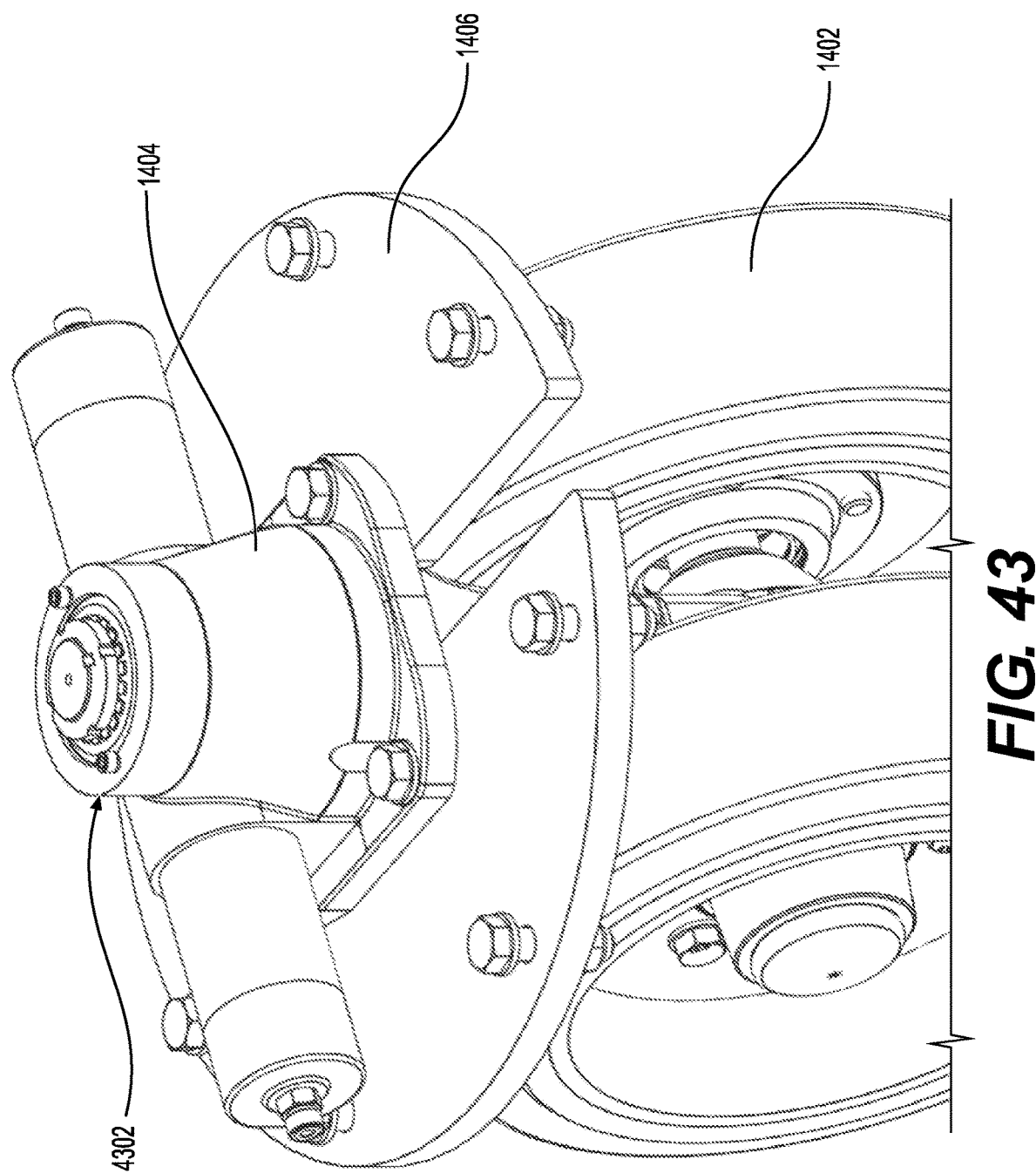

FIG. 43 depicts the mounting location of the rear wheel angle sensor 4302 on steering unit 1404. Rear wheel angle sensor 4302 has a central axis coinciding with the pivot axis of steering unit 1404. Rear wheel angle sensor 4302 monitors the turn angle of rear wheels 1402. Rear wheel angle sensor 4302 is preferably a TURCK contactless encoder with 16 bit resolution (0.01°).

Figure 44:
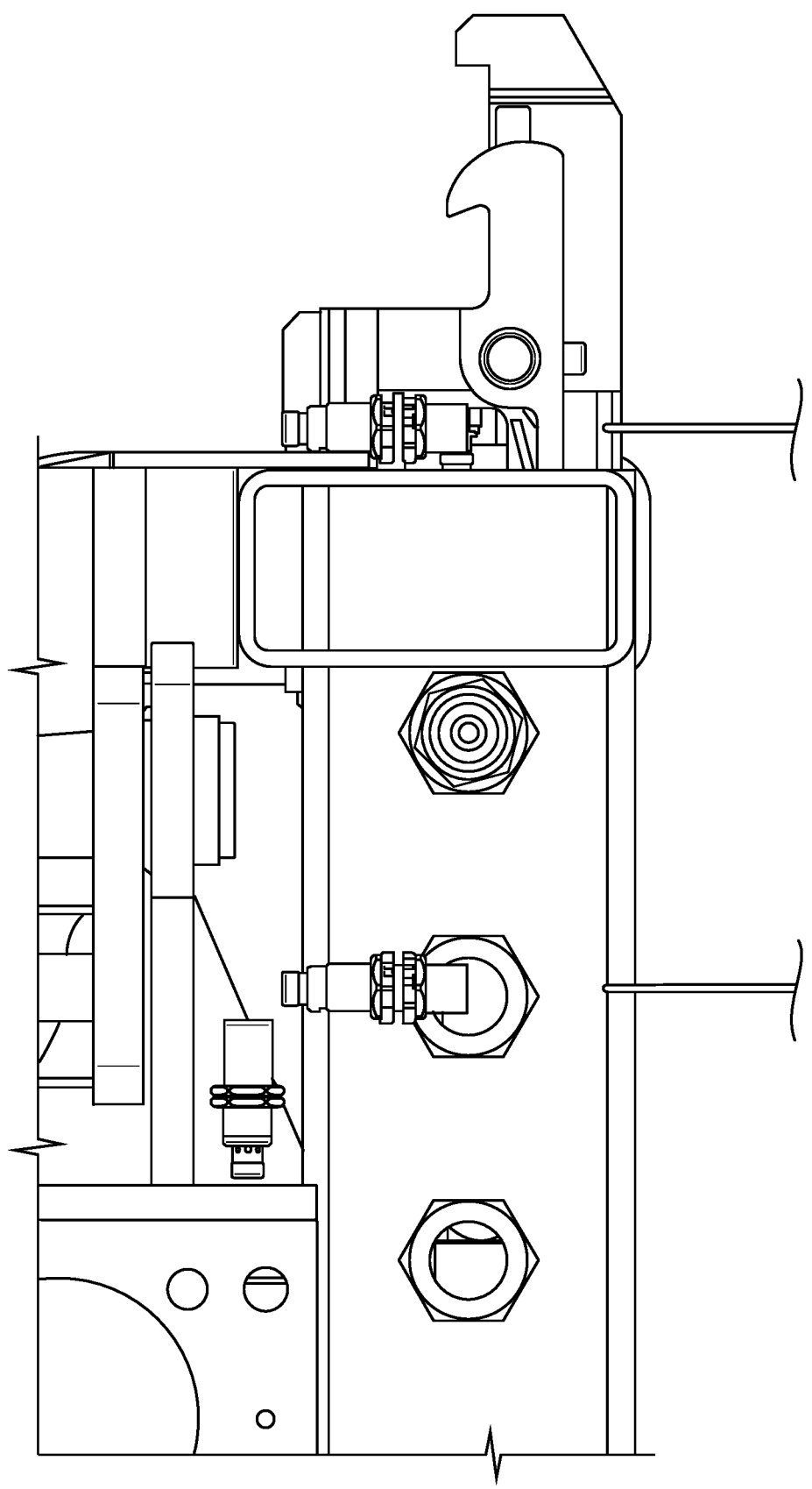

FIG. 44 depicts a side cutaway view of the front of lift carriage 102 showing the positioning of drawbar position sensor 4402, pivot lock sensor 4404, and hook height sensors 4406. Drawbar position sensors 4402 monitor the expansion and contraction distance of drawbar cylinder 2424. Pivot lock sensor 4404 monitors the engagement and disengagement of locking pin 2910. Hook height sensors 4406 monitor the height of hook 2506.

Pivot lock sensor 4404 is preferably a proximity sensor that detects when the locking pin 2910 is engaged or disengaged. Drawbar position sensors 4402 are also preferably proximity sensors that can determine the location of drawbar cylinder 2424 using the data gathered by both sensors.

Figure 45:
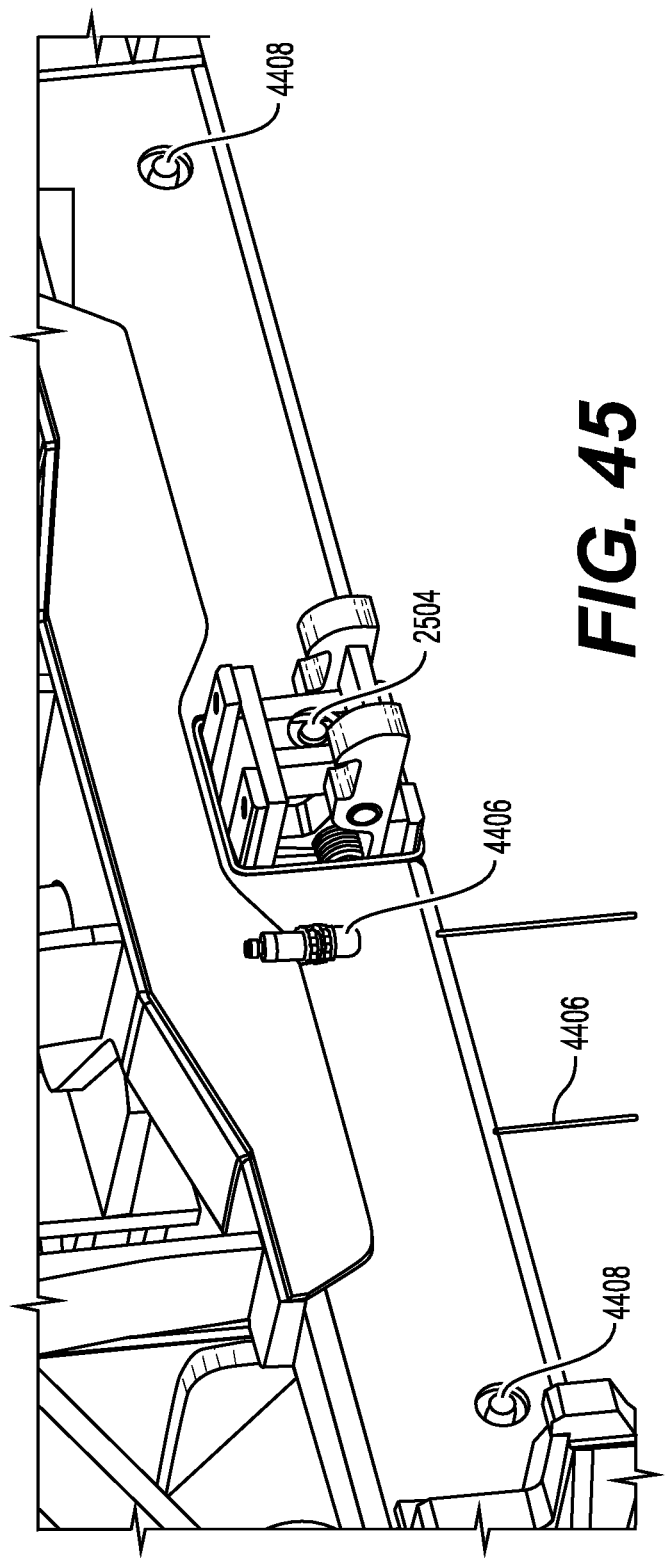

FIG. 45 depicts a front perspective view of lift carriage 102 showing the positioning of hook height sensors 4406, inductive proximity sensor 2504, and MP distance sensors 4408. The operation of hook height sensors 4406 and inductive proximity sensor 2504 have already been described. Each lifting lug 2408 is positioned adjacent a separate MP distance sensor 4408. By using two sensors, ACR computer 138 can monitor the distance to the MP and ensure that the left and the right lifting lugs 2408 remain the same distance from the MP during engagement and disengagement.

Figure 46:
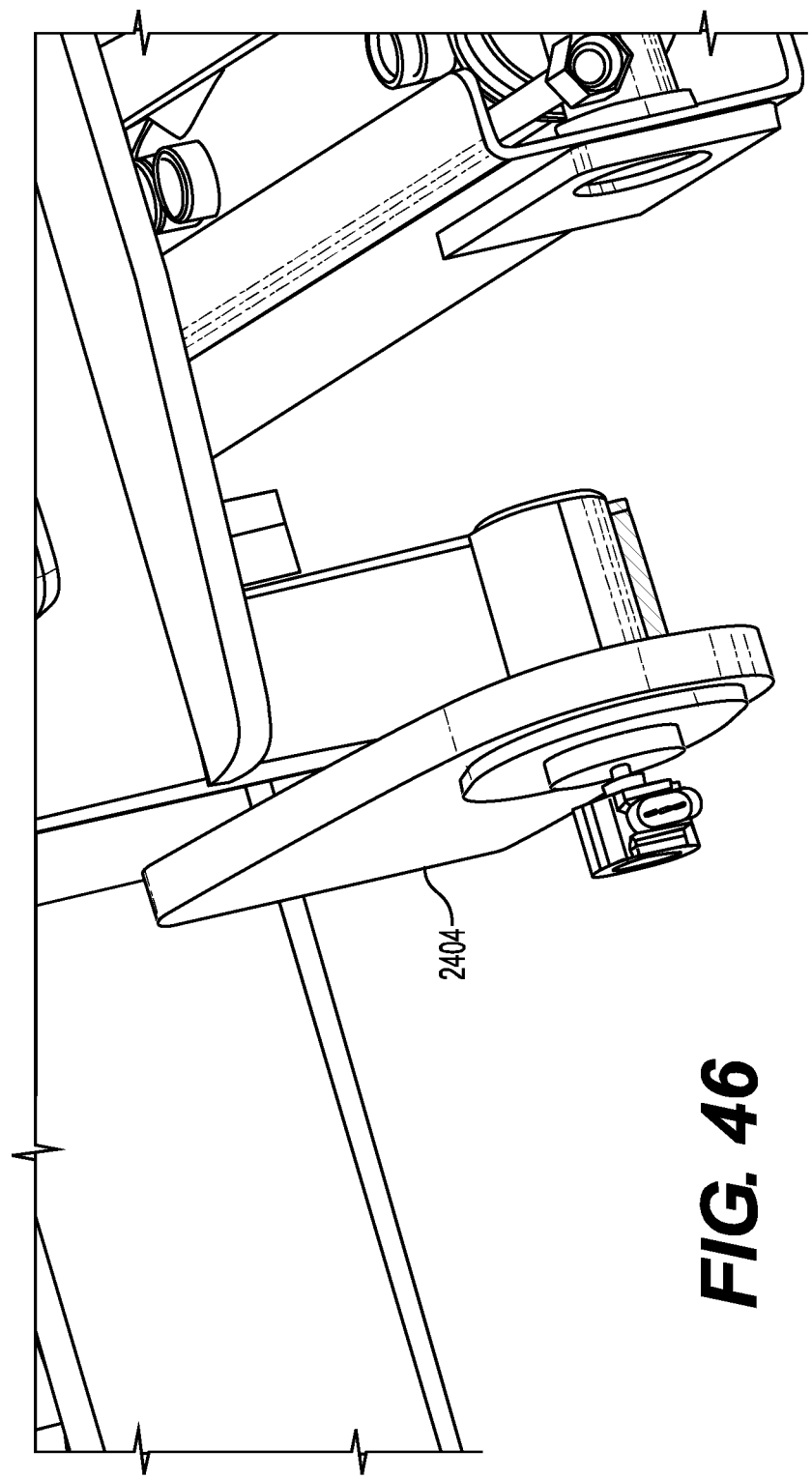

FIG. 46 depicts the positioning of tilt sensor 4410 adjacent mast pivot 2404. Mast pivot 2404 has a central axis coinciding with the pivot axis of mast pivot 2404 so that the pivot angle can easily be determined and monitored. The tilt sensor is preferably a Honeywell rotary sensor that is accurate to 0.013°.

Lift cylinder 2706 comprises an internal transducer to monitor the expansion distance. Preferably, the internal transducer is accurate to 0.3 mm.

Remote/Manual Control

Figure 47:
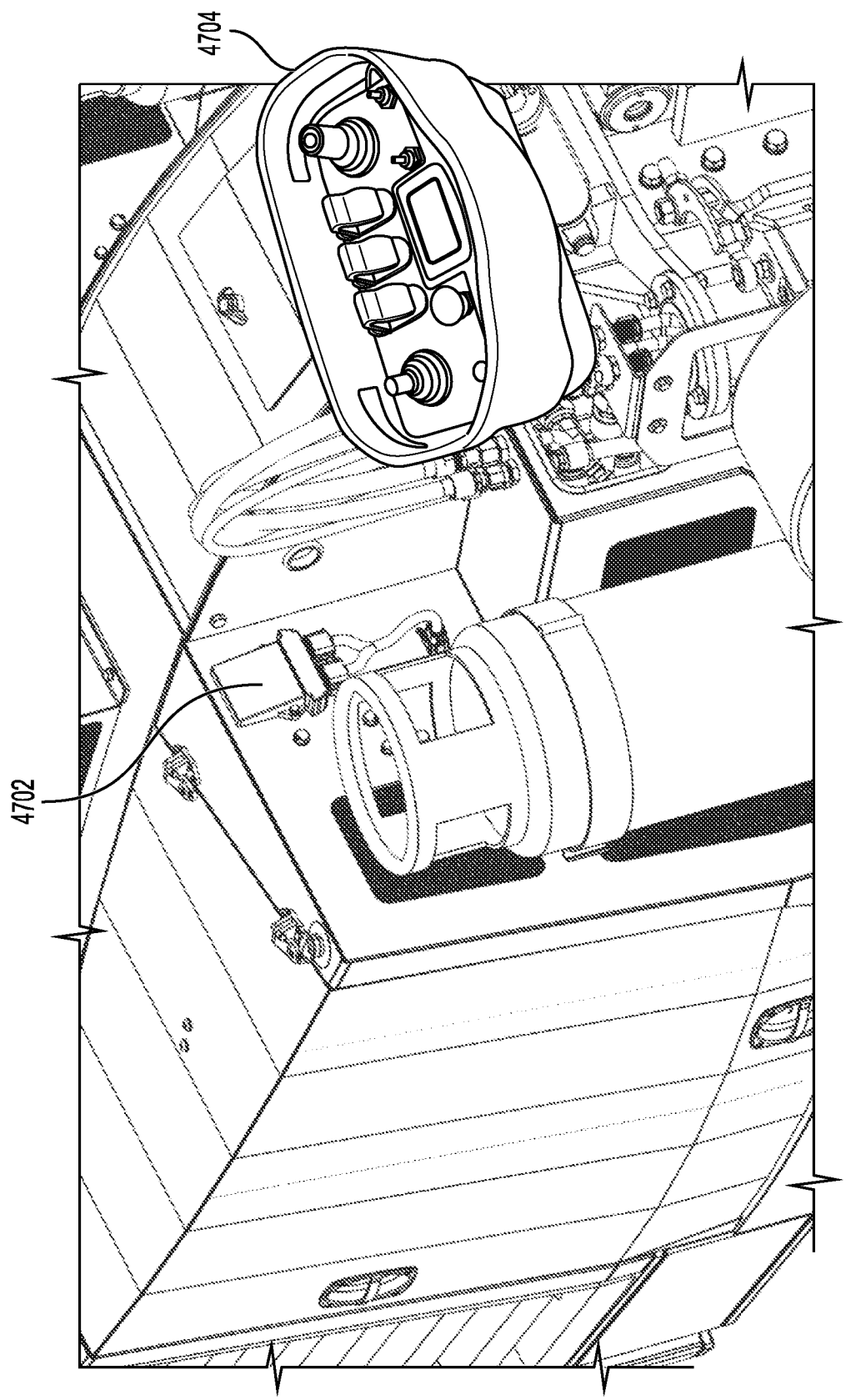

In some instances, it may be desirable or necessary to control ACR 100 either manually or remotely. In instances when ACR 100 is controlled manually, a receiver 4702 is plugged into ACR 100 adjacent left tank 128 so that signals can be received from controller 4702 as depicted in FIG. 47. Preferably, autonomous control of ACR 100 is disabled when receiver 4702 is plugged in.

Figure 48:
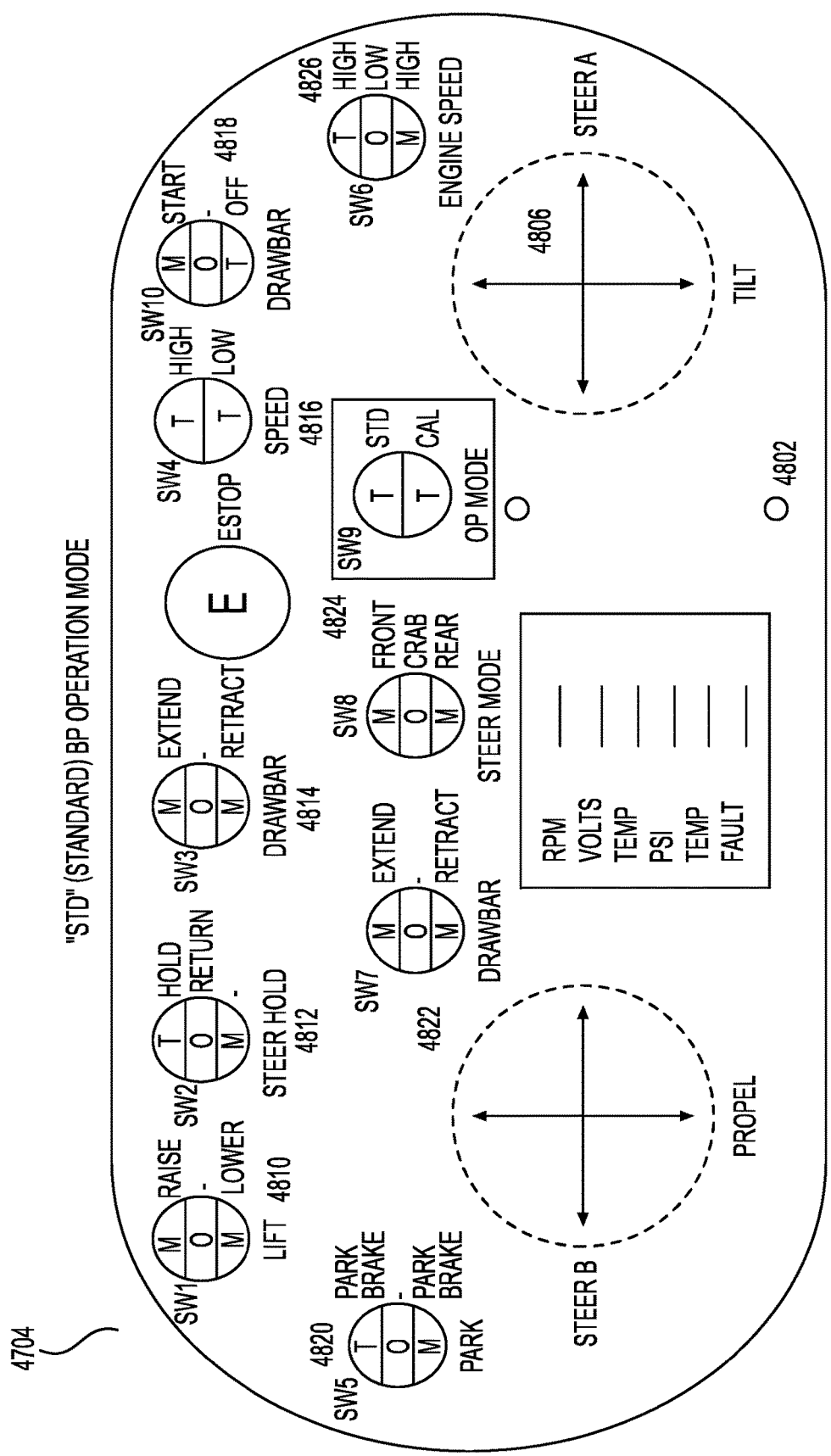

Controller 4702 is preferably a bellypack type controller designed to be warn at waist level to allow for one or two handed operation. FIG. 48 depicts a sample face 4802 of controller 4704. A first analog joystick 4804 can be used for steering and propelling ACR 100 in forward or reverse. A second analog joystick 4806 can be used to adjust the tilt angle of lift carriage 102. Display 4808 provides data about ACR 100 such as RPM, operating temperature, pump pressure, etc. A first directional switch 4810 raises and lowers drawbar frame 2412; a second directional switch 4812 locks or unlocks the steering in a particular direction; and a third directional switch 4814 extends or retracts drawbar cylinder 2424. First flip switch 4816 sets the speed of ACR 100 to low or high; a second flip switch 4818 turns engine 134 on or off; a third flip switch 4820 engages or disengages the brakes of ACR 100; a fourth flip switch 4822 extends or retracts locking pin 2910. A first toggle switch 4824 adjusts the operational steering mode and a second toggle switch 4826 adjusts the engine speed. Emergency stop button 4828 immediately stops all functions of ACR 100.

ACR 100 may also utilize a variety of alarm sounds to alert others to the position of ACR 100 or its operational mode. For example, different alarm sounds may be issued when ACR 100 is in reverse, traversing, or pivoting. An audio signal may also be used to indicate a low battery or fuel warning.

Visual indicators can be used for signal various outputs to operators nearby, some of these can include, system faults, turn signals. During maintenance operations the indicators light can output various sequences to indicate various configurations of the system. Alarms can be used for signaling passage through confined spaces, blind turns, hazard zones etc. During maintenance, alarms can also output a sequence of sounds in order to indicate various configurations of the system.

Alternate Embodiment

Figure 49:
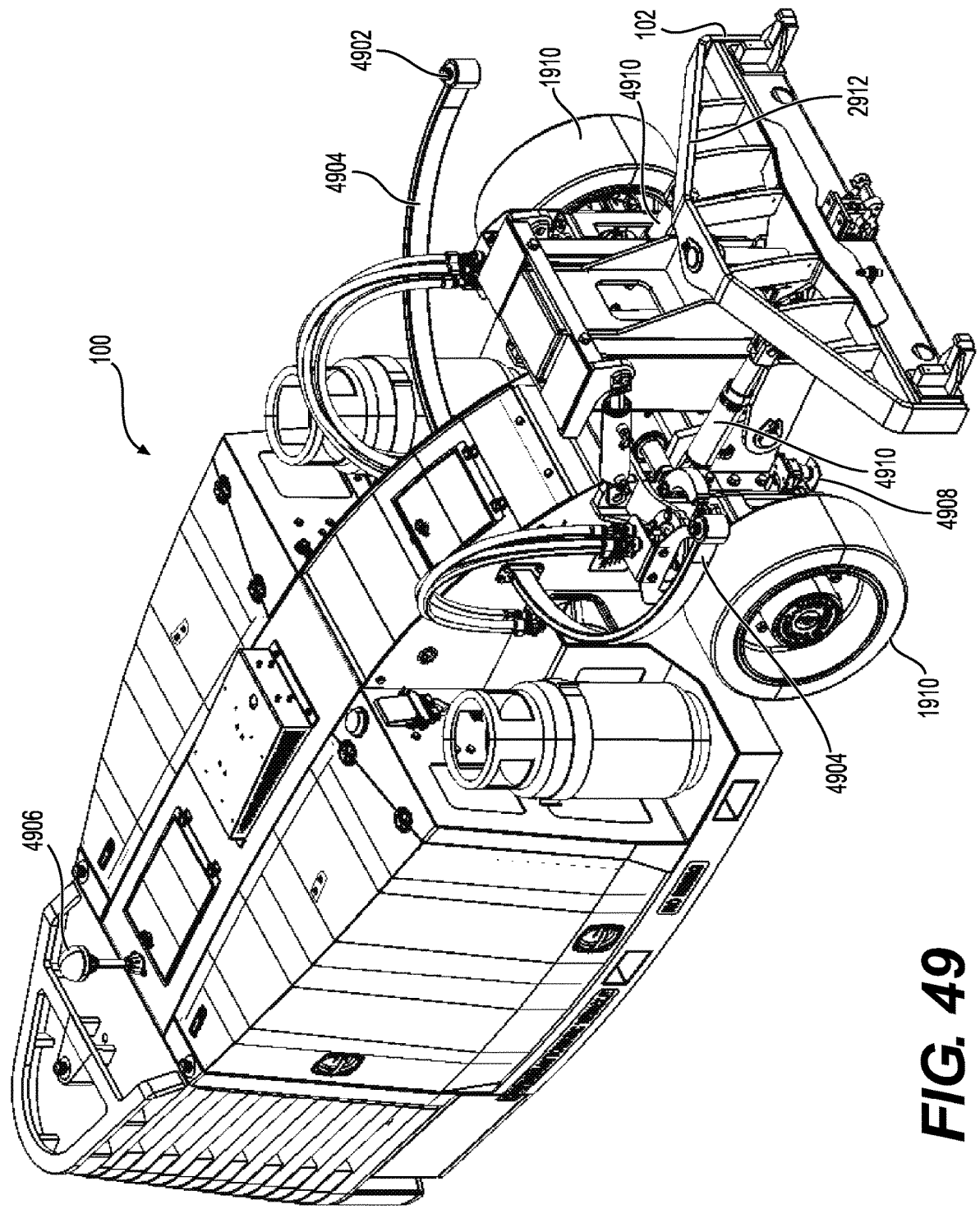
FIG. 49 depicts a perspective view of an alternate embodiment of the ACR.

FIG. 49 depicts a perspective view of ACR 100. In this embodiment, only notable differences are described. ACR 100 comprises one or more E-stops 4902 arranged on arms 4904.

One or more 3D cameras 4906 are arranged on the body of ACR 100. 3D cameras 4906 can be any combination of cameras with different fields of view, including 360°. The 3D cameras 4906 are used for navigation, obstacle avoidance, and MP detection. A front LIDAR 4906 is arranged between front wheels 1910.

A pair of hydraulic cylinders 4910 are used to damper or lock the right/left pivoting movement of drawbar frame 2912. When ACR 100 is mobile or operating in a normal state, hydraulic fluid is free flowing form hydraulic cylinders 4910 to the hydraulic tank. The fluid to hydraulic cylinders 4910 can be locked by the use of electronically controlled solenoids. A sensor is used to determine the angle of pivot as well as the center position of drawbar frame 2912.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. An automated conveyance robot comprising:
a main frame having a front end and a rear end;
a rear drive assembly coupled to the main frame near the rear end of the main frame;

a front drive assembly,
wherein a first end of the front drive assembly is coupled to the front end of the main frame;
a power system for powering the rear drive assembly and the front drive assembly;
a counterweight assembly independently removably coupled to a top surface at the rear end of the main frame;
a lift carriage pivotally coupled to a second end of the front drive assembly by a pivot joint at the second end,
wherein the first end is opposite the second end, and
wherein the lift carriage is configured to removably coupled to a moveable platform.

2. The automated conveyance robot according to claim 1, wherein the front drive assembly comprises:
a first steering unit for powering a first wheel; and
a second steering unit for powering a second wheel,
wherein the first steering unit and second steering unit are independently powered.

3. The automated conveyance robot according to claim 2, further comprising:
a dual acting cylinder,
wherein a first end of the dual acting cylinder is configured to independently steer the first steering unit, and
wherein a second end of the dual acting cylinder is configured to independently steer the second steering unit.

4. The automated conveyance robot according to claim 2, wherein the rear drive assembly comprises:
a steering unit centered between a first wheel and a second wheel of the front drive assembly.

5. The automated conveyance robot according to claim 1, wherein the counterweight assembly comprises a plurality of vent openings for venting an interior of the main frame.

6. The automated conveyance robot according to claim 5, wherein a center of mass of the counterweight assembly is at or behind the rear drive assembly near the first end of the main frame.

7. The automated conveyance robot according to claim 1, wherein the counterweight assembly comprises:
a first set of forklift pockets configured to receive tines of a forklift.

8. The automated conveyance robot according to claim 7, wherein the first set of forklift pockets are used to remove the counterweight assembly from the main frame by the forklift.

9. The automated conveyance robot according to claim 1, wherein the main frame comprises a second set of forklift pockets configured to receive tines of a forklift.

10. The automated conveyance robot according to claim 1, comprising:
a first LIDAR sensor coupled to the first end,
a second LIDAR sensor coupled to a first extension arm located at the second end; and
a third LIDAR sensor coupled to a second extension arm located at the second end,
wherein the first extension arm and the second extension arm extend in a direction of the lift carriage.

11. The automated conveyance robot according to claim 1, further comprising:
a pivoting assembly for pivoting the lift assembly with respect to the main body about the pivot joint.

12. The automated conveyance robot according to claim 11, wherein the lift assembly comprises:
a lift cylinder for adjusting a vertical height of the lift carriage with respect to the main body; and
a drawbar assembly coupled to the lift carriage at a second pivot joint.

13. The automated conveyance robot according to claim 12,
wherein the pivot joint pivots about a first central axis,
wherein the second pivot joint pivots about a second central axis,
wherein the first axis is perpendicular to the second axis.

14. The automated conveyance robot according to claim 12, further comprising:
a dampening assembly for damping pivoting of the drawbar assembly about the second pivot joint.

15. The automated conveyance robot according to claim 12,
wherein the drawbar assembly comprises:
a first lifting lug coupled to a first end of the draw bar assembly,
a second lifting lug coupled to a second end of the draw bar assembly, and
a movable drawbar located between the first lifting lug and the second lifting lug.

16. The automated conveyance robot according to claim 15, wherein the movable drawbar is configured to move between an extended position and a retracted position.

17. The automated conveyance robot according to claim 15, wherein the movable drawbar comprises:
a third pivot joint, and
a T-hook coupled to the third pivot joint.

18. The automated conveyance robot according to claim 15, wherein a third central axis of the third pivot joint is parallel to the first central axis.

19. The automated conveyance robot according to claim 1, wherein the rear drive assembly consists of a single wheel.

20. The automated conveyance robot according to claim 1, wherein the front drive assembly comprises a first wheel and a second wheel.

21. An automated conveyance robot comprising:
a main frame having a front end and a rear end;
a rear drive assembly coupled to the main frame near a rear end of the main frame;
a front drive assembly,
wherein a first end of the front drive assembly is coupled to the front end of the main frame;
a power system for powering the rear drive assembly and the front drive assembly;
a counterweight assembly independently removably coupled to the rear end of the main frame;
a lift carriage pivotally coupled to a second end of the front drive assembly by a pivot joint,
wherein the lift carriage is configured to removably couple to a moveable platform,
wherein the front drive assembly comprises:
a first steering unit for powering a first wheel; and
a second steering unit for powering a second wheel,
wherein the first steering unit and second steering unit are independently powered; and
a dual acting cylinder,
wherein a first end of the dual acting cylinder is configured to independently steer the first steering unit, and
wherein a second end of the dual acting cylinder is configured to independently steer the second steering unit.

* * * * *